US008303861B2

United States Patent
Horie et al.

(10) Patent No.: US 8,303,861 B2
(45) Date of Patent: *Nov. 6, 2012

(54) COLORED COMPOSITE MICROPARTICLES, PROCESS FOR PRODUCING THE COLORED COMPOSITE MICROPARTICLES, COLORANT, COLOR FILTER AND INK FOR INK-JET PRINTING

(75) Inventors: Shinji Horie, Otake (JP); Hiroko Morii, Otake (JP); Hirofumi Nishikawa, Otake (JP); Kazuyuki Hayashi, Otake (JP)

(73) Assignee: Toda Kogyo Corporation, Hiroshima-shi, Hiroshima-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/926,485

(22) Filed: Nov. 22, 2010

(65) Prior Publication Data

US 2011/0068307 A1    Mar. 24, 2011

Related U.S. Application Data

(63) Continuation of application No. 12/073,465, filed on Mar. 5, 2008, now abandoned, which is a continuation-in-part of application No. PCT/JP2006/317543, filed on Sep. 5, 2006.

(30) Foreign Application Priority Data

Sep. 9, 2005  (JP) ................. 2005-262254
Jun. 22, 2006 (JP) ................. 2006-172462
Jul. 14, 2006 (JP) ................. 2006-194645

(51) Int. Cl.
*G02B 5/23* (2006.01)
*G02F 1/1335* (2006.01)

(52) U.S. Cl. ............ 252/586; 252/582; 106/31.13; 106/31.6; 106/31.65; 106/31.9; 106/446; 106/465; 106/475; 106/481; 106/482; 347/100; 349/106; 349/107; 349/138; 427/207.1; 523/200

(58) Field of Classification Search .......... 252/582, 252/586; 106/31.6, 31.65, 31.9, 31.13, 495, 106/493, 417, 426, 429, 442, 446, 447, 461, 106/464, 465, 466, 467, 471, 475, 476, 481, 106/482, 483, 487, 490, 491, 499; 347/100; 427/207.1; 428/325, 328, 407; 516/9; 523/200; 349/106, 107, 138

See application file for complete search history.

(56) References Cited

U.S. PATENT DOCUMENTS

| 6,277,183 | B1 * | 8/2001 | Johnson et al. ............ 106/31.27 |
| 7,094,814 | B2 | 8/2006 | Morii et al. |
| 7,157,025 | B2 * | 1/2007 | Ichimura et al. .............. 252/582 |
| 2004/0235985 | A1 * | 11/2004 | Ichimura et al. .............. 523/200 |
| 2006/0121392 | A1 | 6/2006 | Nakatsugawa |
| 2006/0213391 | A1 | 9/2006 | Sugai et al. |
| 2008/0092773 | A1 | 4/2008 | Matsuyama |

FOREIGN PATENT DOCUMENTS

| JP | 2003-55591 | 2/2003 |
| JP | 2004-91599 | 3/2004 |
| JP | 2004-123800 | 4/2004 |
| WO | WO 2006/030976 A1 * | 3/2006 |

OTHER PUBLICATIONS

International Search Report for PCT/JP2006/317543.
English translation of Office Action in JP 2006-172462 mailed Mar. 14, 2012.

* cited by examiner

*Primary Examiner* — Bijan Ahvazi
(74) *Attorney, Agent, or Firm* — Nixon & Vanderhye P.C.

(57) ABSTRACT

Colored composite microparticles comprising silica and an organic pigment in which the silica is enclosed in the organic pigment and contained in an amount of 0.001 to 9% by weight (calculated as Si) based on the weight of the composite particles. These microparticles have a high tinting strength and are excellent in dispersibility and light fastness.

18 Claims, No Drawings

COLORED COMPOSITE MICROPARTICLES, PROCESS FOR PRODUCING THE COLORED COMPOSITE MICROPARTICLES, COLORANT, COLOR FILTER AND INK FOR INK-JET PRINTING

CROSS REFERENCES TO RELATED APPLICATIONS

This is a continuation of application Ser. No. 12/073,465 filed Mar. 5, 2008 now abandoned, which in turn is a continuation-in-part application of International Application No. PCT/JP2006/317543, filed 5 Sep. 2006, which designated the US and claims benefit of JP 2005-262254, filed 9 Sep. 2005, JP 2006-172462, filed 22 Jun. 2006 and JP 2006-194645, filed 14 Jul. 2006, the entire contents of each of which are hereby incorporated by reference.

BACKGROUND OF THE INVENTION

The present invention relates to colored composite microparticles, a dispersion containing the colored composite microparticles, a process for producing the colored composite microparticles, a colorant for color filters, a coloring composition for color filters containing the colorant, a color filter, a colorant for inks for ink-jet printing, and an ink for ink-jet printing. More particularly, the present invention relates to colored composite microparticles having a fine primary particle diameter, and exhibiting a high tinting strength, an excellent dispersibility and an excellent light fastness; a dispersion containing the colored composite microparticles which exhibits an excellent dispersibility; a process for producing the colored composite microparticles; a colorant for color filters, which has a fine primary particle diameter, exhibits a high tinting strength, and is excellent in dispersibility in vehicles, light fastness and heat resistance; a coloring composition for color filters and a color filter which are excellent in light fastness and heat resistance as well as transparency; a colorant for inks for ink-jet printing, which has a fine primary particle diameter and a uniform particle size distribution, exhibits a high tinting strength, and is excellent in dispersibility and light fastness; and an ink for ink-jet printing, which contains the colorant for inks for ink-jet printing, and is excellent in dispersibility, dispersion stability and light fastness.

Organic pigments have been extensively used as colorants in various applications such as paints, resins, printing inks, inks for ink-jet printing, toners and color filters. In these application fields, in general, the pigments have been required to have a high tinting strength. For this reason, it has been required to provide much finer pigments.

The organic pigments are, in general, present in the form of fine primary particles having a particle size of about 20 nm to 100 nm, which are formed from pigments in a molecular state obtained by chemical reaction, etc. However, the organic pigments in the form of fine primary particles tend to be agglomerated together because of a very high surface energy on the particles. For this reason, the organic pigments are usually present in the form of secondary particles having a very large particle size and a high cohesive force. Therefore, it has been required to develop techniques for obtaining very finely divided organic pigments.

At present, as the method for obtaining very finely divided organic pigments, there have been used a wet-pulverization method such as typically a solvent/salt milling method in which pigment particles are mechanically pulverized together with a high-viscous water-soluble organic solvent such as polyethyleneglycol using an abrasive such as a common salt, a dry-pulverization method of pulverizing the pigment particles under a dried condition using a pulverizer such as a ball mill, an attritor and a vibration mill, and a method of forming fine pigment particles by solubilizing pigments to prepare a solution thereof and then precipitating the pigments from the solution under specific conditions.

However, in any of these conventional methods, the finer the particle size of the pigments, the stronger the coagulation force between the pigments particles. In particular, in the wet method using an aqueous system, the coagulation between the particles after drying becomes remarkable, so that it may be extremely difficult to maintain a shape of the primary particles. As a result, the pigment particles are present in the form of secondary agglomerated particles as an aggregate having a very strong coagulation force, so that it may be further difficult to disperse the pigment particles in a solvent.

Also, paints and printed matters using the organic pigments are used outdoors, etc., and therefore, tend to be exposed to direct sunlight, weather, etc. Therefore, the organic pigments have been required to have an excellent light fastness. However, since finer pigment particles tend to exhibit a poorer light fastness, it has been conventionally difficult to produce pigments satisfying both a fine particle size and an excellent light fastness.

On the other hand, color filters have been extensively used in the application fields of monitors for televisions, personal computers, portable telephones, etc., or in the application fields of CCD and CMOS for digital cameras. Among them, the color filters of a pigment-dispersion type are predominately used from the standpoints of a light fastness and a heat resistance. At present, the color filters have been required to exhibit a still higher pixel reproducibility as well as a high contrast. To achieve these requirements, it has also been required that organic pigments used in the color filters are provided in the form of fine particles which can be stably dispersed in a nano level.

The color filters are required to show a good light fastness for preventing the color fading thereof even when irradiated with a backlight, and further required to have a good heat resistance for heat-treating the filters at a temperature of about 250° C. upon hardening of patterns formed thereon or vapor deposition of ITO film thereon. However, the pigments in the form of very fine particles generally tend to be deteriorated in light fastness and heat resistance. For this reason, it has been strongly required to provide a colorant for color filters, which has a particle size in a nano level, can be stably dispersed in vehicles, and is excellent in light fastness and heat resistance.

On the other hand, various OA equipments including personal computers have now rapidly prevailed in both of business and domestic applications. Ink-jet printers as one of recording apparatuses for these equipments have also widely prevailed owing to recent reduction in price and enhancement in quality thereof.

In recent years, the ink-jet printers are capable of realizing a high-level image quality having a high definition and a high gloss, which are almost similar to those of a silver photograph. With the enhancement in image quality, printed matters obtained by the ink-jet printing have been more extensively used in various applications, so that it becomes important that the printed matters have a good keeping property (light fastness) for a long period of time.

Conventionally, as the colorant for inks for ink-jet printing, there have been used dyes from the standpoints of clogging of a head portion of ink-jet printers, dispersion stability and chromaticity of inks, etc. However, the dyes have problems concerning toxicity. In addition, owing to the recent demand for enhanced light fastness of printed matters, it has been attempted to prepare an ink by using pigments as the colorant in place of the dyes.

When using the pigments as a colorant for inks for ink-jet printing, the resultant printed images have a high image density and an excellent light fastness as compared to those obtained by using the dyes as the colorant. However, since the inks for ink-jet printing generally contain water in an amount of 80% by weight of whole constituting components thereof, the pigments, in particular, organic pigments composed of organic compounds, tend to be hardly dispersed therein. In addition, the pigments tend to be insoluble in a solvent such as water unlike the dyes. Therefore, it may be difficult to stably keep the pigment-containing inks for ink-jet printing for a long period of time, and there arises such a problem that the inks tend to cause clogging of a head portion of ink-jet printers. Further, the organic pigments in a molecular state, which are obtained by chemical reactions, etc., and the organic pigments composed of fine primary particles having a particle size of about 20 nm to 100 nm, tend to be agglomerated together because of a very high surface energy on the particles, so that it may be difficult to obtain particles having a uniform particle size distribution, thereby failing to produce a clear image without fogging.

On the other hand, the clogging of the head portion may be prevented by finely reducing a particle size of the colorant. On the contrary, it may be difficult to disperse such a colorant having a fine particle size in an ink composition, and the colorant tends to be deteriorated in light fastness.

As the method of finely reducing the particle size, there has been proposed a method for producing fine particles by adding a small amount of an organic solvent having an effect of promoting a crystal growth to crude quinophthalone pigments or isoindoline pigments having an average particle diameter of more than 100 nm and then pulverizing the resultant mixture by a dry method (Japanese Patent Application Laid-open (KOKAI) No. 2005-36150).

Also, as the colorant in the form of fine particles having an excellent light fastness, there has been proposed an organic and inorganic composite pigment produced by allowing an organic pigment to adhere onto the surface of white inorganic particles through a gluing agent such as an alkoxysilane (Japanese Patent Application Laid-open (KOKAI) No. 2002-356625).

As the colorant in the form of fine particles having an excellent transparency, there have been proposed colored fine particles which are produced by completely dissolving and removing core particles from composite particles obtained by allowing an organic pigment to adhere onto the surface of white inorganic particles as the core particles through a gluing agent such as an alkoxysilane, by using a theoretical amount or more of an acid or an alkali capable of dissolving a whole amount of the white inorganic particles as the core particles (Japanese Patent Application Laid-open (KOKAI) No. 2003-246941).

As the technique for obtaining an organic pigment in the form of fine particles, there has been proposed a method for producing a pigment composition for a blue pixel portion of color filters in which an ε-type copper phthalocyanine pigment as a fine organic pigment and a dioxazine violet pigment having an aspect ratio of 10:1 to 25:1 are subjected together to solvent/salt milling treatment (Japanese Patent Application Laid-open (KOKAI) No. 2006-091649). Also, there has been proposed a method for producing an organic pigment in the form of fine particles by flowing a solution prepared by dissolving the organic pigment in an alkali or acid aqueous medium in the form of a layered flow to change a pH value of the solution in the course of the layered flow (Japanese Patent Application Laid-open (KOKAI) No. 2005-307154).

There have been proposed a coloring composition for color filters, which contains an organic and inorganic composite pigment having an average particle diameter of 1 to 100 nm which is obtained by adhering an organic pigment onto the surface of fine white inorganic particles, and a color filter containing the coloring composition for color filters (Japanese Patent Application Laid-open (KOKAI) No. 2004-307853).

As the ink for ink-jet printing, there has been proposed a water-based recording solution for ink-jet printing, which contains a pigment and colloidal silica for the purpose of obtaining printed images having a high image quality (Japanese Patent Application Laid-open (KOKAI) Nos. 9-227812 (1997) and 2000-53901).

Further, as the colorant in the form of fine particles having an excellent light fastness, there has been proposed a colorant for inks for ink-jet printing, which is composed of composite particles having an average particle diameter of 0.001 to 0.15 μm which are obtained by uniformly adhering an organic pigment onto the surface of extender pigment particles through a gluing agent (Japanese Patent Application Laid-open (KOKAI) Nos. 2003-55591, 2003-268278, 2003-327880 and 2006-111875).

SUMMARY OF THE INVENTION

At present, it has been most strongly required to provide a fine colorant which has a fine primary particle diameter, a uniform particle size distribution and a high tinting strength, and is excellent in light fastness and heat resistance. The particle size of pigments must be finely lessened in order to attain a high tinting strength and a high transparency. However, there is a tendency that when the particle size of the pigment is lessened, the pigment is deteriorated in light fastness and heat resistance. Thus, such a colorant capable of satisfying these contradictory properties at the same time has not been obtained until now.

More specifically, in the method for producing fine particles as described in Japanese Patent Application Laid-open (KOKAI) No. 2005-36150 in which a small amount of an organic solvent having an effect of promoting a crystal growth is added to a crude quinophthalone pigment or isoindoline pigment having an average particle diameter of more than 100 nm and then the resultant mixture is pulverized by a dry method, as described in Comparative Examples below, the organic pigment is merely formed into fine particles. Since the resultant organic pigment has a ζ potential close to zero, it may be difficult to attain an electrostatic repulsion effect thereof in vehicles. Therefore, the organic pigment may fail to exhibit a good dispersibility and a good dispersion stability in vehicles.

In the method as described in Japanese Patent Application Laid-open (KOKAI) No. 2002-356625 in which an organic pigment is allowed to adhere onto the surface of white inorganic particles through a gluing agent such as an alkoxysilane, as described in Comparative Examples below, since the white inorganic particles such as silica particles are used as core particles, it may be difficult to attain a high tinting strength identical to or higher than that of the raw organic pigment adhered thereonto.

Also, in the method for producing colored fine particles as described in Japanese Patent Application Laid-open (KOKAI) No. 2003-246941 in which core particles are completely dissolved and removed from composite particles obtained by allowing an organic pigment to adhere onto the surface of white inorganic particles as the core particles through a gluing agent such as an alkoxysilane, by using a theoretical amount or more of an acid or an alkali capable of dissolving a whole amount of the white inorganic particles as the core particles, thereby causing the organic pigment to remain in the form of fine particles, as described in Comparative Examples below, since the acid or alkali is used in a theoretical amount or more, the organic pigment tends to be considerably damaged, so that it may be difficult to obtain such a colorant having a good light fastness and a good heat resistance. In addition, since silica is completely dissolved, the resultant colored fine particles tend to have a ζ potential close to zero, and therefore, hardly exhibit a good electrostatic repulsion effect in vehicles, so that it may be difficult to attain a good dispersibility and a good dispersion stability thereof in vehicles.

In the method for producing a pigment composition for a blue pixel portion of color filters as described in Japanese Patent Application Laid-open (KOKAI) No. 2006-091649 in which an ε-type copper phthalocyanine pigment as a fine organic pigment and a dioxazine violet pigment having an aspect ratio of 10:1 to 25:1 are subjected together to solvent/salt milling treatment, and in the method for producing an organic pigment in the form of fine particles as described in Japanese Patent Application Laid-open (KOKAI) No. 2005-307154 in which a solution prepared by dissolving the organic pigment in an alkali or acid aqueous medium is flowed in the form of a layered flow to change a pH value of the solution in the course of the layered flow, since these methods are wet treatments to be conducted in an aqueous system, a drying treatment is finally required. As a result, since the obtained particles tend to suffer from agglomeration upon drying, so that it may be difficult to obtain a colorant having a good dispersibility and a good dispersion stability in vehicles. Further, as described in Comparative Examples below, in these methods, the pigments are merely formed into fine particles, and therefore, it may be difficult to obtain a colorant for color filters, which is excellent in light fastness and heat resistance.

Also, in the transparent coloring composition as described in Japanese Patent Application Laid-open (KOKAI) No. 2004-307853 in which an organic and inorganic composite pigment having an average particle diameter of 1 to 100 nm which is composed of primary particles obtained by adhering an organic pigment onto the surface of white inorganic particles directly or through a surface modifying agent, is dispersed in a solvent, as described in Comparative Examples below, since the obtained composition is a transparent coloring composition containing the organic and inorganic composite pigment obtained using the white inorganic particles such as silica particles as core particles, it may be difficult to obtain such a coloring composition for color filters having a high tinting strength identical to or higher than that of the raw organic pigment adhered thereto.

In the aqueous recording solution for ink-jet printing as described in Japanese Patent Application Laid-open (KOKAI) Nos. 9-227812 (1997) and 2000-53901 which contains a pigment and colloidal silica, since the organic pigment itself has a ζ potential close to zero, and therefore, hardly exhibit an electrostatic repulsion effect in vehicles, so that it may be difficult to attain a good dispersibility and a good dispersion stability thereof in vehicles. In addition, since a large amount of colloidal silica having no tinting property is added to the solution, the resultant recording solution may fail to be increased in pigment concentration, so that it may be difficult to achieve a high image density of the obtained printed images.

Further, in the composite particles having an average particle diameter of 0.001 to 0.15 μm as described in Japanese Patent Application Laid-open (KOKAI) Nos. 2003-55591, 2003-268278, 2003-327880 and 2006-111875, in which a uniform adhered layer of an organic pigment is formed by adhering the organic pigment onto the surface of extender pigment particles through a gluing agent, as described in Comparative Examples below, since the white inorganic particles such as silica particles are used as core particles, it may be difficult to attain a high tinting strength identical to or higher than that of the raw organic pigment adhered thereto.

The present invention has been attained in view of the above problems. An object of the present invention is to provide colored composite microparticles having a fine primary particle diameter and exhibiting a high tinting strength, an excellent dispersibility and an excellent light fastness, a process for producing the colored composite microparticles and a dispersion prepared by dispersing the colored composite microparticles in a solvent. A further object of the present invention is to provide a colorant for color filters which has a fine primary particle diameter, exhibits a high tinting strength, and is excellent in light fastness, heat resistance and dispersibility in vehicles, as well as a coloring composition for color filters and a color filter. A still further object of the present invention is to provide a colorant for inks for ink-jet printing which has a fine primary particle diameter and a uniform particle size distribution, and exhibits a high tinting strength and an excellent light fastness, as well as an ink for ink-jet printing.

In the present invention, the above problems can be solved by eluting out a part of silica particle and at least a part of a surface modifying agent, which are contained in composite particles obtained by coating the surface of the silica particles with an organic pigment through the surface modifying agent.

That is, the present invention suitable for organic pigments provides the following three aspects 1 to 3.

In the first aspect of the present invention, there is provided colored composite microparticles comprising silica and an organic pigment, wherein the silica is enclosed in the organic pigment and contained in an amount of 0.001 to 9% by weight, calculated as Si, based on a weight of the colored composite microparticles.

In the second aspect of the present invention, there is provided a dispersion produced by dispersing in a solvent, the colored composite microparticles as defined in the first aspect which comprise silica and an organic pigment wherein the silica is enclosed in the organic pigment and contained in an amount of 0.001 to 9% by weight, calculated as Si, based on a weight of the colored composite microparticles.

In the third aspect of the present invention, there is provided a process for producing the colored composite microparticles as defined in the first aspect, the process comprising the steps of:

adding a surface modifying agent to silica particles;

mixing the surface modifying agent and the silica particles under stirring to coat surface of the silica particles with the surface modifying agent;

then adding an organic pigment to the silica particles coated with the surface modifying agent;

mixing the organic pigment and the coated silica particles under stirring to adhere the organic pigment onto surface of the coated silica particles, thereby obtaining composite particles; and dissolving out a part of the silica particles and at least a part of the surface modifying agent, which are contained in the resultant composite particles, with an alkali solution.

Also, the present invention suitable for colorants for color filters as well as color filters provides the following seven aspects 4 to 10.

In the fourth aspect of the present invention, there is provided a colorant for color filters which comprises colored composite microparticles comprising silica and an organic pigment wherein the silica is enclosed in the organic pigment and contained in an amount of 0.001 to 9% by weight, calculated as Si, based on a weight of the colored composite microparticles.

In the fifth aspect of the present invention, there is provided a coloring composition (a) for color filters produced by dispersing in a solvent, the colorant for color filters as defined in the fourth aspect which comprises colored composite microparticles comprising silica and an organic pigment wherein the silica is enclosed in the organic pigment and contained in an amount of 0.001 to 9% by weight, calculated as Si, based on a weight of the colored composite microparticles.

In the sixth aspect of the present invention, there is provided a coloring composition (b) for color filters produced by dispersing the coloring composition (a) for color filters as defined in the fifth aspect which is obtained by dispersing in a solvent, the colorant for color filters which comprises colored composite microparticles comprising silica and an organic pigment wherein the silica is enclosed in the organic pigment and contained in an amount of 0.001 to 9% by weight, calculated as Si, based on a weight of the colored composite microparticles, in a solution of a transparent resin containing an acid group and/or a latent acid group.

In the seventh aspect of the present invention, there is provided a coloring composition (C) for color filters comprising the coloring composition (b) for color filters as defined in the sixth aspect which composition (b) is produced by dispersing the coloring composition (a) for color filters which is obtained by dispersing in a solvent, the colorant for color filters which comprises colored composite microparticles comprising silica and an organic pigment wherein the silica is enclosed in the organic pigment and contained in an amount of 0.001 to 9% by weight, calculated as Si, based on a weight of the colored composite microparticles, in a solution of a transparent resin containing an acid group and/or a latent acid group; a polyfunctional monomer containing two or more ethylenically unsaturated double bonds; and a photo-radical polymerization initiator.

In the eighth aspect of the present invention, there is provided a coloring composition (D) for color filters comprising the coloring composition (b) for color filters as defined in the sixth aspect which composition (b) is produced by dispersing the coloring composition (a) for color filters which is obtained by dispersing in a solvent, the colorant for color filters which comprises colored composite microparticles comprising silica and an organic pigment wherein the silica is enclosed in the organic pigment and contained in an amount of 0.001 to 9% by weight, calculated as Si, based on a weight of the colored composite microparticles, in a solution of a transparent resin containing an acid group and/or a latent acid group; and a photo-acid generator.

In the ninth aspect of the present invention, there is provided a color filter comprising a film-shaped product formed from the coloring composition (b) for color filters as defined in the sixth aspect which composition (b) is produced by dispersing the coloring composition (a) for color filters which is obtained by dispersing in a solvent, the colorant for color filters which comprises colored composite microparticles comprising silica and an organic pigment wherein the silica is enclosed in the organic pigment and contained in an amount of 0.001 to 9% by weight, calculated as Si, based on a weight of the colored composite microparticles, in a solution of a transparent resin containing an acid group and/or a latent acid group.

In the tenth aspect of the present invention, there is provided a color filter comprising a film-shaped product formed from the coloring composition (C) for color filters as defined in the seventh aspect or the coloring composition (D) for color filters as defined in the eighth aspect.

In addition, the present invention suitable for colorants for inks for ink-jet printing as well as inks for ink-jet printing provides the following two aspects 11 and 12.

In the eleventh aspect of the present invention, there is provided a colorant for inks for ink-jet printing, comprising colored composite microparticles comprising silica and an organic pigment wherein the silica is enclosed in the organic pigment and contained in an amount of 0.001 to 9% by weight, calculated as Si, based on a weight of the colored composite microparticles.

In the twelfth aspect of the present invention, there is provided an ink for ink-jet printing, comprising the colorant for inks for ink-jet printing as defined in the eleventh aspect which comprises colored composite microparticles comprising silica and an organic pigment wherein the silica is enclosed in the organic pigment and contained in an amount of 0.001 to 9% by weight, calculated as Si, based on a weight of the colored composite microparticles.

DETAILED DESCRIPTION OF THE INVENTION

First, the colored composite microparticles according to the first aspect of the present invention is explained. The colored composite microparticles according to the first aspect of the present invention are in the form of composite particles comprising silica and an organic pigment wherein the silica is enclosed in the organic pigment, and the content of the silica is 0.001 to 9% by weight (calculated as Si) based on the weight of the composite particles.

The content of the silica in the colored composite microparticles is usually 0.001 to 9% by weight, preferably 0.005 to 7.0% by weight and more preferably 0.01 to 5.0% by weight (calculated as Si) based on the weight of the colored composite microparticles. When the content of the silica is less than 0.001% by weight (calculated as Si) based on a weight of the colored composite microparticles, since the amount of the silica enclosed in the colored composite microparticles is too small, the ζ potential of the colored composite microparticles tends to be substantially zero, thereby failing to attain a good electrostatic repulsion effect thereof. As a result, the obtained composite particles tend to be deteriorated in dispersibility in vehicles. Further, since substantially no silica is present in the composite particles, the obtained composite particles may fail to exhibit sufficient light fastness and heat resistance. On the other hand, when the content of the silica in the colored composite microparticles is more than 9.0% by weight, since the amount of the silica enclosed in the colored composite microparticles is too large, it may be difficult to obtain colored composite microparticles exhibiting a sufficient tinting strength.

As the organic pigment, there may be used various alkali-resisting organic pigments usable as colorants for paints, resins, printing inks, inks for ink-jet printing, toners, color filters, etc., such as organic red-based pigments, organic blue-based pigments, organic yellow-based pigments, organic green-based pigments, organic orange-based pigments, organic brown-based pigments, organic violet-based pigments and organic black-based pigments. Specific examples of the organic red-based pigments may include azo-based pigments such as brilliant carmine, permanent red and condensed azo red; condensed polycyclic-based pigments such as diaminoanthraquinolyl red, quinacridone red, thioindigo red, perylene red, perinone red and diketopyrrolopyrrole red; or the like. Specific examples of the organic blue-based pigments may include phthalocyanine-based pigments such as metal-free phthalocyanine blue, phthalocyanine blue and fast sky blue; condensed polycyclic-based pigments such as indanthron blue and indigo blue; or the like. Specific examples of the organic yellow-based pigments may include azo-based pigments such as Hanza yellow, benzidine yellow, permanent yellow and condensed azo yellow; condensed polycyclic-based pigments such as isoindolinone yellow, anthrapyrimidine yellow and quinophthalone yellow; or the like. Specific examples of the organic green-based pigments may include phthalocyanine-based pigments such as phthalocyanine green; or the like. Specific examples of the organic orange-based pigments may include azo-based pigments such as permanent orange, lithol fast orange, pyrazolone orange and vulcan fast orange; condensed polycyclic-based pigments such as quinacridone, perylene orange and diketopyrrolopyrrole orange; or the like. Specific examples of the organic brown-based pigments may include azo-based pigments such as permanent brown, para-brown and benzoimidazolone brown; condensed polycyclic-based pigments such as thioindigo brown; or the like. Specific examples of the organic violet-based pigments may include azo-based pigments such as fast violet; condensed polycyclic-based pigments such as unsubstituted quinacridone, dioxazine violet and perylene violet; or the like. Specific examples of the organic black-based pigments may include condensed polycyclic-based pigments such as perylene black; aniline black; or the like.

The colored composite microparticles of the present invention have an average primary particle diameter of usually 1 to 50 nm, preferably 1 to 40 nm and more preferably 1 to 30 nm.

The colored composite microparticles of the present invention have a number-average particle diameter of usually not more than 200 nm, preferably 1 to 150 nm, more preferably 1 to 100 nm and still more preferably 1 to 50 nm. When the number-average particle diameter of the colored composite microparticles is more than 200 nm, the resultant particles tend to be deteriorated in optical properties because of too large particle size thereof, thereby failing to achieve the objects of the present invention.

The colored composite microparticles of the present invention have a volume-average particle diameter of usually not more than 200 mm, preferably 1 to 150 nm and more preferably 1 to 100 nm. When the volume-average particle diameter of the colored composite microparticles is more than 200 nm, the resultant particles tend to be deteriorated in optical properties because of too large particle size thereof, thereby failing to achieve the objects of the present invention.

The colored composite microparticles of the present invention have a BET specific surface area value of usually 20 to 500 $m^2/g$, preferably 25 to 400 $m^2/g$ and more preferably 30 to 300 $m^2/g$.

The colored composite microparticles of the present invention have a tinting strength of usually not less than 102%, preferably not less than 103% and more preferably not less than 104% as measured by the below-mentioned evaluation method.

As to the light fastness of the colored composite microparticles of the present invention, the $\Delta E^*$ value thereof is usually not more than 5.0, preferably not more than 4.5 and more preferably not more than 4.0 as measured by the below-mentioned evaluation method.

The $\zeta$ potential of the colored composite microparticles of the present invention when measured in an aqueous system, is usually not more than –5 mV, preferably not more than –8 mV and more preferably not more than –10 mV. When the $\zeta$ potential of the colored composite microparticles as measured in an aqueous system is more than –5 mV and close to zero, it may be difficult to attain a good electrostatic repulsion effect thereof, thereby failing to show a good dispersibility and a good dispersion stability.

The $\zeta$ potential of the colored composite microparticles of the present invention when measured in a solvent system, is usually not more than –2 mV, preferably not more than –3 mV and more preferably not more than –5 mV. When the $\zeta$ potential of the colored composite microparticles as measured in a solvent system is more than –2 mV and close to zero, it may be difficult to attain a good electrostatic repulsion effect thereof, thereby failing to show a good dispersibility.

Meanwhile, the surface modifying agent may still remain on the surface of the silica particles enclosed in the colored composite microparticles.

Next, the dispersion according to the second aspect of the present invention is explained. The dispersion according to the second aspect of the present invention is formed by dispersing in a solvent, the colored composite microparticles as defined in the first aspect which comprise silica and an organic pigment wherein the silica is enclosed in the organic pigment and contained in an amount of 0.001 to 9% by weight, calculated as Si, based on the weight of the colored composite microparticles.

The amount of the colored composite microparticles contained in the dispersion is usually 3 to 300 parts by weight, preferably 4 to 150 parts by weight, more preferably 5 to 100 parts by weight, still more preferably 5 to 75 parts by weight and most preferably 5 to 50 parts by weight based on 100 parts by weight of a dispersion base material. The dispersion base material comprises water and/or a water-soluble organic solvent, or an organic solvent, and may also contain, if required, resins, a defoaming agent, an extender pigment, a drying accelerator, a surfactant, a hardening accelerator, other assistants, etc. The amounts of the resins, defoaming agent, extender pigment, drying accelerator, surfactant, hardening accelerator, other assistants, etc., contained in the dispersion base material may be appropriately determined depending upon use and applications of the dispersion, and are usually not more than 95% by weight.

Examples of the solvent used in a water-based dispersion may include mixed solvents of water and a water-soluble solvent ordinarily used for water-based paints, etc. Specific examples of the water-soluble solvent may include alcohol-based solvents such as ethyl alcohol, propyl alcohol and butyl alcohol; glycol ether-based solvents such as methyl cellosolve, ethyl cellosolve, propyl cellosolve and butyl cellosolve; oxyethylene or oxypropylene addition polymers such as diethyleneglycol, triethyleneglycol, polyethyleneglycol, dipropyleneglycol, tripropyleneglycol and polypropyleneglycol; alkyleneglycols such as ethyleneglycol, propyleneglycol and 1,2,6-hexanetriol; glycerol; 2-pyrrolidone; or the like.

Examples of the solvent used in a solvent-based dispersion may include aromatic hydrocarbons such as toluene and xylene; ketones such as methyl ethyl ketone and cyclohexanone; amides such as N,N-dimethylformamide, N,N-dimethylacetamide and N-methylpyrrolidone; ether alcohols such as ethyleneglycol monomethyl ether, ethyleneglycol monoethyl ether, diethyleneglycol monomethyl ether, propyleneglycol monomethyl ether and propyleneglycol monoethyl ether; ether acetates such as ethyleneglycol monomethyl ether acetate, ethyleneglycol monoethyl ether acetate, propyleneglycol monomethyl ether acetate and propyleneglycol monoethyl ether acetate; acetic acid esters such as ethyl acetate, butyl acetate and isobutyl acetate; lactic acid esters such as methyl lactate, ethyl lactate and propyl lactate; cyclic esters such as ethylene carbonate, propylene carbonate and γ-butyrolactone; or the like. In particular, when using the organic solvents having a high polarity such as typically alcohols, ether alcohols and ether acetates, the resultant dispersion can exhibit a good electrostatic repulsion effect. These solvents may be used in the form of a mixture of any two or more thereof.

The dispersion of the present invention have a number-average dispersed particle diameter of usually 1 to 200 nm, preferably 1 to 150 nm, more preferably 1 to 100 nm and still more preferably 1 to 50 nm. When the number-average dispersed particle diameter of the dispersion is more than 200 nm, it may be difficult to achieve the objects of the present invention owing to a too large particle size of the particles dispersed therein.

The dispersion of the present invention have a volume-average dispersed particle diameter of usually 1 to 200 nm, preferably 1 to 150 nm and more preferably 1 to 100 nm. When the volume-average dispersed particle diameter of the dispersion is more than 200 nm, it may be difficult to achieve the objects of the present invention owing to a too large particle size of the particles dispersed therein.

As to the dispersion stability of the dispersion of the present invention, when visually observing a degree of precipitation of the particles dispersed therein according to the below-mentioned evaluation methods, the degree of precipitation is usually Rank 3, 4 or 5 and preferably Rank 4 or 5. Also, a rate of change (percentage of change) in viscosity of the dispersion is usually not more than 20% and preferably not more than 10%. When the degree of precipitation of the particles as visually observed is Rank 1 or 2 or when the rate of change in viscosity of the dispersion is more than 20%, it may be difficult to preserve the dispersion under a stable dispersed condition for a long period of time.

The specific absorption coefficient $\epsilon_w$ (on the weight basis) representing a tinting strength of the dispersion of the present invention is usually not less than 1.20, preferably 1.40 to 5.00 and more preferably 1.50 to 5.00 as measured by the below-mentioned evaluation method.

Next, the process for producing the colored composite microparticles according to the third aspect of the present invention is explained. The process or producing the colored composite microparticles according to the third aspect of the present invention includes the steps of (1) adding a surface modifying agent to silica particles; (2) mixing the surface modifying agent and the silica particles under stirring to coat the surface of the silica particles with the surface modifying agent; (3) then adding an organic pigment to the silica particles coated with the surface modifying agent; (4) mixing the organic pigment and the coated silica particles under stirring to adhere the organic pigment onto the surface of the coated silica particles, thereby obtaining composite particles; and (5) dissolving out a part of the silica particles and at least a part of the surface modifying agent which are contained in the resultant composite particles, with an alkali solution.

First, the silica particles, the surface modifying agent and the organic pigment used in the present invention are explained.

The silica particles used in the present invention have an average primary particle diameter of usually 1 to 100 nm, preferably 1 to 50 nm and more preferably 1 to 30 nm.

The silica particles used in the present invention have a BET specific surface area value of usually 10 to 1000 m²/g and preferably 15 to 500 m²/g.

The surface modifying agent used in the present invention is not particularly limited as long as the organic pigment can be adhered onto the surface of the silica particles through the surface modifying agent. Examples of the surface modifying agent may include organosilicon compounds such as alkoxysilanes, silane-based coupling agents and organopolysiloxanes; coupling agents such as titanate-based coupling agents, aluminate-based coupling agents and zirconium-based coupling agents; low-molecular weight or high-molecular weight surfactants; or the like. Among these surface modifying agents, preferred are organosilicon compounds such as alkoxysilanes, silane-based coupling agents and organopolysiloxanes.

Specific examples of the organosilicon compounds may include alkoxysilanes such as methyltriethoxysilane, dimethyldiethoxysilane, phenyltriethoxysilane, diphenyldiethoxysilane, methyltrimethoxysilane, dimethyldimethoxysilane, phenyltrimethoxysilane, diphenyldimethoxysilane, ethyltriethoxysilane, propyltriethoxysilane, butyltriethoxysilane, isobutyltrimethoxysilane, hexyltriethoxysilane, octyltriethoxysilane and decyltriethoxysilane; silane-based coupling agents such as vinyltrimethoxysilane, vinyltriethoxysilane, γ-aminopropyltriethoxysilane, γ-glycidoxypropyltriethoxysilane, γ-mercaptopropyltrimethoxysilane, γ-methacryloyloxypropyltrimethoxysilane, N-(β-aminoethyl)-γ-aminopropyltrimethoxysilane, γ-glycidoxypropylmethyldimethoxysilane and γ-chloropropyltrimethoxysilane; organopolysiloxanes such as polysiloxane, methylhydrogenpolysiloxane and modified polysiloxanes; or the like.

Specific examples of the titanate-based coupling agents may include isopropyltrisstearoyl titanate, isopropyltris(dioctylpyrophosphate)titanate, isopropyltri(N-aminoethyl-aminoethyl)titanate, tetraoctylbis(ditridecylphosphate)titanate, tetra(2,2-diallyloxymethyl-1-butyl)bis(ditridecyl)phosphate titanate, bis(dioctylpyrophosphate)oxyacetate titanate, bis (dioctylpyrophosphate)ethylene titanate, or the like.

Specific examples of the aluminate-based coupling agents may include acetoalkoxyaluminum diisopropylate, aluminum diisopropoxymonoethylacetoacetate, aluminum tris-ethylacetoacetate, aluminum trisacetylacetonate or the like.

Specific examples of the zirconate-based coupling agents may include zirconium tetrakisacetylacetonate, zirconium dibutoxybisacetylacetonate, zirconium tetrakisethylacetoacetate, zirconium tributoxymonoethylacetoacetate, zirconium tributoxyacecylacetonate, or the like.

Specific examples of the low-molecular weight surfactants may include alkylbenzenesulfonic acid salts, dioctylsulfonesuccinic acid salts, alkylamineacetic acid salts, alkyl fatty acid salts or the like. Specific examples of the high-molecular weight surfactants may include polyvinyl alcohol, polyacrylic acid salts, carboxymethyl cellulose, acrylic acid-maleic acid salt copolymers, olefin-maleic acid salt copolymers or the like.

The surface modifying agent is coated in an amount of usually 0.05 to 15.0% by weight, preferably 0.1 to 12.0% by weight and more preferably 0.15 to 10.0% by weight (calculated as C) based on the weight of the silica particles as core particles. When the coating amount of the surface modifying agent lies within 0.05 to 15.0% by weight, the organic pigment can be adhered onto the surface of the silica particles in an amount of usually 10 to 500 parts by weight based on 100 parts by weight of the silica particles.

As the organic pigment to be adhered, there may be used various organic pigments such as the organic red-based pigments, the organic blue-based pigments, the organic yellow-based pigments, the organic green-based pigments, the organic orange-based pigments, the organic brown-based pigments, the organic violet-based pigments and the organic black-based pigments as described previously. However, upon producing the colored composite microparticles of the present invention, it is disadvantageous to use the organic pigments having a low alkali resistance such as alkali blue and isoindoline-based organic pigments, because if these organic pigments are contained in the composite particles, the pigments tend to be dissolved out therefrom when subjecting the composite particles to the below-mentioned treatment for dissolving the silica particles with an alkali.

The amount of the organic pigment added is usually 10 to 500 parts by weight, preferably 30 to 400 parts by weight and more preferably 50 to 300 parts by weight based on 100 parts by weight of the silica particles as core particles.

The composite particles used in the present invention can be produced, as described above, by (1) adding the surface modifying agent to the silica particles; (2) mixing the surface modifying agent and the silica particles under stirring to coat the surface of the silica particles with the surface modifying agent; (3) adding the organic pigment to the obtained silica particles coated with the surface modifying agent; and (4) mixing the organic pigment and the coated silica particles under stirring to adhere the organic pigment onto the surface of the silica particles coated with the surface modifying agent. Meanwhile, a substantially whole amount of the surface modifying agent added can be coated onto the surface of the silica particles.

The mixing and stirring of the silica particles and the surface modifying agent, or the mixing and stirring of the organic pigment and the silica particles whose surface is coated with the surface modifying agent, may be preferably carried out using an apparatus capable of applying a shear force to the particles, especially such an apparatus capable of simultaneously effecting shear action, spatula stroking and compression. Examples of the apparatus may include wheel-type kneaders, ball-type kneaders, blade-type kneaders, roll-type kneaders or the like. Among these apparatuses, the wheel-type kneaders are preferred to effectively practice the present invention.

Specific examples of the wheel-type kneaders may include edge runners (similar in meaning to mix muller, Simpson mill and sand mill), multimill, Stotz mill, wet pan mill, corner mill, ring muller or the like. Among these wheel-type kneaders, the preferred kneaders are edge runners, multimill, Stotz mill, wet pan mill and ring muller, and the more preferred kneaders are edge runners. Specific examples of the ball-type kneaders may include vibration mill or the like. Specific examples of the blade-type kneaders may include Henschel mixer, planetary mixer, Nauter mixer or the like. Specific examples of the roll-type kneaders may include extruders or the like.

The conditions of mixing and stirring of the silica particles and the surface modifying agent, for example, when using the edge runner as the apparatus capable of simultaneously effecting shear action, spatula stroking and compression, may be selected so as to uniformly coat the surface of the silica particles with the surface modifying agent. More specifically, the mixing and stirring conditions may be appropriately controlled such that the linear load is usually 19.6 to 1,960 N/cm (2 to 200 kg/cm), preferably 98 to 1,470 N/cm (10 to 150 kg/cm), more preferably 147 to 980 N/cm (15 to 100 kg/cm); the treating time is usually 5 min to 24 hr, preferably 10 min to 20 hr; and the stirring speed is usually 2 to 2,000 rpm, preferably 5 to 1,000 rpm and more preferably 10 to 800 rpm.

The organic pigment may be added slowly and little by little for a period of usually about 5 min to 24 hr and preferably about 5 min to 20 hr. Alternatively, 5 to 25 parts by weight of the organic pigment may be added several times to 100 parts by weight of the silica particles until the amount of the organic pigment added reaches the desired amount.

The conditions of mixing and stirring of the silica particles whose surface is coated with the surface modifying agent, and the organic pigment, for example, when using the edge runner as the apparatus capable of simultaneously effecting shear action, spatula stroking and compression, may be appropriately selected so as to uniformly adhere the organic pigment on the coated silica particles. More specifically, the mixing and stirring may be controlled such that the linear load is usually 19.6 to 1,960 N/cm (2 to 200 kg/cm), preferably 98 to 1,470 N/cm (10 to 150 kg/cm) and more preferably 147 to 980 N/cm (15 to 100 kg/cm); the treating time is usually 5 min to 24 hr and preferably 10 min to 20 hr; and the stirring speed is usually 2 to 2,000 rpm, preferably 5 to 1,000 rpm and more preferably 10 to 800 rpm.

After adhering the organic pigment onto the surface of the silica particles coated with the surface modifying agent, the resultant particles may be subjected to drying or heating treatment, if required. The heating temperature used in the drying or heating treatment is usually 40 to 150° C. and preferably 60 to 120° C., and the heating time is usually 10 min to 12 hr and preferably 30 min to 3 hr.

The thus obtained composite particles have an average primary particle diameter of usually 1 to 100 nm, preferably 1 to 50 nm and more preferably 1 to 30 nm.

The composite particles have a BET specific surface area value of usually 10 to 500 m$^2$/g, preferably 15 to 400 m$^2$/g and more preferably 20 to 300 m$^2$/g.

The degree of desorption of the organic pigment from the composite particles is usually Rank 4 or 3 and preferably Rank 4 when evaluated by the below-mentioned visual observation method. When the desorption degree of the organic pigment is Rank 2 or 1, the desorbed organic pigment tends to form coarse particles owing to recrystallization or agglomeration thereof and the thus formed coarse particles tends to be mixed in the colored composite microparticles as a final product, thereby failing to achieve the objects of the prevent invention.

The colored composite microparticles of the present invention can be produced by (5) treating the above composite particles with an alkali solution to dissolve out a part of the silica particles and at least a part of the surface modifying agent from the composite particles, so as to allow a part of the silica component or a part of the silica component and the surface modifying agent to remain in the composite particles.

Examples of the alkali solution used may include an aqueous sodium hydroxide solution, an aqueous potassium hydroxide solution, ammonia, or the like.

The concentration of the composite particles contained in the dissolution solution to be subjected to the dissolution treatment is usually 1.0 to 30.0 parts by weight, preferably 2.5 to 25.0 parts by weight and more preferably 5.0 to 20.0 parts by weight based on 100 mL of water.

The amount of the alkali contained in the treating solution to be subjected to the dissolution treatment is usually 0.01 to 0.95 time, preferably 0.02 to 0.90 time and more preferably 0.05 to 0.85 time the amount of alkali required to dissolve whole amounts of the silica particles and the surface modifying agent. When the amount of the alkali contained in the treating solution is more than 0.95 time, the silica particles and the surface modifying agent tend to be completely dissolved from the composite particles, thereby failing to obtain the colored composite microparticles as aimed by the present invention. On the other hand, when the amount of the alkali contained in the treating solution is less than 0.01 time, it tends to take a very long time until the silica particles or both the silica particles and the surface modifying agent are dissolved out such that the content thereof in the colored composite microparticles reaches 9% by weight or less, resulting in industrially disadvantageous process.

The pH value of the treating solution to be subjected to the dissolution treatment is usually 10.0 to 13.8, preferably 11.0 to 13.6 and more preferably 11.5 to 13.4. When the pH value of the treating solution is more than 13.8, the organic pigment tends to be considerably damaged by the alkali, so that it may be difficult to obtain the colored composite microparticles having a good light fastness and a good heat resistance. When the pH value of the treating solution is less than 10.0, it tends to take a very long time until the silica particles or both the silica particles and the surface modifying agent are dissolved out such that the content thereof in the colored composite microparticles reaches 9% by weight or less, resulting in industrially disadvantageous process.

The dissolution treatment temperature is usually 40 to 100° C., preferably 45 to 90° C. and more preferably 50 to 80° C. When the dissolution treatment temperature is less than 40° C., the dissolution treatment tends to require a prolonged time such as more than 50 hr, resulting in industrially disadvantageous process. When the dissolution treatment temperature is more than 100° C., it may be difficult to obtain the colored composite microparticles having a good light fastness and a good heat resistance because of severe damage to the organic pigment, and the use of a special apparatus such as an autoclave tends to be required, resulting in industrially disadvantageous process.

The dissolution treatment time is usually 5 min to 50 hr, preferably 10 min to 30 hr and more preferably 20 min to 10 hr. The dissolution treatment time as long as more than 50 hr tends to result in industrially disadvantageous process.

After completion of the dissolution treatment, a solid component is separated from the dissolution solution by filtration, and then subjected to washing and then ordinary drying or freeze-drying, thereby obtaining the colored composite microparticles. The thus obtained colored composite microparticles of the present invention can be readily dispersed owing to a good electrostatic repulsion effect of the silica or both the silica and the surface modifying agent contained therein even when merely dried by an ordinary drying method.

Next, the process for producing the dispersion according to the second aspect of the present invention is explained.

The water-based dispersion of the present invention may be produced by re-dispersing the thus obtained composite microparticles in water or a mixture of water and a water-soluble organic solvent, or by subjecting the composite particles to dissolution treatment, separating a solid component from the dissolution solution by filtration, washing the thus separated solid component with water, and then dispersing the solid component recovered without drying in water or the water-soluble organic solvent. Additives such as resins, a dispersant, a defoaming agent and a surfactant may be added to the dispersion, if required.

The solvent-based dispersion of the present invention may be produced by re-dispersing the above obtained composite microparticles in an organic solvent or an oil vehicle, or by subjecting the composite particles to dissolution treatment, separating a solid component from the dissolution solution by filtration, washing the thus separated solid component with water, flashing the solid component with an organic solvent or an oil vehicle, and then dispersing the thus treated solid component in the organic solvent or the oil vehicle. Additives such as resins, a dispersant, a defoaming agent, an extender pigment, a drying accelerator, a surfactant, an hardening accelerator and other assistants may be added to the dispersion, if required.

The mixing and dispersing of the colored composite microparticles and the solvent may be conducted using a ball mill, a beads mill, a sand mill, an edge runner, an ultrasonic dispersing apparatus, a twin or triple roll mill, an extruder, a high-speed impact mill, or the like. As a grinding medium for grinding-type mills such as the ball mill and beads mill, there may be used steel beads, glass beads, ceramic beads, etc., according to the kind of material of the mill used. The size of the grinding medium is usually 0.01 to 10 mm and preferably 0.03 to 3 mm. The grinding temperature is not particularly limited, and may be controlled, for example, to the range of from room temperature to a boiling point of the solvent used.

Next, the colorant for color filters according to the fourth aspect of the present invention is explained. The colorant for color filters according to the fourth aspect of the present invention comprises colored composite microparticles comprising silica and an organic pigment wherein the silica is enclosed in the organic pigment and contained in an amount of 0.001 to 9% by weight, calculated as Si, based on the weight of the colored composite microparticles.

As to the heat resistance of the colorant for color filters according to the present invention, the ΔE* value thereof is usually not more than 5.0, preferably not more than 4.5 and more preferably not more than 4.0 as measured by the below-mentioned evaluation method.

Meanwhile, the colorant for color filters according to the present invention has the substantially same silica content, average primary particle diameter, number-average particle diameter, volume-average particle diameter, BET specific surface area value, tinting strength, light fastness, ζ potential in a water-based system and ζ potential in a solvent-based system as those of the colored composite microparticles according to the first aspect of the present invention.

Next, the coloring composition (a) for color filters according to the fifth aspect of the present invention is explained. The coloring composition (a) for color filters according to the fifth aspect of the present invention comprises the colorant for color filters which comprises colored composite microparticles comprising silica and an organic pigment wherein the silica is enclosed in the organic pigment and contained in an amount of 0.001 to 9% by weight, calculated as Si, based on the weight of the colored composite microparticles, and a coloring composition base material.

The coloring composition base material comprises a solvent and may also optionally contain additives such as a dispersant, a pigment derivative, a defoaming agent and a surfactant according to the requirements.

The content of the colorant for color filters in the coloring composition for color filters is usually 3 to 300 parts by weight, preferably 4 to 200 parts by weight and more preferably 5 to 150 parts by weight based on 100 parts by weight of the coloring composition base material. The content of the additives in the coloring composition base material is usually not more than 60% by weight.

Any solvent may be appropriately used in the coloring composition of the present invention as long as it is capable of suitably dissolving or dispersing the colorant for color filters, the transparent resin, the polyfunctional monomer containing two or more ethylenically unsaturated double bonds, the photo-polymerization initiator and the photo-acid generator therein, and being volatilized and removed from the composition after coating.

Examples of the solvent may include water; aromatic hydrocarbons such as toluene and xylene; ketones such as methyl ethyl ketone and cyclohexanone; amides such as N,N-dimethylformamide, N,N-dimethylacetamide and N-methyl pyrrolidone; ether alcohols such as ethyleneglycol monomethyl ether, ethyleneglycol monoethyl ether, diethyleneglycol monomethyl ether, propyleneglycol monomethyl ether and propyleneglycol monoethyl ether; ether acetates such as ethyleneglycol monomethyl ether acetate, ethyleneglycol monoethyl ether acetate, propyleneglycol monomethyl ether acetate and propyleneglycol monoethyl ether acetate; acetic acid esters such as ethyl acetate, butyl acetate and isobutyl acetate; lactic acid esters such as methyl lactate, ethyl lactate and propyl lactate; cyclic esters such as ethylene carbonate, propylene carbonate and γ-butyrolactone; or the like. These solvents may be used in the form of a mixture of any two or more thereof.

Examples of the dispersant usable in the present invention may include anionic surfactants such as ammonium laurylsulfate and polyoxyethylene alkylethersulfates; cationic surfactants such as stearylamine acetate and lauryltrimethyl ammonium chloride; amphoteric surfactants such as lauryldimethylamine oxide and laurylcarboxymethylhydroxyethyl imidazolium betaine; nonionic surfactants such as polyoxyethylene lauryl ether, polyoxyethylene stearyl ether and sorbitan monostearate; or the like. These dispersants may be used in the form of a mixture of any two or more thereof.

In particular, when water is used as the solvent, the preferred dispersants are anionic surfactants, nonionic surfactants, cationic surfactants, sodium naphthalenesulfonate formalin condensates and acetylene glycol-based dispersants.

The number-average dispersed particle diameter of the coloring composition (a) for color filters is usually 1 to 200 nm, preferably 1 to 150 nm, more preferably 1 to 100 nm and still more preferably 1 to 50 nm. When the number-average dispersed particle diameter of the coloring composition is more than 200 nm, the resultant composition tends to be deteriorated in optical properties owing to a too large particle size of the particles dispersed therein, thereby failing to achieve the objects of the present invention.

The volume-average dispersed particle diameter of the coloring composition (a) for color filters is usually 1 to 200 nm, preferably 1 to 150 nm and more preferably 1 to 100 nm. When the volume-average dispersed particle diameter of the coloring composition is more than 200 nm, the resultant composition tends to be deteriorated in optical properties owing to a too large particle size of the particles dispersed therein, thereby failing to achieve the objects of the present invention.

As to the dispersion stability of the coloring composition (a) for color filters, the rate of change in viscosity thereof is usually not more than 20% and preferably not more than 10% as measured by the below-mentioned evaluation method. When the rate of change in viscosity of the coloring composition is more than 20%, the resultant composition may fail to maintain a good dispersibility under a stable dispersing condition for a long period of time.

When the coloring composition (a) for color filters is a green-based composition, the light transmittance at 530 nm of the coloring composition (a) is usually not less than 65%, preferably not less than 70% and more preferably not less than 75%. Also, the specific absorption coefficient at 650 nm (on the weight basis) of the coloring composition (a) is usually 1.05 to 5.00, preferably 1.10 to 5.00 and more preferably 1.20 to 5.00 as measured by the below-mentioned evaluation method.

When the coloring composition (a) for color filters is a blue-based composition, the light transmittance at 460 nm of the coloring composition (a) is usually not less than 65%, preferably not less than 70% and more preferably not less than 75%. Also, the specific absorption coefficient at 610 nm (on the weight basis) of the coloring composition (a) is usually 1.05 to 5.00, preferably 1.10 to 5.00 and more preferably 1.20 to 5.00 as measured by the below-mentioned evaluation method.

When the coloring composition (a) for color filters is a red-based composition, the light transmittance at 620 nm of the coloring composition (a) is usually not less than 65%, preferably not less than 70% and more preferably not less than 75%. Also, the specific absorption coefficient at 550 nm (on the weight basis) of the coloring composition (a) is usually 1.05 to 5.00, preferably 1.10 to 5.00 and more preferably 1.20 to 5.00 as measured by the below-mentioned evaluation method.

When the coloring composition (a) for color filters is a yellow-based composition, the light transmittance at 550 nm of the coloring composition (a) is usually not less than 65%, preferably not less than 70% and more preferably not less than 75%. Also, the specific absorption coefficient at 400 nm (on the weight basis) of the coloring composition (a) is usually 1.05 to 5.00, preferably 1.10 to 5.00 and more preferably 1.20 to 5.00 as measured by the below-mentioned evaluation method.

Next, the coloring composition (b) for color filters according to the sixth aspect of the present invention is explained. The coloring composition (b) for color filters according to the sixth aspect of the present invention comprises the coloring composition (a) for color filters which comprises the colorant for color filters which comprises colored composite microparticles comprising silica and an organic pigment wherein the silica is enclosed in the organic pigment, and contained in an amount of 0.001 to 9% by weight, calculated as Si, based on the weight of the colored composite microparticles, and the coloring composition base material; and a transparent resin containing an acid group and/or a latent acid group.

The transparent resin used in the present invention is not particularly restricted as long as the resin is soluble in an alkali developing solution, has no absorption band in a visible wavelength range, and exhibits a good film-forming property. Examples of the transparent resin may include polymers substituted with at least one acid group, or polymers having at least one latent acid group capable of being converted into an acid group by deblocking reaction due to the effect of an acid. Examples of the acid group usable in the present invention may include a phenolic hydroxyl group, a carboxyl group or the like. The amount of the acid group and/or latent acid group introduced is not particularly limited, and may be appropriately adjusted so as to attain a suitable solubility of the transparent resin in an aqueous alkali solution.

Examples of the transparent resin having a phenolic hydroxyl group may include novolak resins, homopolymers or copolymers of 4-hydroxystyrene, or the like.

Examples of the transparent resin having a carboxyl group may include vinyl-based copolymers of an ethylenically unsaturated monomer containing a carboxyl group with the other copolymerizable unsaturated monomer. Examples of the ethylenically unsaturated monomer having a carboxyl group may include acrylic acid, methacrylic acid, 2-acryloyloxyethyl phthalate, 2-acryloyloxypropyl phthalate, maleic acid, maleic anhydride, itaconic acid, itaconic anhydride, or the like. Examples of the other unsaturated monomer copolymerizable with the monomer having a carboxyl group may include methyl(meth)acrylate, ethyl(meth)acrylate, propyl (meth)acrylate, butyl(meth)acrylate, cyclohexyl(meth)acrylate, isobornyl(meth)acrylate, 2-hydroxyethyl(meth)acrylate, 2-hydroxypropyl(meth)acrylate, benzyl(meth)acrylate, phenyl(meth)acrylate, 2-ethoxyethyl(meth)acrylate, 2-phenoxyethyl(meth)acrylate, 2-(N,N-dimethylamino)ethyl (meth)acrylate, glycidyl(meth)acrylate, (meth)acrylonitrile, (meth)acrylamide, (meth)acryloyl morpholide, N-methyl maleimide, N-phenyl maleimide, N-cyclohexyl maleimide, styrene, 4-vinyl toluene, vinyl acetate, vinyl methyl ether, or the like.

The molar ratio of the carboxyl-containing ethylenically unsaturated monomer to the transparent resin is usually 0.005 to 0.5, preferably 0.05 to 0.4. When the molar ratio of the carboxyl-containing ethylenically unsaturated monomer is less than 0.05, the resultant copolymer tends to be deteriorated in solubility in the aqueous alkali solution, resulting in occurrence of fouling or scumming upon patterning. When the molar ratio of the carboxyl-containing ethylenically unsaturated monomer is more than 0.5, a coating film obtained from the resultant photosensitive composition tends to be undesirably swelled at insolubilized exposed portions thereof upon the alkali development after exposure to light, resulting in deterioration in definition or resolution as well as surface smoothness of the obtained coating film.

As the carboxyl-containing transparent resin, there may be used polyamic acids obtained by polyaddition reaction of tetracarboxylic dianhydride and diamine. Examples of the tetracarboxylic dianhydride may include 1,2,3,4-cyclobutanetetracarboxylic dianhydride, 1,2,3,4-cyclopentanetetracarboxylic dianhydride, 1,2,3,5-cyclopentanetetracarboxylic dianhydride, 1,2,4,5-bicyclohexenetetracarboxylic dianhydride, 3,3',4,4'-benzophenonetetracarboxylic dianhydride, pyromellitic dianhydride, 3,3',4,4'-diphenylsulfonetetracarboxylic dianhydride, 3,3',4,4'-biphenyltetracarboxylic dianhydride or the like. Also, these tetracarboxylic dianhydrides may be used in the form of a mixture of any two or more thereof. Examples of the diamines reacted with these tetracarboxylic dianhydrides may include ethylenediamine, 1,3-diaminocyclohexane, 1,4-diaminocyclohexane, 4,4'-diaminodiphenyl ether, 3,4'-diaminodiphenyl ether, 4,4'-diaminodiphenyl methane, 3,3'-diaminodiphenyl methane, 4,4'-diaminodiphenyl sulfone, 3,3'-diaminodiphenyl sulfone, m-phenylenediamine, p-phenylenediamine, 2,4-diaminotolene, 2,5-diaminotolene or the like.

The polyamic acids may be synthesized in a polar organic solvent by known methods. The polymerization degree of the polyamic acids may be controlled by varying the mixing molar ratio of the tetracarboxylic dianhydride to the diamine.

Examples of the latent acid group-containing transparent resin may include polymers containing a substituent group capable of producing a carboxyl group or a phenolic hydroxyl group by a catalytic action of an acid generated from the photo-acid generator, and base polymers used in alkali-developable chemically amplified photoresists. Specific examples of the latent acid group-containing transparent resin may include copolymers of cyclohexyl(meth)acrylate, tert-butyl (meth)acrylate, tert-amyl(meth)acrylate, 1,1-dimethylbenzyl (meth)acrylate, 1-ethoxyethyl(meth)acrylate, etc., with other acrylate monomers containing (meth)acrylic acid, homopolymers of 4-(tert-butoxycarbonyloxy)styrene, 4-(1-methoxyethoxy)styrene, 4-(1-ethoxyethoxy)styrene, etc., or copolymers of these monomers with 4-hydroxystyrene, or the like.

These transparent resins have a weight-average molecular weight of usually 2000 to 500000 and preferably 3000 to 300000.

These transparent resins substituted with an acid group and/or a latent acid group may be used in an amount of usually 5 to 500 parts by weight and preferably 7 to 300 parts by weight based on 100 parts by weight of the colorant for color filters. When the amount of the transparent resin used is less than 5 parts by weight, the resultant composition tends to be deteriorated in film-forming property and alkali developability. When the amount of the transparent resin used is more than 500 parts by weight, since the concentration of the pigment is relatively lowered, the thickness of the coating film must be increased to ensure a color concentration required for the color filter. As a result, it may be difficult to obtain a film having a uniform thickness, and the resultant color filter tends to be deteriorated in optical properties.

The number-average dispersed particle diameter of the coloring composition (b) for color filters is usually 1 to 200 nm, preferably 1 to 150 nm, more preferably 1 to 100 nm and still more preferably 1 to 50 nm. When the number-average dispersed particle diameter of the coloring composition is more than 200 nm, the resultant composition tends to be deteriorated in optical properties owing to a too large particle size of the particles dispersed therein, thereby failing to achieve the objects of the present invention.

The volume-average dispersed particle diameter of the coloring composition (b) for color filters is usually 1 to 200 nm, preferably 1 to 150 nm and more preferably 1 to 100 nm. When the volume-average dispersed particle diameter of the coloring composition is more than 200 nm, the resultant composition tends to be deteriorated in optical properties owing to a too large particle size of the particles dispersed therein, thereby failing to achieve the objects of the present invention.

The coloring composition (b) for color filters has a viscosity of usually 0.5 to 1,000 mPa·s. When the viscosity of the coloring composition (b) is more than 1,000 mPa·s, it may difficult to obtain a uniform coating film. When the viscosity of the coloring composition (b) is less than 0.5 mPa·s, the thickness of the obtained coating film tends to be too small, thereby failing to achieve the objects of the present invention.

As to the dispersion stability of the coloring composition (b) for color filters, a rate of change (percentage of change) in viscosity thereof is usually not more than 20% and preferably not more than 10% as measured by the below-mentioned evaluation method. When the rate of change in viscosity of the coloring composition is more than 20%, the resultant composition may fail to maintain a good dispersibility under a stable dispersing condition for a long period of time.

When the colorant for color filters is a green-based colorant, the specific absorption coefficient at 650 nm (on the weight basis) of the coloring composition (b) for color filters is usually not less than 1.05, preferably 1.10 to 5.00 and more preferably 1.20 to 5.00 as measured by the below-mentioned evaluation method. When the colorant for color filters is a blue-based colorant, the specific absorption coefficient at 610 nm (on the weight basis) of the coloring composition (b) for color filters is usually not less than 1.05, preferably 1.10 to 5.00 and more preferably 1.20 to 5.00 as measured by the below-mentioned evaluation method. When the colorant for color filters is a red-based colorant, the specific absorption coefficient at 550 nm (on the weight basis) of the coloring composition (b) for color filters is usually not less than 1.05, preferably 1.10 to 5.00 and more preferably 1.20 to 5.00 as measured by the below-mentioned evaluation method. When the colorant for color filters is a yellow-based colorant, the specific absorption coefficient at 400 nm (on the weight basis) of the coloring composition (b) for color filters is usually not less than 1.05, preferably 1.10 to 5.00 and more preferably 1.20 to 5.00 as measured by the below-mentioned evaluation method.

As to the light fastness of a colored transparent film obtained from the coloring composition (b) for color filters according to the present invention, the ΔE* value thereof is usually not more than 5.0, preferably not more than 4.5 and more preferably not more than 4.0 as measured by the below-mentioned evaluation method. When the light fastness (ΔE* value) is more than 5.0, the resultant color filter tends to be deteriorated in optical properties owing to irradiation with a backlight, etc., thereby failing to achieve the objects of the present invention.

As to the heat resistance of a colored transparent film obtained from the coloring composition (b) for color filters according to the present invention, the ΔE* value thereof is usually not more than 5.0, preferably not more than 4.5 and more preferably not more than 4.0 as measured by the below-mentioned evaluation method. When the heat resistance (ΔE* value) is more than 5.0, the colored transparent film tends to be deteriorated in optical properties when subjected to heat treatments upon forming a color filter therefrom or vapor-depositing a ITO film thereon, thereby failing to achieve the objects of the present invention.

Next, the light transmittance of the colored transparent film for color filters obtained from the coloring composition (b) for color filters is described. When the colorant for color filters is a green-based colorant, the light transmittance at 530 nm of the colored transparent film for color filters is usually not less than 80%, preferably not less than 85% and more preferably not less than 90%. When the colorant for color filters is a blue-based colorant, the light transmittance at 460 nm of the colored transparent film for color filters is usually not less than 80%, preferably not less than 85% and more preferably not less than 90%. When the colorant for color filters is a red-based colorant, the light transmittance at 620 nm of the colored transparent film for color filters is usually not less than 80%, preferably not less than 85% and more preferably not less than 90%. When the colorant for color filters is a yellow-based colorant, the light transmittance at 550 nm of the colored transparent film for color filters is usually not less than 80%, preferably not less than 85% and more preferably not less than 90%.

The specific absorption coefficient (on the weight basis) of the colored transparent film for color filters obtained from the coloring composition (b) for color filters is measured by the below-mentioned evaluation method. When the colorant for color filters is a green-based colorant, the specific absorption coefficient at 650 nm (on the weight basis) of the colored transparent film for color filters is usually not less than 1.05, preferably 1.10 to 5.00 and more preferably 1.20 to 5.00. When the colorant for color filters is a blue-based colorant, the specific absorption coefficient at 610 nm (on the weight basis) of the colored transparent film for color filters is usually not less than 1.05, preferably 1.10 to 5.00 and more preferably 1.20 to 5.00. When the colorant for color filters is a red-based colorant, the specific absorption coefficient at 550 nm (on the weight basis) of the colored transparent film for color filters is usually not less than 1.05, preferably 1.10 to 5.00 and more preferably 1.20 to 5.00. When the colorant for color filters is a yellow-based colorant, the specific absorption coefficient at 400 nm (on the weight basis) of the colored transparent film for color filters is usually not less than 1.05, preferably 1.10 to 5.00 and more preferably 1.20 to 5.00.

Next, the coloring composition (C) for color filters according to the seventh aspect of the present invention is explained. The coloring composition (C) for color filters according to the seventh aspect of the present invention comprises the coloring composition (b) for color filters as defined in the sixth aspect which is produced by dispersing the coloring composition (a) for color filters which is obtained by dispersing, in a solvent, the colorant for color filters which comprises colored composite microparticles comprising silica and an organic pigment wherein the silica is enclosed in the organic pigment and contained in an amount of 0.001 to 9% by weight, calculated as Si, based on a weight of the colored composite microparticles, in a solution of a transparent resin containing an acid group and/or a latent acid group; a polyfunctional monomer containing two or more ethylenically unsaturated double bonds; and a photo-radical polymerization initiator.

Meanwhile, as the method for producing the pigment dispersion-type color filter, there have been proposed an etching method of subjecting a pigment-free photosensitive film formed on a pigment-containing coating film to exposure to light and then to developing process in which patterns are formed on the photosensitive layer, and at the same time, the pigment-containing coating film corresponding to a portion where no pattern is formed, is removed by etching; and a colored photosensitive material method of subjecting a pigment-dispersed photosensitive to exposure to light and then to developing process in which patterns are formed on the photosensitive layer, and at the same time, a portion of the photosensitive layer where no pattern is formed, is removed. The coloring composition (b) for color filters according to the present invention can be more suitably used to form the pigment-containing film layer used in the former etching method. On the other hand, in order to use the coloring composition (b) for color filters to form the pigment-dispersed photosensitive layer used in the latter colored photosensitive material method, it is required to impart a photosensitivity to the coloring composition (b) for color filters. As the substance capable of imparting a photosensitivity to the coloring composition (b) for color filters, there may be used polyfunctional monomers having two or more ethylenically unsaturated double bonds. In the colored photosensitive material method, when exposed to light, polymerization of the polyfunctional monomer having two or more ethylenically unsaturated double bonds is initiated by radical species generated from a photopolymerization initiator at the exposed portion, and further a crosslinking reaction thereof is induced to cause insolubilization thereof.

Examples of the polyfunctional monomer having two or more ethylenically unsaturated double bonds may include polyfunctional monomers such as ethyleneglycol di(meth)acrylate, diethyleneglycol di(meth)acrylate, trimethyleneglycol di(meth)acrylate, tetramethyleneglycol di(meth)acrylate, pentamethyleneglycol di(meth)acrylate, hexamethyleneglycol di(meth)acrylate, neopentylglycol di(meth)acrylate, pentaerythritol tri(meth)acrylate, pentaerythritol tetra(meth)acrylate, stearic acid-modified pentaerythritol (meth)acrylate, trimethylolpropane tri(meth)acrylate, tris(acryloyloxyethyl)isocyanurate, dipentaerythritol hexaacrylate and dipentaerythritol pentaacrylate, as well as acrylate oligomers obtained from polyester resins, epoxy resins, urethane resins, silicone resins, etc.

These polyfunctional monomers having two or more ethylenically unsaturated double bonds may be used in the form of a mixture with monofunctional monomers. Examples of the monofunctional monomers may include methoxytriethyleneglycol(meth)acrylate, 2-hydroxy-3-phenoxypropyl (meth)acrylate, 2-acryloyloxyethyl succinate, 2-acryloyloxyethyl phthalate, 2-acryloyloxypropyl phthalate or the like. These monofunctional monomers may be used in an amount of usually 0 to 80 parts by weight and preferably 0 to 40 parts by weight based on 100 parts by weight of the polyfunctional monomer. When the amount of the monofunctional monomers used is more than 80 parts by weight, the coating film obtained from the composition tends to be partially peeled off or deteriorated in definition or resolution upon the alkali development after exposure to light.

The polyfunctional monomer used in the present invention is suitably mixed with the carboxyl-containing vinyl-based copolymer in the above transparent resin. The amount of the polyfunctional monomer used is usually 5 to 300 parts by weight and preferably 10 to 200 parts by weight based on 100 parts by weight of the transparent resin. When the amount of the polyfunctional monomer used is less than 5 parts by weight, the coating film obtained from the composition tends to be partially peeled off or deteriorated in definition or resolution after the alkali development. When the amount of the polyfunctional monomer used is more than 300 parts by weight, the resultant composition tends to be deteriorated in alkali developability, resulting in problems such as fouling or scumming at unexposed portions of the coating film and failed removal of the film.

The photopolymerization initiator is a substance capable of efficiently generating radical species by irradiation with light, and serves for initiating polymerization of the polyfunctional monomer to form a crosslinked structure and reduce the alkali solubility of the acid group-containing transparent resin, thereby producing negative images. Examples of the photopolymerization initiator may include keto-based compounds, triazine-based compounds containing a trichloromethyl group, electron transfer-type initiators or the like. Among them, preferred are such polymerization initiators capable of generating radical species by irradiation with ultraviolet light having a wavelength in the range of 200 to 450 nm. The amount of the photopolymerization initiator used is not particularly limited as long as it is capable of initiating polymerization of the polyfunctional monomer having two or more ethylenically unsaturated double bonds, and the photopolymerization initiator may be used in an ordinary amount.

Specific examples of the keto-based photopolymerization initiators usable in the present invention may include 2-hydroxy-2-methyl-1-phenylpropan-1-one, 1-hydroxy-1-benzoylcyclohexane, 2-morpholino-2-methyl-1-phenylpropan-1-one, 2-morpholino-2-methyl-1-(4-methoxyphenyl)propan-1-one, 2-morpholino-2-methyl-1-(4-methylthiophenyl)propan-1-one, 2-benzyl-2-dimethylamino-1-(4-morpholinophenyl)butan-1-one, 2-phenyl-2,2-dimethoxy-1-(4-methylthiophenyl)ethan-1-one, diphenylmesitylenephosphine oxide, phenacyltetramethylenesulfonium hexafluorophosphate or the like.

Specific examples of the triazine-based compounds containing a trichloromethyl group usable in the present invention may include 2-(4-methoxy-(3-styryl)-bis(4,6-trichloromethyl)-s-triazine, 1-phenyl-3,5-bis(trichloromethyl)-s-triazine, 1-(4-chlorophenyl)-3,5-bis(trichloromethyl)-s-triazine, 1-(4-methoxyphenyl)-3,5-bis(trichloromethyl)-s-triazine, 1-(4-butoxyphenyl)-3,5-bis(trichloromethyl)-s-triazine, 1-(3,4-methylenedioxyphenyl)-3,5-bis(trichloromethyl)-s-triazine, 1-(3,4-dimethoxyphenyl)-3,5-bis(trichloromethyl)-s-triazine, 1-(4-methoxynaphthyl-1)-3,5-bis(trichloromethyl)-s-triazine, 1-{2-(4-methoxyphenyl)ethenyl}-3,5-bis(trichloromethyl)-s-triazine, 1-{2-(2-methoxyphenyl)ethenyl}-3,5-bis(trichloromethyl)-s-triazine, 1-{2-(3,4-dimethoxyphenyl)ethenyl}-3,5-bis(trichloromethyl)-s-triazine, 1-{2-(3-chloro-4-methoxyphenyl)ethenyl}-3,5-bis(trichloromethyl)-s-triazine, 1-(biphenyl-1)-3,5-bis(trichloromethyl)-s-triazine or the like.

The electron transfer-type initiator usable in the present invention is composed of a radical generator as an electron accepting compound or an electron donating compound, and a sensitizing agent. Examples of the electron accepting compound may include the above trichloromethyl-substituted triazine derivatives; biimidazole compounds such as 2,2'-bis(2-chlorophenyl)-4,4',5,5'-phenylbiimidazole, 2,2'-bis(2,4-dichlorophenyl)-4,4',5,5'-phenylbiimidazole and 2,2'-bis(2-chlorophenyl)-4,4',5,5'-tetrakis(4-ethoxycarbonylphenyl)biimidazole; iodonium salts such as diphenyliodonium hexafluorophosphate, bis(4-tert-butylphenyl)iodonium hexafluorophosphate and (4-methoxyphenyl)(4-octyloxyphenyl)iodonium hexafluorophosphate; or the like. Examples of the sensitizing agent may include 9,10-dimethyl anthracene, 9,10-diphenyl anthracene, 9,10-bis(phenylethinyl)anthracene, 1,8-dimethyl-9,10-bis(phenylethinyl)anthracene, 9,10-dimethoxyanthracene, 9,10-diethoxyanthracene, 9,10-dipropoxyanthracene, 9,10-dibutoxyanthracene, thioxanthone, isopropylthioxanthone, 4,4'-bis(diethylamino)benzophenone or the like. Further, there may also be used photopolymerization initiators composed of an electron donating compound and a sensitizing agent. Examples of the suitable electron donating compound may include p-dimethylaminobenzoic acid esters, diethanolamine or the like. Examples of the suitable sensitizing agent may include thioxanthone derivatives or the like. One or more kinds of sensitizing agents may be used in combination with the above electron accepting compound or electron donating compound.

Next, the coloring composition (D) for color filters according to the eighth aspect of the present invention is explained. The coloring composition (D) for color filters according to the eighth aspect of the present invention comprises the coloring composition (b) for color filters as defined in the sixth aspect which is produced by dispersing the coloring composition (a) for color filters which is obtained by dispersing in a solvent, the colorant for color filters which comprises colored composite microparticles comprising silica and an organic pigment wherein the silica is enclosed in the organic pigment, and contained in an amount of 0.001 to 9% by weight, calculated as Si, based on a weight of the colored composite microparticles, in a solution of a transparent resin containing an acid group and/or a latent acid group; and a photo-acid generator.

The photo-acid generator usable in the coloring composition (D) for color filters according to the present invention may be compounds applied to chemically amplified type photoresists or photo-cationic polymerization which have an absorption band in a wavelength range of 200 to 430 nm. Examples of the photo-acid generator may include onium cationic compounds, halogen-containing compounds capable of generating a halogen acid, and sulfonated compounds capable of generating sulfonic acid. Specific examples of the onium cationic compounds may include $BF_4^-$ salts, $PF_6^-$ salts, $AsF_6^-$ salts, $SbF_6^-$ salts, $CH_3SO_3^-$ salts, $CF_3SO_3^-$ salts, perfluorobutanesulfonates, benzenesulfonates, p-toluenesulfonates or $(C_6F_5)_4B^-$ salts of p-phenylthiophenyldiphenylsulfonium, phenacyltetramethylenesulfonium, phenacyldimethylsulfonium, (2-naphthylcarbonylmethyl)tetramethylenesulfonium, phenyl(4-methoxyphenyl)iodonium, phenyl{4-(tert-butyl)phenyl}iodonium, (4-bis{4-(tert-butyl)phenyl}iodonium, bis(4-dodecylphenyl)iodonium, etc.

Examples of the halogen-containing compounds capable of generating a halogen acid may include 1-(3,4-dimethoxyphenyl)-3,5-bis(trichloromethyl)-s-triazine, 1-(4-methoxynaphthyl-1)-3,5-bis(trichloromethyl)-s-triazine, 1-{2-(4-methoxyphenyl)ethenyl}-3,5-bis(trichloromethyl)-s-triazine, 1-{2-(2-methoxyphenyl)ethenyl}-3,5-bis(trichloromethyl)-s-triazine, 1-{2-(3,4-dimethoxyphenyl)ethenyl}-3,5-bis(trichloromethyl)-s-triazine, 1-{2-(3-chloro-4-methoxyphenyl)ethenyl}-3,5-bis(trichloromethyl)-s-triazine, 1-(biphenyl-1)-3,5-bis(trichloromethyl)-s-triazine, 1-(4-hydroxybiphenyl-1)-3,5-bis(trichloromethyl)-s-triazine, 1-(4-methoxybiphenyl-1)-3,5-bis(trichloromethyl)-s-triazine or the like.

Examples of the acid generator capable of generating a sulfonic acid may include N-trifluoromethanesulfonyloxydiphenylmaleimide, N-p-toluenesulfonyloxysuccinimide, N-camphor-sulfonyloxysuccinimide, N-trifluoromethanesulfonyloxysuccinimide, N-perfluorobutanesulfonyloxyphthalimide, N-p-toluenesulfonyloxy-1,8-naphthalenecarboximide, N-camphor-sulfonyloxy-1,8-naphthalenecarboximide, N-trifluoromethanesulfonyloxy-1,8-naphthalenecarboximide, N-perfluorobutanesulfonyloxy-1,8-naphthalenecarboximide or the like.

These photo-acid generators may be used under the co-existence of the following sensitizing agents. Examples of the sensitizing agents may include 9-methyl anthracene, 9,10-dimethyl anthracene, 9,10-diphenyl anthracene, 9,10-dimethoxyanthracene, 9,10-diethoxyanthracene, 9,10-dipropoxyanthracene, 9,10-dibutoxyanthracene, 1-methylpyrene, thioxanthone derivatives or the like.

The amount of the photo-acid generator used is usually 0.1 to 20 parts by weight and preferably 0.5 to 10 parts by weight based on 100 parts by weight of the transparent resin.

The number-average dispersed particle diameter of the respective coloring compositions (C) and (D) for color filters according to the present invention is usually 1 to 200 nm, preferably 1 to 150 nm, more preferably 1 to 100 nm and still more preferably 1 to 50 nm. When the number-average dispersed particle diameter of the respective coloring compositions is more than 200 nm, the resultant compositions tend to be deteriorated in optical properties owing to a too large particle size of the particles dispersed therein, thereby failing to achieve the objects of the present invention.

The volume-average dispersed particle diameter of the respective coloring compositions (C) and (D) for color filters according to the present invention is usually 1 to 200 nm, preferably 1 to 150 nm and more preferably 1 to 100 nm. When the volume-average dispersed particle diameter of the respective coloring compositions is more than 200 nm, the resultant compositions tend to be deteriorated in optical properties owing to a too large particle size of the particles dispersed therein, thereby failing to achieve the objects of the present invention.

The coloring compositions (C) and (D) for color filters according to the present invention respectively have a viscosity of usually 0.5 to 1,000 mPa·s. When the viscosity of the respective coloring compositions (C) and (D) is more than 1,000 mPa·s, it may difficult to obtain a uniform coating film. When the viscosity of the respective coloring compositions (C) and (D) is less than 0.5 mPa·s, the thickness of the obtained coating film tends to be too small, thereby failing to achieve the objects of the present invention.

As to the dispersion stability of the respective coloring compositions (C) and (D) for color filters according to the present invention, the rate of change in viscosity thereof is usually not more than 20% and preferably not more than 10% as measured by the below-mentioned evaluation method. When the rate of change in viscosity of the respective coloring compositions is more than 20%, the resultant compositions may fail to stably maintain a good dispersibility for a long period of time.

When the colorant for color filters is a green-based colorant, the specific absorption coefficient at 650 nm (on the weight basis) of the respective coloring compositions (C) and (D) for color filters according to the present invention is usually not less than 1.05, preferably 1.10 to 5.00 and more preferably 1.20 to 5.00 as measured by the below-mentioned evaluation method. When the colorant for color filters is a blue-based colorant, the specific absorption coefficient at 610 nm (on the weight basis) of the respective coloring compositions (C) and (D) for color filters is usually not less than 1.05, preferably 1.10 to 5.00 and more preferably 1.20 to 5.00 as measured by the below-mentioned evaluation method. When the colorant for color filters is a red-based colorant, the specific absorption coefficient at 550 nm (on the weight basis) of the respective coloring compositions (C) and (D) for color filters is usually not less than 1.05, preferably 1.10 to 5.00 and more preferably 1.20 to 5.00 as measured by the below-mentioned evaluation method. When the colorant for color filters is a yellow-based colorant, the specific absorption coefficient at 400 nm (on the weight basis) of the respective coloring compositions (C) and (D) for color filters is usually not less than 1.05, preferably 1.10 to 5.00 and more preferably 1.20 to 5.00 as measured by the below-mentioned evaluation method.

As to the light fastness of a colored transparent film obtained from the respective coloring compositions (C) and (D) for color filters according to the present invention, the ΔE* value thereof is usually not more than 5.0, preferably not more than 4.5 and more preferably not more than 4.0 as measured by the below-mentioned evaluation method. When the light fastness (ΔE* value) is more than 5.0, the resultant color filter tends to be deteriorated in optical properties owing to irradiation with a backlight, etc., thereby failing to achieve the objects of the present invention.

As to the heat resistance of a colored transparent film obtained from the respective coloring compositions (C) and (D) for color filters according to the present invention, the ΔE* value thereof is usually not more than 5.0, preferably not more than 4.5 and more preferably not more than 4.0 as measured by the below-mentioned evaluation method. When the heat resistance (ΔE* value) is more than 5.0, the colored transparent film tends to be deteriorated in optical properties when subjected to heat treatments upon forming a color filter therefrom or vapor-depositing a ITO film thereon, thereby failing to achieve the objects of the present invention.

When the colorant for color filters is a green-based colorant, the specific absorption coefficient at 650 nm (on the weight basis) of a colored transparent film obtained from the respective coloring compositions (C) and (D) for color filters according to the present invention is usually not less than 1.20, preferably 1.40 to 5.00 and more preferably 1.50 to 5.00 as measured by the below-mentioned evaluation method. When the colorant for color filters is a blue-based colorant, the specific absorption coefficient at 610 nm (on the weight basis) of the colored transparent film is usually not less than 1.20, preferably 1.40 to 5.00 and more preferably 1.50 to 5.00 as measured by the below-mentioned evaluation method. When the colorant for color filters is a red-based colorant, the specific absorption coefficient at 550 nm (on the weight basis) of the colored transparent film is usually not less than 1.20, preferably 1.40 to 5.00 and more preferably 1.50 to 5.00 as measured by the below-mentioned evaluation method. When the colorant for color filters is a yellow-based colorant, the specific absorption coefficient at 400 nm (on the weight basis) of the colored transparent film is usually not less than 1.20, preferably 1.40 to 5.00 and more preferably 1.50 to 5.00 as measured by the below-mentioned evaluation method.

Next, the color filters according to the present invention are explained. The color filter according to the ninth aspect of the present invention is constituted of a film-shaped product formed from the coloring composition (b) for color filters as defined in the sixth aspect which is produced by dispersing the coloring composition (a) for color filters which is obtained by dispersing in a solvent, the colorant for color filters which comprises colored composite microparticles comprising silica and an organic pigment wherein the silica is enclosed in the organic pigment and contained in an amount of 0.001 to 9% by weight, calculated as Si, based on the weight of the colored composite microparticles, in a solution of a transparent resin containing an acid group and/or a latent acid group.

Also, the color filter according to the tenth aspect of the present invention is constituted of (I) a film-shaped product formed from the coloring composition (C) for color filters comprising the coloring composition (b) for color filters as defined in the sixth aspect which is produced by dispersing the coloring composition (a) for color filters which is obtained by dispersing in a solvent, the colorant for color filters which comprises colored composite microparticles comprising silica and an organic pigment wherein the silica is enclosed in the organic pigment and contained in an amount of 0.001 to 9% by weight, calculated as Si, based on a weight of the colored composite microparticles, in a solution of a transparent resin containing an acid group and/or a latent acid group; a polyfunctional monomer containing two or more ethylenically unsaturated double bonds; and a photo-radical polymerization initiator, or (II) a film-shaped product formed from the coloring composition (D) for color filters comprising the coloring composition (b) for color filters as defined in the sixth aspect which is produced by dispersing the coloring composition (a) for color filters which is obtained by dispersing in a solvent, the colorant for color filters which comprises colored composite microparticles comprising silica and an organic pigment wherein the silica is enclosed in the organic pigment and contained in an amount of 0.001 to 9% by weight, calculated as Si, based on the weight of the colored composite microparticles, in a solution of a transparent resin containing an acid group and/or a latent acid group; and a photo-acid generator.

The respective color filters have a light transmittance in each color transmission range of usually not less than 75%, preferably not less than 80% and more preferably not less than 85%; and a contrast of usually not less than 800, preferably not less than 1000 and more preferably not less than 1200.

Next, the processes for producing the coloring compositions for color filters according to the present invention are explained.

The coloring composition (a) for color filters according to the present invention may be produced by re-dispersing the colorant for color filters according to the present invention in an organic solvent or an oil vehicle, or by subjecting the composite particles to dissolution treatment, separating a solid component from the dissolution solution by filtration, washing the thus separated solid component with water, flashing a wet cake of the solid component with an organic solvent or an oil vehicle, and then dispersing the thus treated solid component in the organic solvent or the oil vehicle. The dispersing treatment may be conducted using a ball mill, a beads mill, a sand mill, an edge runner, a twin or triple roll mill, an extruder, a high-speed impact mill, or the like. As a grinding medium for grinding-type mills such as the ball mill and beads mill, there may be used steel beads, glass beads, ceramic beads, etc., according to the kind of material of the mill used. The size of the grinding medium is usually 0.01 to 10 mm and preferably 0.03 to 3 mm. The grinding temperature is not particularly limited, and may be controlled, for example, to the range of from room temperature to a boiling point of the solvent used. Additives such as a dispersant, a pigment derivative, a defoaming agent and a surfactant may be added to the composition, if required.

The coloring composition (b) for color filters according to the present invention may be produced by dissolving the coloring composition (a) for color filters in a transparent resin containing an acid group or a transparent resin containing a latent acid group; or by mixing and dispersing the colorant for color filters in a solvent into which the transparent resin containing an acid group or the transparent resin containing a latent acid group is previously dissolved.

The photosensitivity-imparted coloring composition (C) for color filters according to the present invention may be produced by adding the photopolymerization initiator and the polyfunctional monomer having two or more ethylenically unsaturated double bonds to the coloring composition (b) containing the transparent resin containing an acid group, and then mixing these components with each other. In this case, a solvent may be added to the composition, if required, to suitably adjust the pigment concentration, viscosity, etc. Further, if required, a polymerization inhibitor, a curing accelerator such as 2-mercaptobenzoimidazole, etc., may be added to the composition.

Also, the photosensitivity-imparted coloring composition (D) for color filters according to the present invention may be produced by adding a photo-acid generator to the coloring composition (b) containing the transparent resin containing a latent acid group, and then mixing these components with each other.

Next, the process for producing the color filter according to the present invention is explained. First, the coloring composition for color filters according to the present invention is applied onto a transparent substrate on which black matrix patterns are formed, and then pre-baked to fully evaporate and remove the solvent therefrom, thereby obtaining a colored coating film.

In the case of the photosensitivity-non-imparted colored coating film, an alkali-developable positive photoresist layer is formed on the colored coating film, thereby obtaining a coating film with a two-layer structure. As the alkali-developable positive photoresist, there may be suitably used quinonediazide-based photoresists. The thus obtained colored coating film is irradiated with light through a photo mask, and then developed with an aqueous alkali solution. Since the light-exposed portion of the positive photoresist-coated film becomes alkali-soluble, the underlying colored layer exposed by the alkali development is also etched by the alkali solution, thereby obtaining a colored positive image. Then, the photoresist layer is selectively removed by a solvent to obtain a colored pattern.

On the other hand, in the case of the photosensitive coloring composition (C) for color filters to which the photopolymerization initiator and the polyfunctional monomer are added, the coating film formed from the photosensitive coloring composition (C) for color filters is directly usable as a colored photosensitive layer. The coating film may be exposed to light through a photo mask, and then alkali-developed to insolubilize the exposed portion, thereby obtaining a negative colored pattern. The developing treatment may be conducted by dipping method, spraying method, paddle method, shower method, etc. After the alkali development, the resultant film is washed with water and then dried.

As the transparent substrate, there may be used such substrates made of silica glass as well as polycarbonates, polyesters, polyamides, polyimides, polyamide imides, etc. Also, in order to produce a solid image pickup device, there may be used a silicon substrate. The coloring composition for color filters may be applied onto the transparent substrate by an appropriate method such as rotary coating, cast coating, roll coating, screen printing and ink-jet printing. The thickness of the coating film varies depending upon concentration of the colorant for color filters used, and is usually 0.1 to 10 μm and preferably 0.2 to 5.0 μm.

As the alkali developing solution, there may be used aqueous solutions of sodium carbonate, potassium carbonate, sodium hydroxide, potassium hydroxide, tetramethylammoniumhydroxide or the like. The aqueous alkali solution may also contain methanol, ethanol, isopropyl alcohol, surfactants, etc.

Next, the colorant for inks for ink-jet printing according to the eleventh aspect of the present invention is described. The colorant for inks for ink-jet printing according to the eleventh aspect of the present invention comprises the colored composite microparticles as defined in the first aspect which comprise silica and an organic pigment wherein the silica is enclosed in the organic pigment and contained in an amount of 0.001 to 9% by weight, calculated as Si, based on the weight of the colored composite microparticles.

As to the particles size distribution of primary particles of the colorant for inks for ink-jet printing, the geometrical standard deviation value of diameters of the primary particles is usually not more than 2.0, preferably not more than 1.8 and more preferably not more than 1.5. When the geometrical standard deviation value representing the particle size distribution is more than 2.0, the resultant composite pigment tends to exhibit a too wide particle size distribution, and, therefore, tends to be deteriorated in dispersibility and dispersion stability in inks for ink-jet printing, so that it may be difficult to achieve the objects of the present invention.

The number-average particle diameter of the colorant for inks for ink-jet printing is usually not more than 150 nm, preferably 1 to 100 nm, more preferably 1 to 50 nm and still more preferably 1 to 40 nm. When the number-average particle diameter of the colorant for inks for ink-jet printing is more than 150 nm, the resultant ink for ink-jet printing tends to cause clogging of a head portion of an ink-jet printer used owing to a too large particle size thereof.

The volume-average particle diameter of the colorant for inks for ink-jet printing is usually 1 to 150 nm, preferably 1 to 125 nm and more preferably 1 to 100 nm. When the volume-average particle diameter of the colorant for inks for ink-jet printing is more than 150 nm, the resultant ink for ink-jet printing tends to cause clogging of a head portion of an ink-jet printer used owing to a too large particle size thereof.

As to the light fastness of the colorant for inks for ink-jet printing, the $\Delta E^*$ value thereof is usually not more than 5.0, preferably not more than 4.5 and more preferably not more than 4.0 as measured by the below-mentioned evaluation method. When the light fastness ($\Delta E^*$ value) of the colorant for inks for ink-jet printing is more than 5.0, printed matters printed with the resultant ink for ink-jet printing may fail to exhibit a sufficient light fastness.

Meanwhile, the colorant for inks for ink-jet printing according to the present invention has the substantially same silica content, average primary particle diameter, BET specific surface area value, tinting strength and $\zeta$ potential in a water-based system as those of the colored composite microparticles according to the first aspect of the present invention.

Next, the ink for ink-jet printing according to the twelfth aspect of the present invention is described. The ink for ink-jet printing according to the twelfth aspect of the present invention comprises the colorant for inks for ink-jet printing as defined in the eleventh aspect which comprises the colored composite microparticles comprising silica and an organic pigment wherein the silica is enclosed in the organic pigment and contained in an amount of 0.001 to 9% by weight, calculated as Si, based on the weight of the colored composite microparticles; and an ink base solution.

The number-average dispersed particle diameter of the ink for ink-jet printing is usually 1 to 150 nm, preferably 1 to 100 nm, more preferably 1 to 50 nm and still more preferably 1 to 40 nm. When the number-average dispersed particle diameter of the ink for ink-jet printing is more than 150 nm, the resultant ink for ink-jet printing tends to cause clogging of a head portion of ink-jet printers, and the colorant contained in the ink for ink-jet printing tends to be deteriorated in dispersion stability.

The volume-average dispersed particle diameter of the ink for ink-jet printing is usually 1 to 150 nm, preferably 1 to 125 nm and more preferably 1 to 100 nm. When the volume-average dispersed particle diameter of the ink for ink-jet printing is more than 150 nm, the resultant ink for ink-jet printing tends to cause clogging of a head portion of ink-jet printers, and the colorant contained in the ink for ink-jet printing tends to be deteriorated in dispersion stability.

The dispersion stability of the ink for ink-jet printing is usually Rank 5 or 4 and preferably Rank 5 as visually observed by the below-mentioned evaluation method. The rate of change (percentage of change) in number-average dispersed particle diameter of the ink for ink-jet printing is usually not more than 10% and preferably not more than 8%.

The specific absorption coefficient $\epsilon_w$ (on the weight basis) representing a tinting strength of the ink for ink-jet printing is usually not less than 1.20, preferably 1.40 to 5.00 and more preferably 1.50 to 5.00 as measured by the below-mentioned evaluation method.

As to the light fastness of printed images obtained using the ink for ink-jet printing, the $\Delta E^*$ value thereof is usually not more than 3.0, preferably not more than 2.5 and more preferably not more than 2.0.

The anti-clogging property of the ink for ink-jet printing at a head portion of ink-jet printers is usually Rank 5 or 4 and preferably Rank 5 as visually observed by the below-mentioned evaluation method.

The amount of the colorant contained in the ink for ink-jet printing is usually 1 to 20% by weight based on the weight of the ink base solution.

The ink base solution as a constitutional component of the ink for ink-jet printing according to the present invention contains a solvent and a dispersant and may also optionally contain a water-soluble resin, a penetrant, a humectant, a water-soluble solvent, a pH modifier and/or an antiseptic agent, if required. The content of the optional components such as the water-soluble resin, penetrant, humectant, water-soluble solvent, pH modifier, and/or antiseptic agent in the ink base solution is usually not more than 50% by weight.

The content of the dispersant in the ink for ink-jet printing is usually 5 to 200% by weight, preferably 7.5 to 150% by weight and more preferably 10 to 100% by weight based on the weight of the colorant for inks for ink-jet printing.

As the dispersant, there may be used surfactants and/or high-molecular dispersants. From the standpoints of a good dispersibility and a good dispersion stability of the colorant for inks for ink-jet printing, as the surfactants, there may be suitably used anionic surfactants and nonionic surfactants. Examples of the preferred high-molecular dispersants may include water-soluble resins such as styrene-acrylic acid copolymers.

Specific examples of the anionic surfactants may include fatty acid salts, salts of sulfuric esters, sulfonic acid salts, salts of phosphoric esters, or the like. Among these anionic surfactants, preferred are salts of sulfuric esters and sulfonic acid salts.

Specific examples of the nonionic surfactants may include polyethyleneglycol-type nonionic surfactants such as polyoxyethylene alkyl ethers and polyoxyethylene aryl ethers; and polyhydric alcohol-type nonionic surfactants such as sorbitan fatty esters. Among these nonionic surfactants, preferred are the polyethyleneglycol-type nonionic surfactants.

Examples of cationic surfactants may include amine salt-type cationic surfactants, quaternary ammonium salt-type cationic surfactants, or the like. Among these cationic surfactants, preferred are the quaternary ammonium salt-type cationic surfactants.

Specific examples of the high-molecular dispersants may include alkali-soluble resins such as styrene-acrylic acid copolymers, styrene-maleic acid copolymers and polyacrylic acid derivatives.

The solvent for the ink for ink-jet printing is composed of water and, if required, a water-soluble organic solvent. The content of the water-soluble organic solvent in the ink for ink-jet printing is usually not more than 50% by weight, preferably 1 to 50% by weight, more preferably 1 to 40% by weight and still more preferably 1 to 30% by weight based on the weight of the ink base solution.

Examples of the water-soluble organic solvent may include monohydric alcohols such as methanol, ethanol, n-propanol, isopropanol and butanol; dihydric alcohols such as ethyleneglycol, diethyleneglycol, triethyleneglycol, tetraethyleneglycol, propyleneglycol and dipropyleneglycol; trihydric alcohols such as glycerol; polyalkyleneglycols such as polyethyleneglycol and polypropyleneglycol; and lower alkyl ethers of polyhydric alcohols such as diethyleneglycol monobutyl ether, ethyleneglycol monobutyl ether, triethyleneglycol monobutyl ether and ethyleneglycol monoethyl ether. These water-soluble organic solvents may be used in combination of any two or more thereof.

Next, the process for producing the ink for ink-jet printing according to the present invention is described.

The ink for ink-jet printing according to the present invention may be produced by mixing and dispersing predetermined amounts of the colorant for inks for ink-jet printing, the dispersant and water, if required, together with additives such as a penetrant, a humectant, a water-soluble solvent, a pH modifier and an antiseptic agent using a dispersing apparatus to prepare a primary dispersion; and then further adding water, the water-soluble solvent and other additives to the primary dispersion; and mixing and dispersing the resultant dispersion, followed by subjecting the dispersion to filtration using a membrane filter.

As the dispersing apparatus, there may be used a ball mill, a sand mill, an attritor, a roll mill, a beads mill, a colloid mill, a twin or triple roll mill, an ultrasonic homogenizer, a high-pressure homogenizer, etc.

An important point of the first to third aspects of the present invention is that the colored composite microparticles of the present invention comprise fine primary particles, exhibit a high tinting strength and an excellent dispersibility, and are further excellent in light fastness.

The reason why the colored composite microparticles of the present invention can exhibit a high tinting strength and an excellent dispersibility is considered by the present inventors as follows. In general, merely finely divided organic pigment tends to suffer from agglomeration because of a very high surface energy of the particles, so that it may be difficult to allow the organic pigment to maintain the fine particle condition in vehicles. However, in the colored composite microparticles of the present invention, since silica is enclosed in the organic pigment, an absolute value of a $\zeta$ potential of the resultant particles is increased, resulting in a good electrostatic repulsion effect thereof in the vehicles. As a result, the obtained colored composite microparticles can be dispersed in the vehicles in a finely divided condition, thereby attaining a high tinting strength.

An important point of the fourth to eighth aspects of the present invention is that the colorant for color filters according to the present invention comprises fine primary particles, exhibits a high tinting strength and an excellent dispersibility in vehicles, and are further excellent in light fastness and heat resistance.

The reason why the colorant for color filters according to the present invention can exhibit a high tinting strength and an excellent dispersibility and are further excellent in light fastness and heat resistance, is considered by the present inventors as follows. That is, the colorant for color filters according to the present invention is composed of the above colored composite microparticles. Also, since the silica having a high heat resistance and a high light fastness is enclosed in the organic pigment, the resultant composite particles can maintain a high heat resistance and a high light fastness or can be improved in these properties even when the organic pigment is finely divided.

The reason why the color filter using the film-shaped product comprising the coloring composition for color filters according to the present invention is excellent in optical properties, light fastness and heat resistance, is considered by the present inventors as follows. That is, in the color filter, there is used the colorant for color filters according to the present invention which are not only in the form of fine particles but also excellent dispersibility, light fastness and heat resistance.

An important point of the eleventh aspect of the present invention is that the colorant used in the ink for ink-jet printing according to the present invention has a fine primary particle diameter and a uniform particle size distribution, exhibits a high tinting strength and an excellent dispersibility, and is further excellent in light fastness.

The reason why the colorant used in the ink for ink-jet printing can exhibit a high tinting strength and excellent dispersibility and light fastness is considered by the present inventors as follows. That is, the colorant used in the ink for ink-jet printing-comprises the above colored composite microparticles.

The reason why the ink for ink-jet printing according to the present invention can exhibit an excellent dispersion stability is considered by the present inventors as follows. That is, owing to the use of the colorant for inks for ink-jet printing according to the present invention, since the silica is enclosed in the organic pigment, an absolute value of the $\zeta$ potential of the resultant colorant is increased and a good electrostatic repulsion effect thereof in vehicles can be attained, so that the colorant can be dispersed in a finely divided condition even in the vehicles, thereby enabling the colorant to maintain an excellent dispersibility in the ink for ink-jet printing.

The colored composite microparticles according to the first aspect of the present invention exhibit a high tinting strength and is excellent in dispersibility and light fastness, and therefore, can be suitably used as a colorant in various applications. The dispersion according to the second aspect of the present invention contains the colored composite microparticles having the above properties as a colorant, and therefore, can be suitably used as a dispersion in various applications. The colored composite microparticles and the dispersion according to the present invention can be used as a colorant in various applications such as ordinarily used paints and printing inks irrespective of a water-based system or a solvent-based system.

The colorant for color filters according to the fourth aspect of the present invention not only has a fine primary particle diameter, but also exhibits a high tinting strength and an excellent dispersibility in vehicles, and is further excellent in light fastness and heat resistance, and therefore, can be suitably used as a colorant for color filters.

The coloring compositions for color filters according to the fifth to eighth aspects of the present invention are excellent in dispersibility, dispersion stability, light fastness and heat resistance owing to the use of the colorant for color filters having the above properties, and therefore, can be suitably used as a coloring composition for color filters which can also exhibit an excellent transparency.

The color filters according to the ninth and tenth aspects of the present invention are excellent in spectral properties, light fastness and heat resistance owing to the use of the coloring composition for color filters which comprises the colorant for color filters having the above properties, and therefore, can be suitably used as a color filter.

The colorant for inks for ink-jet printing according to the eleventh aspect of the present invention has a fine primary particle diameter and a uniform particle size distribution, exhibits a high tinting strength and an excellent dispersibility, and is further excellent in light fastness, and therefore, can be suitably used as a colorant for inks for ink-jet printing. The ink for ink-jet printing according to the present invention can be suitably used as an ink for ink-jet printing which is excellent in dispersibility, dispersion stability and light fastness, owing to use of the colorant for inks for ink-jet printing as defined in eleventh aspect.

The colored composite microparticles according to the first aspect of the present invention exhibit a high tinting strength, and are excellent in dispersibility and light fastness, and therefore, can be suitably used in various applications such as ordinarily used paints, printing inks, etc., irrespective of an aqueous system or a solvent system.

In particular, in the dispersion according to the second aspect of the present invention, the colored composite microparticles exhibiting a high tinting strength and excellent dispersibility and light fastness are used as a colorant. Therefore, the dispersion can be suitably used in various applications.

The colorant according to the fourth aspect of the present invention not only has a fine primary particle diameter but also exhibits a high tinting strength and an excellent dispersibility in vehicles, and are excellent in light fastness and heat resistance, and therefore, can be suitably used as a colorant for color filters.

In the coloring compositions according to the fifth to eighth aspects of the present invention, there is used the colorant for color filters having a high tinting strength and excellent dispersibility, light fastness and heat resistance. For this reason, the coloring compositions are excellent in not only dispersibility, dispersion stability, light fastness and heat resistance, but also transparency, and therefore, can be suitably used as a coloring composition for color filters.

In the color filters according to the ninth and tenth aspects of the present invention, there is used the coloring composition for color filters which is excellent in not only dispersibility, dispersion stability, light fastness and heat resistance, but also transparency. Therefore, the resultant color filters are excellent in spectral properties, light fastness and heat resistance.

The colorant according to the eleventh aspect of the present invention has a fine primary particle diameter and a uniform particle size distribution, and exhibits a high tinting strength, an excellent dispersibility and an excellent light fastness. Therefore, the colorant can be suitably used as a colorant for inks for ink-jet printing.

In the ink for ink-jet printing according to the twelfth aspect of the present invention, there is used the colorant for inks for ink-jet printing which is in the form of fine particles having a uniform particle size, has a high tinting strength, and is excellent in dispersibility and light fastness. Therefore, the ink for ink-jet printing is excellent in dispersibility, dispersion stability and light fastness.

EXAMPLES

The present invention is described in more detail by Examples and Comparative Examples, but the Examples are only illustrative and, therefore, not intended to limit the scope of the present invention. Meanwhile, various properties described in the present invention were measured by the following methods.

(1) The average particle diameter of primary particles of the respective particles was expressed by an average value of particle diameters of 350 particles observed on a micrograph.

(2) The particle size distribution of primary particles of the respective particles was expressed by the geometrical standard deviation value obtained by the following method. That is, the particle sizes were measured from the above magnified micrograph. The actual particle sizes and the number of the particles were obtained from the calculation on the basis of the measured values. On a logarithmic normal probability paper, the particle sizes were plotted at regular intervals on the abscissa-axis and the accumulative number of particles (under integration sieve) belonging to each interval of the particle sizes were plotted by percentage on the ordinate-axis by a statistical technique. The particle sizes corresponding to the number of particles of 50% and 84.13%, respectively, were read from the graph, and the geometrical standard deviation was obtained from the following formula:

Geometrical standard deviation={particle size corresponding to 84.13% under integration sieve}/{particle size (geometrical average diameter) corresponding to 50% under integration sieve}

The more the geometrical standard deviation nears 1, the more excellent the particle size distribution of the primary particles.

(3) The number-average particle diameter and the volume-average particle diameter of the respective particles were determined by the following method. An aqueous solution prepared by mixing the particles to be measured with water was dispersed for 1 min using an ultrasonic dispersing apparatus, and then the respective average particle diameters of the particles dispersed therein were measured by a dynamic light scattering method using a concentrated particle size analyzer "FPAR-1000" manufactured by Otsuka Denshi Co., Ltd.

(4) The specific surface area was expressed by the value measured by a BET method.

(5) The amount of the surface modifying agent coated on the surface of the silica particles, and the amount of the organic pigment adhered onto the composite particles, were respectively determined by measuring the carbon contents using "Horiba Metal, Carbon and Sulfur Analyzer EMIA-2200 Model" (manufactured by Horiba Seisakusho Co., Ltd.).

(6) The amounts of silica enclosed in the colored composite microparticles, the colorant for color filters and the colorant for inks for ink-jet printing, were respectively measured by a fluorescent X-ray spectroscopy device "3063 M-type" (manufactured by RIGAKU DENKI KOGYO CO., LTD.) according to JIS K0119 "General rule of fluorescent X-ray analysis".

(7) The ζ potentials of the organic pigment, the composite particles, the colored composite microparticles, the colorant for color filters and the colorant for inks for ink-jet printing, were respectively determined as follows. The organic pigment, the composite particles, the colored composite microparticles, the colorant for color filters and the colorant for inks for ink-jet printing were respectively added to ion-exchanged water in the case of a water-based system or PGMEA (propyleneglycol monomethyl ether acetate) in the case of a solvent system to prepare a dispersion having a concentration of 0.5 g/L, and the resultant dispersion was dispersed for 3 min using an ultrasonic dispersing apparatus to measure the ζ potential thereof by electrophoresis using "Model 501" manufactured by PEN KEN Inc.

(8) The hues of the respective particles were measured by the following method.

That is, 0.5 g of each sample and 0.5 mL of castor oil were intimately kneaded together by a Hoover's muller to form a paste. 4.5 g of a clear lacquer was added to the obtained paste and was intimately kneaded to form a paint. The obtained paint was applied onto a cast-coated paper by using a 150 μm (6 mil) applicator to produce a coating film piece (having a coating film thickness of about 30 μm). The thus obtained coating film piece was subjected to measurement using a spectrophotometric colorimeter "CM-3610d" (manufactured by MINOLTA CO., LTD.) to determine color specification values thereof according to JIS Z 8929. Meanwhile, the C* value representing chroma is calculated according to the following formula:

$$C^* = ((a^*)^2 + (b^*)^2)^{1/2}$$

(9) The tinting strength of the respective particles was measured by the following method.

That is, a primary color enamel and a vehicle enamel prepared by the below-mentioned methods were respectively applied on a cast-coated paper by using a 150 μm (6 mil) applicator to produce coating film pieces. The L* values of the thus obtained coating film pieces were measured by a spectrophotometric colorimeter "CM-3610d" (manufactured by MINOLTA CO., LTD.). The difference between the obtained L* values was represented by a ΔL* value.

Next, using the organic pigment employed upon production of the colored composite microparticles, the colorant for color filters and the colorant for inks for ink-jet printing, as a control sample therefor, the same procedure as defined above was conducted to prepare an primary color enamel and a vehicle enamel, form respective coating film pieces and then measure L* values thereof. The difference between the L* values was represented by a ΔLs* value.

From the obtained ΔL* value of the colored composite microparticles, the colorant for color filters and the colorant for inks for ink-jet printing and ΔLs* value of the control sample, the tinting strength (%) was calculated according to the following formula:

$$\text{Tinting strength}(\%) = 100 + \{(\Delta Ls^* - \Delta L^*) \times 10\}$$

Preparation of Primary Color Enamel:

10 g of the above sample, 16 g of an amino alkyd resin and 6 g of a thinner were blended with each other. The resultant mixture was added together with 90 g of 3 mmφ glass beads into a 140-mL glass bottle, and then mixed and dispersed for 45 min by a paint shaker. The obtained mixture was mixed with 50 g of an additional amino alkyd resin, and further dispersed for 5 min by a paint shaker, thereby obtaining a primary color enamel.

Preparation of Vehicle Enamel:

12 g of the above-prepared primary color enamel and 80 g of Aramic White (titanium dioxide-dispersed amino alkyd resin) were blended with each other, and the resultant mixture was mixed and dispersed for 15 min by a paint shaker, thereby preparing a vehicle enamel.

(10) The light fastness of the respective particles were measured by the following method.

That is, the primary color enamel prepared above for measuring the tinting strength was applied onto a cold rolled steel plate (0.8 mm×70 mm×150 mm) and dried to form a coating film having a thickness of 150 μm. One half of the thus prepared coating film piece was covered with a metal foil, and an ultraviolet light was continuously irradiated over the coating film piece at an intensity of 100 mW/cm² for 6 hr using "EYE SUPER UV TESTER SUV-W13" (manufactured by IWASAKI DENKI CO., LTD.). Then, the hue values (L*, a* and b* values) of the metal foil-covered UV-unirradiated portion and the UV-irradiated portion of the coating film piece were respectively measured. The light fastness was expressed by the ΔE* value calculated according to the following formula:

$$\Delta E^* = [(\Delta L^*)^2 + (\Delta a^*)^2 + (\Delta b^*)^2]^{1/2}$$

wherein ΔL* represents the difference between L* values of the UV-unirradiated and UV-irradiated portions; Δa* represents the difference between a* values of the UV-unirradiated and UV-irradiated portions; and Δb* represents the difference between b* values of the UV-unirradiated and UV-irradiated portions.

(11) The degree of desorption of the adhered organic pigment from the composite particles was evaluated by the following method, and the results were classified into the following four ranks. The Rank 4 represents that the amount of the organic pigment desorbed from the surface of the composite particles was small.

That is, 2 g of the particles to be measured and 20 mL of ethanol were placed in a 50-mL conical flask and then subjected to ultrasonic dispersion for 60 min. Thereafter, the obtained dispersion was centrifuged at a rotating speed of 10,000 rpm for 15 min to separate the particles from the solvent. The obtained particles were dried at 80° C. for one hour, and the micrograph thereof was visually observed to count the number of the desorbed and re-aggregated organic pigment particles present in a visual field of the micrograph. The results are classified into the following four ranks.

Rank 1: Not less than 30 desorbed and re-aggregated pigment particles per 100 composite particles;

Rank 2: From 10 to less than 30 desorbed and re-aggregated pigment particles per 100 composite particles;

Rank 3: From 5 to less than 10 desorbed and re-aggregated pigment particles per 100 composite particles;

Rank 4: Less than 5 desorbed and re-aggregated pigment particles per 100 composite particles.

(12) The heat resistances of the respective particles were measured by the following method.

That is, the primary color enamel prepared above for measuring the tinting strength was applied onto a glass plate (0.8 mm×70 mm×150 mm) and dried to form a coating film having a thickness of 150 μm. The thus formed coating film was allowed to stand in a Geer oven at 240° C. for 1 hr to measure the hue values (L*, a* and b* values) of the coating film before and after being subjected to the heat treatment test. The heat resistance was expressed by the ΔE* value calculated according to the following formula:

$$\Delta E^* = [(\Delta L^*)^2 + (\Delta a^*)^2 + (\Delta b^*)^2]^{1/2}$$

wherein ΔL* represents the difference between L* values of the sample between before and after being subjected to the heat treatment test; Δa* represents the difference between a* values of the sample between before and after being subjected to the heat treatment test; and Δb* represents the difference between b* values of the sample between before and after being subjected to the heat treatment test.

(13) The number-average dispersed particle diameter and the volume-average dispersed particle diameter of the dispersion containing the colored composite microparticles, the coloring composition for color filters and the ink for ink-jet printing were measured by a dynamic light scattering method using a concentrated particle size analyzer "FPAR-1000" manufactured by Otsuka Denshi Co., Ltd.

(14) The dispersion stability of the dispersion and the ink for ink-jet printing was determined by the following method. That is, 25 mL of dispersion to be measured was filled in a 50 mL color comparison tube and allowed to stand at 60° C. for one week, and then visually observed to evaluate a degree of precipitation of the particles dispersed therein. The evaluation results are classified into the following five ranks.

1: Length of non-tinted portion was not less than 10 cm;
2: Length of non-tinted portion was from 5 cm to less than 10 cm;
3: Length of non-tinted portion was from 1 cm to less than 5 cm;
4: Length of non-tinted portion was less than 1 cm;
5: Non-tinted portion was not recognized.

(15) The rate of change (percentage of change) in viscosity of the dispersion containing the colored composite microparticles and the coloring composition for color filters were determined by the following method. That is, after the obtained dispersion was allowed to stand at 60° C. for one week, the viscosity of the dispersion was measured at 25° C. and a shear rate (D) of 383 sec$^{-1}$ using "E-type Viscometer EMD-R" (manufactured by Tokyo Keiki Co., Ltd.). The rate of change in viscosity of the dispersion was expressed by the percentage obtained by dividing the difference between the viscosity values measured before and after the standing test by the viscosity value measured before the standing test.

(16) The tinting strengths of the dispersion containing the colored composite microparticles and the coloring composition for color filters were respectively determined by the following method. That is, in the case of a water-based dispersion, an aqueous solution prepared by adjusting the concentration of each of the colored composite microparticles and the colorant for color filters to 0.08% by weight was filled in a quartz cell, whereas in the case of a solvent-based dispersion, a PGMEA solution prepared by adjusting the concentration of each of the colored composite microparticles and the colorant for color filters to 0.08% by weight was filled in a quartz cell. The absorption coefficient of the respective dispersions at a wavelength at which light absorption was largest was measured using a self-recording photoelectric spectrophotometer "UV-2100" (manufactured by SHIMADZU SEISAKUSHO CO., LTD.). The tinting strengths of the respective materials were expressed by a specific absorption coefficient $\epsilon_w$ calculated according to the following formula:

$$\epsilon_w = \epsilon_h / \epsilon_0$$

wherein $\epsilon_w$ represents a specific absorption coefficient; $\epsilon_h$ represents an absorption coefficient per unit weight of each of the colored composite microparticles and the colorant for color filters; and $\epsilon_0$ represents an absorption coefficient per unit weight of the organic pigment used as a raw material for each of the colored composite microparticles and the colorant for color filters.

The larger the specific absorption coefficient value, the higher the tinting strengths of the dispersion containing the colored composite microparticles and the coloring composition for color filters became.

(17) The viscosity of the coloring composition for color filters was expressed by the value obtained by measuring the viscosity of the resultant composition at 25° C. and a shear rate (D) of 383 sec$^{-1}$ using "E-type Viscometer EMD-R" (manufactured by Tokyo Keiki Co., Ltd.).

(18) The light transmittance of the coloring composition for color filters was determined by the following method. That is, the coloring composition for color filters was diluted such that the concentration of the organic pigment therein was 0.008% by weight, and the resultant diluted solution of the composition was filled in a quartz cell. The light transmittance at a wavelength of 530 nm in the case of the green-based coloring composition for color filters, the light transmittance at a wavelength of 460 nm in the case of the blue-based coloring composition for color filters, the light transmittance at a wavelength of 620 nm in the case of the red-based coloring composition for color filters, and the light transmittance at a wavelength of 550 nm in the case of the yellow-based coloring composition for color filters, were respectively measured using a self-recording photoelectric spectrophotometer "UV-2100" (manufactured by SHIMADZU SEISAKUSHO CO., LTD.).

(19) The chromaticity of the colored transparent film obtained from the coloring composition for color filters was determined by the following method. That is, the coloring composition for color filters prepared by the below-mentioned method was applied onto a clear base film to form a coating film having a thickness of 150 μm, and then dried to obtain a coating film piece. The chromaticity of the thus obtained coating film piece was measured using a spectrophotometric colorimeter "CM-3610d" (manufactured by MINOLTA CO., LTD.), and expressed according to XY chromaticity diagram prescribed by CIE (Commission Internationale de l'Eclairage).

(20) The light fastness of the colored transparent film for color filters obtained from the coloring composition for color filters was determined by the following method. That is, the coloring composition for color filters was applied onto a glass plate (0.8 mm×70 mm×150 mm) to form a coating film having a thickness of 150 μm and then dried, thereby obtaining a coating film piece. A part of the thus prepared coating film piece was covered with a metal foil, and an ultraviolet light was continuously irradiated over the coating film piece at an intensity of 100 mW/cm$^2$ for 6 hr using "EYE SUPER UV TESTER SUV-W13" (manufactured by IWASAKI DENKI CO., LTD.). Then, the hue values (L*, a* and b* values) of the metal foil-covered UV-unirradiated portion and the UV-irradiated portion of the coating film piece were respectively measured using a spectrophotometric colorimeter "CM-3610d" (manufactured by MINOLTA CO., LTD.). On the basis of the measured value of the UV-unirradiated portion as a standard value, the light fastness was expressed by the $\Delta E^*$ value calculated according to the following formula:

$$\Delta E^* = [(\Delta L^*)^2 + (\Delta a^*)^2 + (\Delta b^*)^2]^{1/2}$$

wherein $\Delta L^*$ represents the difference between L* values of the UV-unirradiated and UV-irradiated portions of the sample; $\Delta a^*$ represents the difference between a* values of the UV-unirradiated and UV-irradiated portions of the sample; and $\Delta b^*$ represents the difference between b* values of the UV-unirradiated and UV-irradiated portions of the sample.

(21) The heat resistance of the colored transparent film for color filters obtained from the coloring composition for color filters was determined by the following method. That is, the above coloring composition for color filters was applied onto a glass plate (0.8 mm×70 mm×150 mm) and dried to form a coating film having a thickness of 150 μm. The thus formed coating film piece was allowed to stand in a Geer oven at 240° C. for 1 hr to measure the hue values (L*, a* and b* values) of the coating film piece before and after being subjected to the heat treatment test. The heat resistance was expressed by the $\Delta E^*$ value calculated according to the following formula:

$$\Delta E^* = [(\Delta L^*)^2 + (\Delta a^*)^2 + (\Delta b^*)^2]^{1/2}$$

wherein $\Delta L^*$ represents the difference between L* values of the sample between before and after being subjected to the heat treatment test; $\Delta a^*$ represents the difference between a* values of the sample between before and after being subjected to the heat treatment test; and $\Delta b^*$ represents the difference between b* values of the sample between before and after being subjected to the heat treatment test.

(22) The light transmittance of the colored transparent film for color filters obtained from the coloring composition for color filters was determined by the following method. That is, using the coating film piece used for measuring the chromaticity of the colored transparent film for color filters, the light transmittance at a wavelength of 530 nm in the case of the green-based colored transparent film for color filters, the light transmittance at a wavelength of 460 nm in the case of the blue-based colored transparent film for color filters, the light transmittance at a wavelength of 620 nm in the case of the red-based colored transparent film for color filters, and the light transmittance at a wavelength of 550 nm in the case of the yellow-based colored transparent film for color filters, were respectively measured using a self-recording photoelectric spectrophotometer "UV-2100" (manufactured by SHIMADZU SEISAKUSHO CO., LTD.).

(23) The light transmittance of the color filter was determined by the following method. That is, using the color filter produced by the below-mentioned method, the light transmittances thereof at respective wavelengths of 530 nm, 460 nm and 620 nm were measured using a self-recording photoelectric spectrophotometer "UV-2100" (manufactured by SHIMADZU SEISAKUSHO CO., LTD.).

(24) The contrast of the color filter was determined by the following method. That is, the color filter prepared by the below-mentioned method was interposed between two polarizing plates on a back light, and the brightness (A) when arranging the two polarizing plates in parallel with each other and the brightness (B) when arranging the two polarizing plates perpendicularly to each other were respectively measured. The contrast was expressed by a ratio of (A) to (B) ((A)/(B)).

(25) The tinting strength of the ink for ink-jet printing was determined by the following method. That is, an aqueous solution prepared by adjusting the concentration of the colorant for inks for ink-jet printing to 0.08% by weight was filled in a quartz cell. The absorption coefficient of the solution at a wavelength at which light absorption was largest was measured using a self-recording photoelectric spectrophotometer "UV-2100" (manufactured by SHIMADZU SEISAKUSHO CO., LTD.). The tinting strength of the ink for ink-jet printing was expressed by a specific absorption coefficient $\epsilon_w$ calculated according to the following formula:

$$\epsilon_w = \epsilon_h / \epsilon_0$$

wherein $\epsilon_w$ represents a specific absorption coefficient; $\epsilon_h$ represents an absorption coefficient per unit weight of each colorant for inks for ink-jet printing; and $\epsilon_0$ represents an absorption coefficient per unit weight of the organic pigment used as a raw material for each colorant for inks for ink-jet printing.

The larger the specific absorption coefficient value, the higher the tinting strength of the dispersion containing the colorant for inks for ink-jet printing became.

(26) The average particle diameter ($Dd_{50}$), the particle diameter ($Dd_{84}$) and the maximum particle diameter ($Dd_{99}$) of the particles dispersed in the ink for ink-jet printing were measured by a dynamic light scattering method using a concentrated particle size analyzer "FPAR-1000" (manufactured by Otsuka Denshi Co., Ltd.). Meanwhile, the geometrical standard deviation ($Dd_{84}/Dd_{50}$) was expressed by the value calculated according to the following formula:

Geometrical standard deviation ($Dd_{84}/Dd_{50}$)={particle size ($Dd_{84}$) corresponding to 84.13% under integration sieve}/{particle size ($Dd_{50}$) corresponding to 50% under integration sieve}

The more the geometrical standard deviation value ($Dd_{84}/Dd_{50}$) nears 1, the more excellent the particle size distribution of diameters of the behavior particles in the ink for ink-jet printing.

(27) The rate of change (percentage of change) in number-average dispersed particle diameter of the ink for ink-jet printing was determined by the following method. That is, after the ink was allowed to stand at 60° C. for one month, the number-average dispersed particle diameter was measured by a dynamic light scattering method using a concentrated particle size analyzer "FPAR-1000" (manufactured by Otsuka Denshi Co., Ltd.). The rate of change in number-average dispersed particle diameter of the ink for ink-jet printing was expressed by the percentage obtained by dividing the difference between the number-average dispersed particle diameters measured before and after the standing test by the number-average dispersed particle diameter measured before the standing test.

(28) The hue and chroma of the ink for ink-jet printing were determined by the following method. That is, hue values of printed images recorded on a plain paper "KB" (produced by KOKUYO Co., Ltd.) were measured using a multi-spectrocolour-meter "MSC-IS-2D" (manufactured by SUGA SHIKENKI CO., LTD.) to determine color specification values (L*, a* and b* values) thereof according to JIS Z 8729 as well as the C* value thereof.

(29) The light fastness of the ink for ink-jet printing was measured by the following method.

That is, a plain paper "KB" (produced by KOKUYO Co., Ltd.) was printed with the ink for ink-jet printing, and a half of the thus printed paper was covered with a metal foil, and an ultraviolet light was continuously irradiated over the printed paper at an intensity of 100 mW/cm² for 6 hr using "EYE SUPER UV TESTER SUV-W13" (manufactured by IWASAKI DENKI CO., LTD.). Then, the hue values (L*, a* and b* values) of the metal foil-covered UV-unirradiated portion and the UV-irradiated portion of the printed paper were respectively measured using a multi-spectro-colourmeter "MSC-IS-2D" (manufactured by SUGA SHIKENKI CO., LTD.). On the basis of the measured value of the metal foil-covered UV-unirradiated portion as a standard value, the light fastness was expressed by the ΔE* value calculated according to the following formula:)

$$\Delta E^* = [(\Delta L^*)^2 + (\Delta a^*)^2 + (\Delta b^*)^2]^{1/2}$$

wherein ΔL* represents the difference between L* values of the UV-unirradiated and UV-irradiated portions of the sample; Δa* represents the difference between a* values of the UV-unirradiated and UV-irradiated portions of the sample; and Δb* represents the difference between b* values of the UV-unirradiated and UV-irradiated portions of the sample.

(30) The anti-clogging property of the ink for ink-jet printing was determined by the following method. That is, the ink was filled in a cartridge of an ink-jet printer "Deskjet 970Cxi" manufactured by HEWLETT PACKARD Corp., and a plain paper "KB" (produced by KOKUYO Co., Ltd.) was printed therewith at room temperature to visually observe and evaluate defects and lacks of the obtained printed images as well as the degree of non-ejection of the ink. The evaluation results are classified into the following five ranks.

1: Defects or lacks of printed images or non-ejection of the ink occurred from the first printing;
2: Defects or lacks of printed images or non-ejection of the ink occurred from the fifth printing;
3: Defects or lacks of printed images or non-ejection of the ink occurred from the tenth printing;
4: Defects or lacks of printed images or non-ejection of the ink occurred from the twentieth printing;
5: Defects or lacks of printed images or non-ejection of the ink occurred from the twenty-fifth printing.

First, Examples (Examples 1 to 3) concerning the colored composite microparticles and the dispersion thereof according to the first to third aspects of the present invention as well as the corresponding Comparative Examples (Comparative Examples 1 to 3) are described.

<Composite Particles 1: Production of Composite Particles>

140 g of methylhydrogenpolysiloxane (tradename: "TSF484", produced by GE TOSHIBA SILICONE CO., LTD.) was added to 7.0 kg of silica 1 (average particle diameter of primary particles: 16 nm; BET specific surface area value: 204.3 m²/g; light fastness ΔE*: 5.36) while operating an edge runner, and the resultant mixture was mixed and stirred for 30 min under a linear load of 588 N/cm (60 Kg/cm) at a stirring speed of 22 rpm.

Then, 7.0 kg of the organic pigment G (kind: phthalocyanine-based pigment; average particle diameter: 100 nm; BET specific surface area value: 67.3 m²/g; L* value: 29.77; a* value: −15.30; b* value: −1.12; C* value: 15.34; light fastness ΔE*: 8.06; ζ potential in a water-based system: −3.6 mV; ζ potential in a solvent-based system: −1.5 mV) was added to the above-obtained mixture for 30 min while operating the edge runner, and the resultant mixture was mixed and stirred for 100 min under a linear load of 392 N/cm (40 Kg/cm) at a stirring speed of 22 rpm, thereby allowing the organic pigment G to adhere onto the methylhydrogenpolysiloxane coating layer formed on the respective silica particles. Then, the obtained particles were dried at 80° C. for 60 min using a dryer, thereby obtaining composite particles 1.

The thus obtained composite particles 1 had an average primary particle diameter of 20 nm, a BET specific surface area value of 78.6 m²/g, an L* value of 30.22, an a* value of −14.92, a b* value of −1.10, a C* value of 14.96 and a degree of desorption of organic pigment of Rank 4. In addition, it was confirmed that the composite particles 1 had a tinting strength of 93%, a light fastness ΔE* of 2.12, a ζ potential in a water-based system of −22.7 mV, a ζ potential in a solvent-based system of −6.6 mV, and a coating amount of methylhydrogenpolysiloxane of 0.53% by weight (calculated as C), and that the amount of the organic pigment G adhered was 18.15% by weight (calculated as C; corresponding to 100 parts by weight based on 100 parts by weight of the silica particles).

As a result of observing the micrograph of the obtained composite particles 1, since substantially no particles of the organic pigment G added were recognized from the micrograph, it was confirmed that a substantially whole amount of the organic pigment G added was adhered onto the coating layer composed of methylhydrogenpolysiloxane.

Example 1-1

Production of Colored Composite Microparticles

A 3-L beaker was charged with 200 g of the above-obtained composite particles (composite particles 1) and 2 L of a 0.65 mol/L sodium hydroxide aqueous solution (0.2 time a theoretical amount thereof capable of dissolving the silica particles as core particles and the surface-modifying agent) to prepare a solution having a pH value of 13.1. The resultant solution was stirred at 60° C. for 30 min and then subjected to filtration to separate a solid therefrom. The thus separated solid was washed with water and then dried, thereby obtaining colored composite microparticles.

It was confirmed that the thus obtained colored composite microparticles had an average primary particle diameter of 15 nm, a number-average particle diameter of 22 nm, a volume-average particle diameter of 78 nm, and a BET specific surface area value of 83.6 m²/g. Also, the amount of silica enclosed in the colored composite microparticles was 1.06% by weight (calculated as Si). As to the hue values of the colored composite microparticles, the L* value thereof was 31.33; the a* value thereof was −14.29; the b* value thereof was −1.10; and the C* value thereof was 14.33. In addition, it was confirmed that the colored composite microparticles had a tinting strength of 105%, a light fastness ΔE* of 3.56, a ζ potential in a water-based system of −13.8 mV, and a ζ potential in a solvent-based system of −6.4 mV.

Example 2-1

Production of Water-Based Dispersion 15 parts by weight of the colored composite microparticles obtained in Example 1-1 and 100 parts by weight of water were added together with 100 g of 0.35 mmφ glass beads into a 140-mL glass bottle, and then dispersed for 2 hr by a paint shaker, thereby obtaining a water-based dispersion.

As a result, it was confirmed that the resultant water-based dispersion containing the colored composite microparticles had a number-average dispersed particle diameter of 19 nm, a volume-average dispersed particle diameter of 42 nm, a dispersion stability of Rank 5, a rate of change in viscosity of 4.8% and a specific absorption coefficient $\epsilon_w$ of 2.46.

Example 3-1

Production of Solvent-Based Dispersion 15 parts by weight of the colored composite microparticles obtained in Example 1-1 and 100 parts by weight of PGMEA were added together with 100 g of 0.35 mmφ glass beads into a 140-mL glass bottle, and then dispersed for 2 hr by a paint shaker, thereby obtaining a solvent-based dispersion.

As a result, it was confirmed that the resultant solvent-based dispersion containing the colored composite microparticles had a number-average dispersed particle diameter of 19 nm, a volume-average dispersed particle diameter of 48 nm, a dispersion stability of Rank 5, a rate of change in viscosity of 4.7% and a specific absorption coefficient $\epsilon_w$ of 2.44.

According to the procedure for producing the composite particles 1 and Examples 1-1 to 3-1, the composite particles, the colored composite microparticles, the water-based dispersion and the solvent-based dispersion were produced. The essential production conditions as well as various properties of the obtained composite particles, colored composite microparticles, water-based dispersion and solvent-based dispersion are shown below.

Silica 1 to Silica 4:

As the core particles, silica particles 1 to 4 having properties shown in Table 1 below were prepared.

Organic Pigments G, B, R-1, Y and Bk:

As the organic pigment, organic pigments having properties shown in Table 2 below were prepared.

TABLE 1

| | Properties of silica particles | | | |
|---|---|---|---|---|
| Core particles | Average primary particle diameter (nm) | BET specific surface area value (m²/g) | Light fastness ΔE* value (-) | Heat resistance ΔE* value (-) |
| Silica 1 | 16 | 204.3 | 5.36 | 3.46 |
| Silica 2 | 21 | 189.2 | 5.41 | 3.52 |
| Silica 3 | 40 | 96.6 | 5.04 | 3.28 |
| Silica 4 | 60 | 52.8 | 5.16 | 3.22 |

TABLE 2

| Organic pigments | Properties of organic pigment Kind |
|---|---|
| Organic pigment G | Pigment green (phthalocyanine-based pigment) |
| Organic pigment B | Pigment blue (phthalocyanine-based pigment) |
| Organic pigment R | Pigment red (diketopyrrolopyrrole-based pigment) |
| Organic pigment R-1 | Pigment red (quinacridone-based pigment) |
| Organic pigment Y | Pigment yellow (quinophthalone-based pigment) |
| Organic pigment Bk | Pigment black (perylene-based pigment) |

| | Properties of organic pigment | | |
|---|---|---|---|
| Organic pigment | Average primary particle diameter (nm) | BET specific surface area value (m²/g) | Geometrical standard deviation value (-) |
| Organic pigment G | 100 | 67.3 | 2.12 |
| Organic pigment B | 80 | 87.9 | 2.15 |
| Organic pigment R | 130 | 82.4 | — |
| Organic pigment R-1 | 150 | 42.6 | 2.20 |
| Organic pigment Y | 252 | 27.9 | 2.24 |
| Organic pigment Bk | 22 | 134.0 | — |

| | Properties of organic pigment Hue | | | |
|---|---|---|---|---|
| Organic pigment | L* value (-) | a* value (-) | b* value (-) | C* value (-) |
| Organic pigment G | 29.77 | -15.30 | -1.12 | 15.34 |
| Organic pigment B | 23.04 | 5.99 | -13.16 | 14.46 |
| Organic pigment R | 38.42 | 43.20 | 23.36 | 49.11 |
| Organic pigment R-1 | 42.35 | 49.95 | 24.96 | 55.84 |
| Organic pigment Y | 84.21 | 3.00 | 91.31 | 91.36 |
| Organic pigment Bk | 23.12 | 0.93 | 0.73 | 1.18 |

| | Properties of organic pigment | | | |
|---|---|---|---|---|
| | | | ζ potential | |
| Organic pigment | Light fastness ΔE* value (-) | Heat resistance ΔE* value (-) | Water-based system (mV) | Solvent-based system (mV) |
| Organic pigment G | 8.06 | 7.46 | -3.6 | -1.5 |
| Organic pigment B | 8.83 | 9.04 | -2.9 | -1.3 |
| Organic pigment R | 7.92 | 7.28 | -2.9 | -1.2 |
| Organic pigment R-1 | 7.92 | — | -2.9 | -1.2 |
| Organic pigment Y | 7.22 | 8.84 | -3.1 | -1.4 |
| Organic pigment Bk | 5.46 | — | -3.8 | -1.6 |

<Production of Composite Particles>

Composite Particles 2 to 5:

The same procedure as defined in the production of composite particles 1 was conducted except that kinds of core particles, kinds and amounts of surface modifying agents added, linear load and treating time for edge runner treatment used in the coating step with the surface modifying agents, kinds and amounts of organic pigments added in organic pigment-adhering step, and linear load and treating time for edge runner treatment used in the organic pigment-adhering step, were changed variously, thereby obtaining composite particles. The essential production conditions are shown in Table 3, and various properties of the obtained composite particles are shown in Table 4.

TABLE 3

Production of composite particles
Coating step with surface modifying agent
Additives

| Composite particles | Kind of core particles | Kind | Amount added (wt. part) |
|---|---|---|---|
| Composite particles 1 | Silica 1 | Methylhydrogen polysiloxane | 2.0 |
| Composite particles 2 | Silica 2 | Methyltriethoxysilane | 4.0 |
| Composite particles 3 | Silica 3 | Phenyltriethoxysilane | 6.0 |
| Composite particles 4 | Silica 4 | γ-aminopropyl triethoxysilane | 12.0 |
| Composite particles 5 | Silica 1 | Methylhydrogen polysiloxane | 3.0 |

Production of composite particles
Coating step with surface modifying agent

| | Edge runner treatment | | | Coating amount |
|---|---|---|---|---|
| Composite particles | Linear load (N/cm) | Linear load (Kg/cm) | Time (min) | (calculated as C) (wt %) |
| Composite particles 1 | 588 | 60 | 30 | 0.53 |
| Composite particles 2 | 441 | 45 | 20 | 0.26 |
| Composite particles 3 | 735 | 75 | 20 | 2.05 |
| Composite particles 4 | 588 | 60 | 60 | 1.74 |
| Composite particles 5 | 588 | 60 | 45 | 0.36 |

Production of composite particles
Organic pigment-adhesion step
Organic pigment

| Composite particles | Kind | Amount adhered (wt. part) |
|---|---|---|
| Composite particles 1 | G | 100.0 |
| Composite particles 2 | B | 150.0 |
| Composite particles 3 | R-1 | 200.0 |
| Composite particles 4 | Y | 100.0 |
| Composite particles 5 | Bk | 100.0 |

Production of composite particles
Organic pigment-adhesion step

| | Edge runner treatment | | | Amount adhered (calculated as C) |
|---|---|---|---|---|
| Composite particles | Linear load (N/cm) | Linear load (Kg/cm) | Time (min) | (wt %) |
| Composite particles 1 | 392 | 40 | 100 | 18.15 |
| Composite particles 2 | 588 | 60 | 120 | 40.04 |
| Composite particles 3 | 588 | 60 | 120 | 41.09 |
| Composite particles 4 | 735 | 75 | 30 | 21.33 |
| Composite particles 5 | 441 | 40 | 90 | 46.64 |

TABLE 4

Properties of composite particles

| Composite particles | Average primary particle diameter (nm) | BET specific surface area value ($m^2/g$) | Degree of desorption of organic pigment (−) |
|---|---|---|---|
| Composite particles 1 | 20 | 78.6 | 4 |
| Composite particles 2 | 27 | 90.4 | 4 |
| Composite particles 3 | 47 | 51.4 | 4 |
| Composite particles 4 | 64 | 46.6 | 4 |
| Composite particles 5 | 23 | 124.6 | 4 |

Properties of composite particles
Hue

| Composite particles | $L^*$ value (−) | $a^*$ value (−) | $b^*$ value (−) | $C^*$ value (−) |
|---|---|---|---|---|
| Composite particles 1 | 30.22 | −14.92 | −1.10 | 14.96 |
| Composite particles 2 | 26.08 | 5.92 | −12.88 | 14.18 |
| Composite particles 3 | 48.60 | 48.02 | 22.48 | 53.02 |
| Composite particles 4 | 86.23 | 2.89 | 89.66 | 89.71 |
| Composite particles 5 | 23.86 | 0.38 | 0.61 | 0.72 |

Properties of composite particles

| | | | ζ potential | |
|---|---|---|---|---|
| Composite particles | Tinting strength (%) | Light fastness $\Delta E^*$ value (−) | Water-based system (mV) | Solvent-based system (mV) |
| Composite particles 1 | 93 | 2.12 | −22.7 | −6.6 |
| Composite particles 2 | 95 | 2.66 | −21.8 | −6.5 |
| Composite particles 3 | 97 | 2.35 | −20.2 | −6.4 |
| Composite particles 4 | 92 | 2.09 | −23.0 | −6.7 |
| Composite particles 5 | 94 | 1.49 | −23.6 | −7.0 |

Production of Colored Composite Microparticles

Examples 1-2 to 1-8 and Comparative Examples 1-1 to 1-3

The same procedure as defined in Example 1-1 was conducted except that kinds of composite particles, pH values of dissolution solutions used upon alkali dissolution, ratio of actual amount of alkali added to theoretical amount thereof, and treating temperature and time of the alkali dissolution, were changed variously, thereby obtaining colored composite microparticles. Meanwhile, the concentration (g/100 mL) of the composite particles means a weight (g) of the composite particles based on 100 mL of the dissolution solution. Also, in Example 1-2, freeze-drying was conducted as the drying step. The essential production conditions are shown in Table 5, and various properties of the obtained colored composite microparticles are shown in Table 6.

Comparative Example 1-4

Follow-Up Test of Example 1 of Japanese Patent Application Laid-open (KOKAI) No. 2005-36150

80 g of the organic pigment Y (kind: quinophthalone-based pigment; average primary particle diameter: 252 nm; BET specific surface area value: 27.9 m²/g; L* value: 84.21; a* value: 3.00; b* value: 91.31; C* value: 91.36; light fastness ΔE*: 7.22; ζ potential in a water-based system: −3.1 mV; ζ potential in a solvent-based system: −1.4 mV) was charged together with 6 g of xylene and 2 kg of 8 mmϕ steel beads into a dry-type attritor, and the attritor was operated at 80° C. for 2 hr at a rotating speed of 300 rpm, thereby obtaining a quinophthalone pigment. Various properties of the thus obtained quinophthalone pigment are shown in Table 6.

TABLE 5

| Examples and Comparative Examples | Production of colored composite microparticles Composite particles | |
|---|---|---|
| | Kind | Concentration (g/100 mL) |
| Example 1-1 | Composite particles 1 | 10.0 |
| Example 1-2 | Composite particles 1 | 10.0 |
| Example 1-3 | Composite particles 1 | 10.0 |
| Example 1-4 | Composite particles 1 | 10.0 |
| Example 1-5 | Composite particles 2 | 10.0 |
| Example 1-6 | Composite particles 3 | 10.0 |
| Example 1-7 | Composite particles 4 | 10.0 |
| Example 1-8 | Composite particles 5 | 10.0 |
| Comparative Example 1-1 | Composite particles 1 | 10.0 |
| Comparative Example 1-2 | Composite particles 1 | 10.0 |
| Comparative Example 1-3 | Composite particles 1 | 10.0 |

| Examples and Comparative Examples | Production of colored composite microparticles Dissolution solution | | |
|---|---|---|---|
| | Kind | pH (−) | Ratio to theoretical amount (time) |
| Example 1-1 | Sodium hydroxide | 13.1 | 0.2 |
| Example 1-2 | Sodium hydroxide | 13.1 | 0.2 |
| Example 1-3 | Sodium hydroxide | 13.1 | 0.2 |
| Example 1-4 | Sodium hydroxide | 13.7 | 0.9 |
| Example 1-5 | Potassium hydroxide | 13.2 | 0.3 |
| Example 1-6 | Potassium hydroxide | 13.0 | 0.1 |
| Example 1-7 | Sodium hydroxide | 13.4 | 0.7 |
| Example 1-8 | Sodium hydroxide | 13.1 | 0.2 |
| Comparative Example 1-1 | Sodium hydroxide | 13.9 | 1.5 |
| Comparative Example 1-2 | Sodium hydroxide | 13.1 | 0.2 |
| Comparative Example 1-3 | Sodium hydroxide | 8.6 | 0.0 |

TABLE 5-continued

| Examples and Comparative Examples | Production of colored composite microparticles | | |
|---|---|---|---|
| | Treating temperature (° C.) | Treating time (min) | Use or non-use of freeze-drying |
| Example 1-1 | 60 | 30 | None |
| Example 1-2 | 60 | 30 | Used |
| Example 1-3 | 95 | 30 | None |
| Example 1-4 | 50 | 30 | None |
| Example 1-5 | 60 | 30 | None |
| Example 1-6 | 70 | 30 | None |
| Example 1-7 | 50 | 30 | None |
| Example 1-8 | 60 | 30 | None |
| Comparative Example 1-1 | 60 | 30 | None |
| Comparative Example 1-2 | 25 | 30 | None |
| Comparative Example 1-3 | 60 | 600 | None |

TABLE 6

| Examples and Comparative Examples | Properties of colored composite microparticles | |
|---|---|---|
| | Si content (wt %) | Average primary particle diameter (nm) |
| Example 1-1 | 1.06 | 15 |
| Example 1-2 | 1.06 | 15 |
| Example 1-3 | 0.88 | 16 |
| Example 1-4 | 0.08 | 14 |
| Example 1-5 | 0.95 | 14 |
| Example 1-6 | 2.12 | 28 |
| Example 1-7 | 0.22 | 32 |
| Example 1-8 | 1.18 | 20 |
| Comparative Example 1-1 | 0.00 | 14 |
| Comparative Example 1-2 | 27.44 | 52 |
| Comparative Example 1-3 | 30.16 | 31 |
| Comparative Example 1-4 | 0.00 | 52 |

| Examples and Comparative Examples | Properties of colored composite microparticles | | |
|---|---|---|---|
| | Number-average particle diameter (nm) | Volume-average particle diameter (nm) | BET specific surface area value (m²/g) |
| Example 1-1 | 22 | 78 | 83.6 |
| Example 1-2 | 20 | 63 | 89.4 |
| Example 1-3 | 24 | 84 | 83.0 |
| Example 1-4 | 29 | 106 | 78.4 |
| Example 1-5 | 24 | 84 | 96.3 |
| Example 1-6 | 33 | 96 | 66.2 |
| Example 1-7 | 42 | 98 | 59.4 |
| Example 1-8 | 31 | 89 | 131.6 |
| Comparative Example 1-1 | 38 | 224 | 48.8 |
| Comparative Example 1-2 | 106 | 344 | 39.6 |
| Comparative Example 1-3 | 43 | 172 | 52.6 |
| Comparative Example 1-4 | 64 | 282 | 44.2 |

TABLE 6-continued

| Examples and Comparative Examples | Properties of colored composite microparticles | | | |
|---|---|---|---|---|
| | L* value (−) | a* value (−) | b* value (−) | C* value (−) |
| Example 1-1 | 31.33 | −14.29 | −1.10 | 14.33 |
| Example 1-2 | 31.42 | −14.53 | −1.16 | 14.58 |
| Example 1-3 | 31.20 | −14.23 | −1.08 | 14.27 |
| Example 1-4 | 30.98 | −14.62 | −1.08 | 14.66 |
| Example 1-5 | 26.44 | 5.84 | −12.88 | 14.14 |
| Example 1-6 | 46.42 | 48.84 | 24.52 | 54.65 |
| Example 1-7 | 85.16 | 2.92 | 91.42 | 91.47 |
| Example 1-8 | 22.49 | 0.31 | 0.54 | 0.62 |
| Comparative Example 1-1 | 29.74 | −14.88 | −1.13 | 14.92 |
| Comparative Example 1-2 | 31.66 | −14.67 | −1.09 | 14.71 |
| Comparative Example 1-3 | 31.84 | −13.97 | −1.12 | 14.01 |
| Comparative Example 1-4 | 85.27 | 3.02 | 91.66 | 91.71 |

| Examples and Comparative Examples | Properties of colored composite microparticles | | | |
|---|---|---|---|---|
| | Tinting strength (%) | Light fastness ΔE* value (−) | ζ potential Water-based system (mV) | ζ potential Solvent-based system (mV) |
| Example 1-1 | 105 | 3.56 | −13.8 | −6.4 |
| Example 1-2 | 105 | 3.54 | −13.8 | −6.4 |
| Example 1-3 | 106 | 4.24 | −11.6 | −5.6 |
| Example 1-4 | 107 | 4.88 | −8.9 | −3.1 |
| Example 1-5 | 105 | 3.61 | −12.9 | −5.9 |
| Example 1-6 | 103 | 3.34 | −14.8 | −7.1 |
| Example 1-7 | 105 | 3.94 | −11.9 | −5.0 |
| Example 1-8 | 105 | 1.69 | −14.0 | −6.6 |
| Comparative Example 1-1 | 107 | 6.23 | −3.6 | −1.6 |
| Comparative Example 1-2 | 95 | 2.88 | −17.4 | −7.5 |
| Comparative Example 1-3 | 94 | 2.66 | −21.4 | −7.6 |
| Comparative Example 1-4 | 101 | 8.31 | −3.2 | −1.4 |

Water-Based Dispersion

Examples 2-2 to 2-8 and Comparative Examples 2-1 to 2-10

The same procedure as defined in Example 2-1 was conducted except that kinds and amounts of colored composite microparticles blended were changed variously, thereby obtaining water-based dispersions. The essential production conditions and various properties of the obtained water-based dispersions are shown in Table 7.

Example 2-9

100 parts by weight of the colored composite microparticles and 100 parts by weight of water were mixed together, and then kneaded and dispersed under heating at 50° C. using a triple roll mill, thereby obtaining a water-based dispersion. The essential production conditions and various properties of the obtained water-based dispersion are shown in Table 7.

TABLE 7

| Examples and Comparative Examples | Production of water-based dispersion | | | |
|---|---|---|---|---|
| | Colored composite microparticles | | Solvent | |
| | Kind | Amount blended (wt. part) | Kind | Amount blended (wt. part) |
| Example 2-1 | Example 1-1 | 15.0 | Water | 100.0 |
| Example 2-2 | Example 1-2 | 15.0 | Water | 100.0 |
| Example 2-3 | Example 1-3 | 15.0 | Water | 100.0 |
| Example 2-4 | Example 1-4 | 15.0 | Water | 100.0 |
| Example 2-5 | Example 1-5 | 15.0 | Water | 100.0 |
| Example 2-6 | Example 1-6 | 15.0 | Water | 100.0 |
| Example 2-7 | Example 1-7 | 15.0 | Water | 100.0 |
| Example 2-8 | Example 1-8 | 15.0 | Water | 100.0 |
| Example 2-9 | Example 1-1 | 100.0 | Water | 100.0 |
| Comparative Example 2-1 | Organic pigment G | 15.0 | Water | 100.0 |
| Comparative Example 2-2 | Organic pigment B | 15.0 | Water | 100.0 |
| Comparative Example 2-3 | Organic pigment R-1 | 15.0 | Water | 100.0 |
| Comparative Example 2-4 | Organic pigment Y | 15.0 | Water | 100.0 |
| Comparative Example 2-5 | Organic pigment Bk | 15.0 | Water | 100.0 |
| Comparative Example 2-6 | Composite particles 1 | 15.0 | Water | 100.0 |
| Comparative Example 2-7 | Comparative Example 1-1 | 15.0 | Water | 100.0 |
| Comparative Example 2-8 | Comparative Example 1-2 | 15.0 | Water | 100.0 |
| Comparative Example 2-9 | Comparative Example 1-3 | 15.0 | Water | 100.0 |
| Comparative Example 2-10 | Comparative Example 1-4 | 15.0 | Water | 100.0 |

| Examples and Comparative Examples | Properties of water-based dispersion | |
|---|---|---|
| | Number-average dispersed particle diameter (nm) | Volume-average dispersed particle diameter (nm) |
| Example 2-1 | 19 | 42 |
| Example 2-2 | 18 | 36 |
| Example 2-3 | 20 | 58 |
| Example 2-4 | 22 | 62 |
| Example 2-5 | 21 | 46 |
| Example 2-6 | 28 | 66 |
| Example 2-7 | 34 | 88 |
| Example 2-8 | 19 | 76 |
| Example 2-9 | 20 | 46 |
| Comparative Example 2-1 | 216 | 526 |
| Comparative Example 2-2 | 189 | 484 |
| Comparative Example 2-3 | 340 | 652 |
| Comparative Example 2-4 | 564 | 1244 |
| Comparative Example 2-5 | 189 | 463 |
| Comparative Example 2-6 | 24 | 42 |
| Comparative Example 2-7 | 28 | 362 |
| Comparative Example 2-8 | 236 | 414 |
| Comparative Example 2-9 | 89 | 274 |
| Comparative Example 2-10 | 72 | 313 |

TABLE 7-continued

Properties of water-based dispersion

| Examples and Comparative Examples | Dispersion stability Visual observation (-) | Rate of change in viscosity (%) | Specific absorption coefficient (-) |
|---|---|---|---|
| Example 2-1 | 5 | 4.8 | 2.46 |
| Example 2-2 | 5 | 4.0 | 2.50 |
| Example 2-3 | 5 | 8.9 | 2.38 |
| Example 2-4 | 4 | 10.1 | 2.42 |
| Example 2-5 | 5 | 4.8 | 2.38 |
| Example 2-6 | 5 | 4.2 | 1.92 |
| Example 2-7 | 5 | 5.2 | 1.98 |
| Example 2-8 | 5 | 5.9 | 2.42 |
| Example 2-9 | — | — | 2.41 |
| Comparative Example 2-1 | 1 | 34.6 | 1.00 |
| Comparative Example 2-2 | 1 | 42.2 | 1.00 |
| Comparative Example 2-3 | 1 | 40.4 | 1.00 |
| Comparative Example 2-4 | 1 | 48.3 | 1.00 |
| Comparative Example 2-5 | 1 | 51.3 | 1.00 |
| Comparative Example 2-6 | 5 | 3.6 | 0.97 |
| Comparative Example 2-7 | 2 | 28.6 | 1.31 |
| Comparative Example 2-8 | 2 | 20.3 | 0.96 |
| Comparative Example 2-9 | 3 | 12.8 | 0.98 |
| Comparative Example 2-10 | 2 | 34.4 | 1.16 |

Solvent-Based Dispersion

Examples 3-2 to 3-8 and Comparative Examples 3-1 to 3-10

The same procedure as defined in Example 3-1 was conducted except that kinds and amounts of colored composite microparticles blended were changed variously, thereby obtaining solvent-based dispersions. The essential production conditions and various properties of the obtained solvent-based dispersions are shown in Table 8.

Example 3-9

100 parts by weight of the colored composite microparticles and 100 parts by weight of PGMEA were mixed together, and then kneaded and dispersed under heating at 50° C. using a triple roll mill, thereby obtaining a solvent-based dispersion. The essential production conditions and various properties of the obtained solvent-based dispersion are shown in Table 8.

TABLE 8

Production of solvent-based dispersion

| Examples and Comparative Examples | Colored composite microparticles Kind | Amount blended (wt part) | Solvent Kind | Amount blended (wt part) |
|---|---|---|---|---|
| Example 3-1 | Example 1-1 | 15.0 | PGMEA | 100.0 |
| Example 3-2 | Example 1-2 | 15.0 | PGMEA | 100.0 |
| Example 3-3 | Example 1-3 | 15.0 | PGMEA | 100.0 |
| Example 3-4 | Example 1-4 | 15.0 | PGMEA | 100.0 |
| Example 3-5 | Example 1-5 | 15.0 | PGMEA | 100.0 |
| Example 3-6 | Example 1-6 | 15.0 | PGMEA | 100.0 |
| Example 3-7 | Example 1-7 | 15.0 | PGMEA | 100.0 |
| Example 3-8 | Example 1-8 | 15.0 | PGMEA | 100.0 |
| Example 3-9 | Example 1-1 | 100.0 | PGMEA | 100.0 |
| Comparative Example 3-1 | Organic pigment G | 15.0 | PGMEA | 100.0 |
| Comparative Example 3-2 | Organic pigment B | 15.0 | PGMEA | 100.0 |
| Comparative Example 3-3 | Organic pigment R-1 | 15.0 | PGMEA | 100.0 |
| Comparative Example 3-4 | Organic pigment Y | 15.0 | PGMEA | 100.0 |
| Comparative Example 3-5 | Organic pigment Bk | 15.0 | PGMEA | 100.0 |
| Comparative Example 3-6 | Composite particles 1 | 15.0 | PGMEA | 100.0 |
| Comparative Example 3-7 | Comparative Example 1-1 | 15.0 | PGMEA | 100.0 |
| Comparative Example 3-8 | Comparative Example 1-2 | 15.0 | PGMEA | 100.0 |
| Comparative Example 3-9 | Comparative Example 1-3 | 15.0 | PGMEA | 100.0 |
| Comparative Example 3-10 | Comparative Example 1-4 | 15.0 | PGMEA | 100.0 |

Properties of solvent-based dispersion

| Examples and Comparative Examples | Number-average dispersed particle diameter (nm) | Volume-average dispersed particle diameter (nm) |
|---|---|---|
| Example 3-1 | 19 | 48 |
| Example 3-2 | 19 | 40 |
| Example 3-3 | 20 | 54 |
| Example 3-4 | 21 | 60 |
| Example 3-5 | 23 | 43 |
| Example 3-6 | 29 | 62 |
| Example 3-7 | 34 | 85 |
| Example 3-8 | 19 | 72 |
| Example 3-9 | 21 | 52 |
| Comparative Example 3-1 | 204 | 493 |
| Comparative Example 3-2 | 181 | 452 |
| Comparative Example 3-3 | 304 | 606 |
| Comparative Example 3-4 | 552 | 1103 |
| Comparative Example 3-5 | 184 | 429 |
| Comparative Example 3-6 | 23 | 40 |
| Comparative Example 3-7 | 29 | 340 |
| Comparative Example 3-8 | 210 | 394 |
| Comparative Example 3-9 | 82 | 259 |
| Comparative Example 3-10 | 76 | 303 |

Properties of solvent-based dispersion

| Examples and Comparative Examples | Dispersion stability Visual observation (-) | Rate of change in viscosity (%) | Specific absorption coefficient (-) |
|---|---|---|---|
| Example 3-1 | 5 | 4.7 | 2.44 |
| Example 3-2 | 5 | 4.2 | 2.46 |

TABLE 8-continued

| | | | |
|---|---|---|---|
| Example 3-3 | 5 | 7.6 | 2.38 |
| Example 3-4 | 4 | 9.2 | 2.38 |
| Example 3-5 | 5 | 4.8 | 2.36 |
| Example 3-6 | 5 | 5.2 | 1.88 |
| Example 3-7 | 5 | 5.3 | 1.92 |
| Example 3-8 | 5 | 5.1 | 2.44 |
| Example 3-9 | — | — | 2.36 |
| Comparative Example 3-1 | 1 | 32.3 | 1.00 |
| Comparative Example 3-2 | 1 | 40.9 | 1.00 |
| Comparative Example 3-3 | 1 | 40.2 | 1.00 |
| Comparative Example 3-4 | 1 | 46.6 | 1.00 |
| Comparative Example 3-5 | 1 | 49.3 | 1.00 |
| Comparative Example 3-6 | 5 | 3.5 | 1.00 |
| Comparative Example 3-7 | 2 | 27.4 | 1.35 |
| Comparative Example 3-8 | 2 | 22.9 | 0.98 |
| Comparative Example 3-9 | 3 | 4.0 | 0.99 |
| Comparative Example 3-10 | 2 | 32.6 | 1.15 |

Next, Examples (Examples 4 to 9) concerning the colorant for color filter, the coloring composition for color filters and the color filter according to the fourth to tenth aspects of the present invention as well as the corresponding Comparative Examples (Comparative Examples 4 to 9) are described.

<Composite Particles 6: Production of Composite Particles (G)>

70 g of methylhydrogenpolysiloxane (tradename: "TSF484", produced by GE TOSHIBA SILICONE CO., LTD.) was added to 3.5 kg of silica 1 (average particle diameter of primary particles: 16 nm; BET specific surface area value: 204.3 m$^2$/g; light fastness $\Delta E^*$: 5.36; heat resistance $\Delta E^*$: 3.46) while operating an edge runner, and the resultant mixture was mixed and stirred for 30 minutes under a linear load of 588 N/cm (60 Kg/cm) at a stirring speed of 22 rpm.

Then, 7.0 kg of the organic pigment G (kind: phthalocyanine-based pigment; average primary particle diameter: 100 nm; BET specific surface area value: 67.3 m$^2$/g; L* value: 29.77; a* value: −15.30; b* value: −1.12; C* value: 15.34; light fastness $\Delta E^*$: 8.06; heat resistance $\Delta E^*$: 7.46; ζ potential in a water-based system: −3.6 mV; ζ potential in a solvent-based system: −1.5 mV) was added to the above-obtained mixture for 30 min while operating the edge runner, and the resultant mixture was mixed and stirred for 150 min under a linear load of 392 N/cm (40 Kg/cm) at a stirring speed of 22 rpm to allow the organic pigment G to adhere onto the methylhydrogenpolysiloxane coating layer formed on the respective silica particles, thereby producing composite particles 6.

The thus obtained composite particles 6 had an average primary particle diameter of 23 nm, a BET specific surface area value of 76.9 m$^2$/g, an L* value of 30.36, an a* value of −14.79, a b* value of −1.12, a C* value of 14.83 and a degree of desorption of organic pigment of Rank 4. In addition, it was confirmed that the composite particles 6 had a tinting strength of 96%, a light fastness $\Delta E^*$ of 2.28, a heat resistance $\Delta E^*$ of 2.49, a ζ potential in a water-based system of −23.0 mV, a ζ potential in a solvent-based system of −6.6 mV, and a coating amount of methylhydrogenpolysiloxane of 0.53% by weight (calculated as C). The amount of the organic pigment G adhered onto the composite particles 6 was 24.06% by weight (calculated as C; corresponding to 200 parts by weight based on 100 parts by weight of the silica particles).

As a result of observing the micrograph of the obtained composite particles 6, since substantially no particles of the organic pigment G added were recognized from the micrograph, it was confirmed that a substantially whole amount of the organic pigment G added was adhered onto the coating layer composed of methylhydrogenpolysiloxane.

<Composite Particles 7: Production of Composite Particles (B)>

The same procedure as defined in production of the composite particles 6 was conducted except that the organic pigment B (kind: phthalocyanine-based pigment; average primary particle diameter: 80 nm; BET specific surface area value: 87.9 m$^2$/g; L* value: 23.04; a* value: 5.99; b* value: −13.16; C* value: 14.46; light fastness $\Delta E^*$: 8.83; heat resistance $\Delta E^*$: 9.04; ζ potential in a water-based system: −2.9 mV; ζ potential in a solvent-based system: −1.3 mV) was used, thereby producing composite particles 7.

The thus obtained composite particles 7 had an average primary particle diameter of 25 nm, a BET specific surface area value of 90.3 m$^2$/g, an L* value of 26.38, an a* value of 5.92, a b* value of −12.95, a C* value of 14.24 and a degree of desorption of organic pigment of Rank 4. In addition, it was confirmed that the composite particles 7 had a tinting strength of 96%, a light fastness $\Delta E^*$ of 2.64, a heat resistance $\Delta E^*$ of 2.75, a ζ potential in a water-based system of −22.2 mV, a ζ potential in a solvent-based system of −6.0 mV, and a coating amount of methylhydrogenpolysiloxane of 0.54% by weight (calculated as C). The amount of the organic pigment B adhered onto the composite particles 7 was 44.68% by weight (calculated as C; corresponding to 200 parts by weight based on 100 parts by weight of the silica particles).

As a result of observing the micrograph of the obtained composite particles 7, since substantially no particles of the organic pigment B added were recognized from the micrograph, it was confirmed that a substantially whole amount of the organic pigment B added was adhered onto the coating layer composed of methylhydrogenpolysiloxane.

<Composite Particles 8: Production of Composite Particles (R)>

The same procedure as defined in production of the composite particles 6 was conducted except that the organic pigment R (kind: diketopyrrolopyrrole-based pigment; average primary particle diameter: 130 nm; BET specific surface area value: 82.4 m$^2$/g; L* value: 38.42; a* value: 43.20; b* value: 23.36; C* value: 49.11; light fastness $\Delta E^*$: 7.92; heat resistance $\Delta E^*$: 7.28; ζ potential in a water-based system: −2.9 mV; ζ potential in a solvent-based system: −1.2 mV) was used, thereby producing composite particles 8.

The thus obtained composite particles 8 had an average primary particle diameter of 24 nm, a BET specific surface area value of 85.6 m$^2$/g, an L* value of 48.46, an a* value of 48.10, a b* value of 22.39, a C* value of 53.06 and a degree of desorption of organic pigment of Rank 4. In addition, it was confirmed that the composite particles 8 had a tinting strength of 96%, a light fastness $\Delta E^*$ of 2.48, a heat resistance $\Delta E^*$ of 2.26, a ζ potential in a water-based system of −20.5 mV, a ζ potential in a solvent-based system of −6.3 mV, and a coating amount of methylhydrogenpolysiloxane of 0.53% by weight (calculated as C). The amount of the organic pigment R adhered onto the composite particles 8 was 40.38% by weight (calculated as C; corresponding to 200 parts by weight based on 100 parts by weight of the silica particles).

As a result of observing the micrograph of the obtained composite particles 8, since substantially no particles of the organic pigment R added were recognized from the micrograph, it was confirmed that a substantially whole amount of the organic pigment R added was adhered onto the coating layer composed of methylhydrogenpolysiloxane.

Example 4-1

Production of Colorant (G) for Color Filters

A 3-L beaker was charged with 200 g of the above-obtained composite particles (composite particles 6) and 2 L of a 0.44 mol/L sodium hydroxide aqueous solution (0.2 time a theoretical amount thereof capable of dissolving the silica particles as core particles and the surface-modifying agent) to prepare a solution having a pH value of 13.2. The resultant solution was stirred at 60° C. for 30 min and then subjected to filtration to separate a solid therefrom. The thus separated solid was washed with water and then dried, thereby obtaining a colorant (G) for color filters.

It was confirmed that the thus obtained colorant (G) for color filters had an average primary particle diameter of 16 nm, a number-average particle diameter of 23 nm, a volume-average particle diameter of 74 nm, a BET specific surface area value of 84.7 m$^2$/g. Also, the amount of silica enclosed in the colorant (G) for color filters was 1.09% by weight (calculated as Si). As to the hue values of the colorant (G) for color filters, the L* value thereof was 31.38; the a* value thereof was −14.29; the b* value thereof was −1.11; and the C* value thereof was 14.33. In addition, it was confirmed that the colorant (G) for color filters had a tinting strength of 106%, a light fastness ΔE* of 3.50, a heat resistance ΔE* of 3.69, a ζ potential in a water-based system of −13.9 mV, and a ζ potential in a solvent-based system of −6.5 mV.

Example 4-2

Production of Colorant (B) for Color Filters

The same procedure as defined in production of the colorant (G) for color filters was conducted except that the composite particles 7 were used, thereby obtaining a colorant (B) for color filters.

It was confirmed that the thus obtained colorant (B) for color filters had an average primary particle diameter of 16 nm, a number-average particle diameter of 27 nm, a volume-average particle diameter of 78 nm, a BET specific surface area value of 95.2 m$^2$/g. Also, the amount of silica enclosed in the colorant (B) for color filters was 0.96% by weight (calculated as Si). As to the hue values of the colorant (B) for color filters, the L* value thereof was 26.49; the a* value thereof was 5.83; the b* value thereof was −12.88; and the C* value thereof was 14.14. In addition, it was confirmed that the colorant (B) for color filters had a tinting strength of 106%, a light fastness ΔE* of 3.62, a heat resistance ΔE* of 3.94, a ζ potential in a water-based system of −12.9 mV, and a ζ potential in a solvent-based system of −6.1 mV.

Example 4-3

Production of Colorant (R) for Color Filters

The same procedure as defined in production of the colorant (G) for color filters was conducted except that the composite particles 8 were used, thereby obtaining a colorant (R) for color filters.

It was confirmed that the thus obtained colorant (R) for color filters had an average primary particle diameter of 17 nm, a number-average particle diameter of 31 nm, a volume-average particle diameter of 84 nm, a BET specific surface area value of 88.6 m$^2$/g. Also, the amount of silica enclosed in the colorant (R) for color filters was 1.14% by weight (calculated as Si). As to the hue values of the colorant (R) for color filters, the L* value thereof was 40.19; the a* value thereof was 43.26; the b* value thereof was 23.51; and the C* value thereof was 49.24. In addition, it was confirmed that the colorant (R) for color filters had a tinting strength of 105%, a light fastness ΔE* of 3.24, a heat resistance ΔE* of 3.42, a ζ potential in a water-based system of −14.0 mV, and a ζ potential in a solvent-based system of −6.6 mV.

Example 5-1

Production of Coloring Composition (I-G) for Color Filters 100.0 parts by weight of the colorant (G) for color filters (obtained in Example 4-1), 30.0 parts by weight of a dispersant (modified acrylic block copolymer; tradename: "DISPERBYK-2001" produced by BYK Chemie Co., Ltd.) and 270.0 parts by weight of PGMEA were mixed and dispersed together for 4 hr using a beads mill, thereby obtaining a coloring composition (I-G) for color filters.

As a result, it was confirmed that the thus obtained coloring composition (I-G) for color filters had a number-average dispersed particle diameter of 18 nm, a volume-average dispersed particle diameter of 42 nm, a rate of change in viscosity of 4.0%, a light transmittance at a wavelength of 530 nm of 84.6% and a specific absorption coefficient $\epsilon_w$ (on the weight basis) at a wavelength of 650 nm of 2.45.

Example 5-2

Production of Coloring Composition (I-B) for Color Filters

The same procedure as defined in Example 5-1 was conducted except that the colorant (B) for color filters was used as a colorant, thereby obtaining a coloring composition (I-B) for color filters.

As a result, it was confirmed that the thus obtained coloring composition (I-B) for color filters had a number-average dispersed particle diameter of 22 nm, a volume-average dispersed particle diameter of 37 nm, a rate of change in viscosity of 4.7%, a light transmittance at a wavelength of 460 nm of 82.8% and a specific absorption coefficient $\epsilon_w$ (on the weight basis) at a wavelength of 610 nm of 2.35.

Example 5-3

Production of Coloring Composition (I-R) for Color Filters

The same procedure as defined in Example 5-1 was conducted except that the colorant (R) for color filters was used as a colorant, thereby obtaining a coloring composition (I-R) for color filters.

As a result, it was confirmed that the thus obtained coloring composition (I-R) for color filters had a number-average dispersed particle diameter of 28 nm, a volume-average dispersed particle diameter of 45 nm, a rate of change in viscosity of 4.9%, a light transmittance at a wavelength of 620 nm of 89.6% and a specific absorption coefficient $\epsilon_w$ (on the weight basis) at a wavelength of 550 nm of 1.94.

Example 6-1

Production of Coloring Composition (II-G) for Color Filters 400.0 parts by weight of the coloring composition (I-G) for color filters (obtained in Example 5-1) and 100.0 parts by weight of a methyl methacrylate/methacrylic acid copolymer were mixed and dispersed together for 2 hr using a beads mill. The resultant kneaded material was filtered through a 5 μm glass filter, thereby obtaining a coloring composition (II-G) for color filters.

As a result, it was confirmed that the thus obtained coloring composition (II-G) for color filters had a number-average dispersed particle diameter of 19 nm, a volume-average dispersed particle diameter of 44 nm, a viscosity of 16.6 mPa·s, a rate of change in viscosity of 3.9%, and a specific absorption coefficient $\epsilon_w$ (on the weight basis) at a wavelength of 650 nm of 2.56.

The obtained coloring composition (II-G) for color filters was applied onto a clear base film to form a coating layer having a thickness of 150 μm (6 mil), and then dried, thereby obtaining a colored transparent film (II-G) for color filters. As a result, it was confirmed that the resultant colored transparent film (II-G) for color filters exhibited a chromaticity represented by a x value of 0.2754, a y value of 0.3878 and a Y value of 70.21, and had a light fastness ΔE* of 3.32 and a heat resistance ΔE* of 3.51, as well as a light transmittance at a wavelength of 530 nm of 92.6% and a specific absorption coefficient $\epsilon_w$ (on the weight basis) at a wavelength of 650 nm of 2.47.

Example 6-2

Production of Coloring Composition (II-B) for Color Filters

The same procedure as defined in Example 6-1 was conducted except that the coloring composition (I-B) for color filters was used as a coloring composition, thereby obtaining a coloring composition (II-B) for color filters.

As a result, it was confirmed that the thus obtained coloring composition (II-B) for color filters had a number-average dispersed particle diameter of 23 nm, a volume-average dispersed particle diameter of 38 nm, a viscosity of 17.9 mPa·s, a rate of change in viscosity of 4.6%, and a specific absorption coefficient $\epsilon_w$ (on the weight basis) at a wavelength of 610 nm of 2.47.

The obtained coloring composition (II-B) for color filters was applied onto a clear base film to form a coating layer having a thickness of 150 μm (6 mil), and then dried, thereby obtaining a colored transparent film (II-B) for color filters. As a result, it was confirmed that the resultant colored transparent film (II-B) for color filters exhibited a chromaticity represented by a x value of 0.1475, a y value of 0.2182 and a Y value of 29.33, and had a light fastness ΔE* of 3.42 and a heat resistance ΔE* of 3.74, as well as a light transmittance at a wavelength of 460 nm of 91.8% and a specific absorption coefficient $\epsilon_w$ (on the weight basis) at a wavelength of 610 nm of 2.36.

Example 6-3

Production of Coloring Composition (II-R) for Color Filters

The same procedure as defined in Example 6-1 was conducted except that the coloring composition (I-R) for color filters was used as a coloring composition, thereby obtaining a coloring composition (II-R) for color filters.

As a result, it was confirmed that the thus obtained coloring composition (II-R) for color filters had a number-average dispersed particle diameter of 30 nm, a volume-average dispersed particle diameter of 55 nm, a viscosity of 19.4 mPa·s, a rate of change in viscosity of 4.7%, and a specific absorption coefficient $\epsilon_w$ (on the weight basis) at a wavelength of 550 nm of 2.01.

The obtained coloring composition (II-R) for color filters was applied onto a clear base film to form a coating layer having a thickness of 150 μm (6 mil), and then dried, thereby obtaining a colored transparent film (II-R) for color filters. As a result, it was confirmed that the resultant colored transparent film (II-R) for color filters exhibited a chromaticity represented by a x value of 0.5846, a y value of 0.3398 and a Y value of 23.24, and had a light fastness ΔE* of 3.18 and a heat resistance ΔE* of 3.36, as well as a light transmittance at a wavelength of 620 nm of 96.6% and a specific absorption coefficient $\epsilon_w$ (on the weight basis) at a wavelength of 550 nm of 1.95.

Example 7-1

Production of Coloring Composition (III-G) for Color Filters 500.0 parts by weight of the coloring composition (II-G) for color filters (obtained in Example 6-1), 100.0 parts by weight of dipentaerythritol pentaacrylate and 5.0 parts by weight of 2-(4-methoxy-β-styryl)-bis(4,6-trichloromethyl)-s-triazine were mixed and dispersed together for 2 hr using a beads mill. The resultant kneaded material was filtered through a 1 μm glass filter, thereby obtaining a coloring composition (III-G) for color filters.

As a result, it was confirmed that the thus obtained coloring composition (III-G) for color filters had a number-average dispersed particle diameter of 17 nm, a volume-average dispersed particle diameter of 40 nm, a viscosity of 16.8 mPa·s, a rate of change in viscosity of 3.9%, and a specific absorption coefficient $\epsilon_w$ (on the weight basis) at a wavelength of 650 nm of 2.55.

The obtained coloring composition (III-G) for color filters was applied onto a clear base film to form a coating layer having a thickness of 150 μm (6 mil), and then dried, thereby obtaining a colored transparent film (III-G) for color filters. As a result, it was confirmed that the resultant colored transparent film (III-G) for color filters exhibited a chromaticity represented by a x value of 0.2755, a y value of 0.3877 and a Y value of 70.36, and had a light fastness ΔE* of 3.30 and a heat resistance ΔE* of 3.49, as well as a light transmittance at a wavelength of 530 nm of 93.1% and a specific absorption coefficient $\epsilon_w$ (on the weight basis) at a wavelength of 650 nm of 2.49.

Example 7-2

Production of Coloring Composition (III-B) for Color Filters

The same procedure as defined in Example 7-1 was conducted except that the coloring composition (II-B) for color filters was used as a coloring composition, thereby obtaining a coloring composition (III-B) for color filters.

As a result, it was confirmed that the thus obtained coloring composition (III-B) for color filters had a number-average dispersed particle diameter of 21 nm, a volume-average dispersed particle diameter of 35 nm, a viscosity of 17.8 mPa·s, a rate of change in viscosity of 4.6%, and a specific absorption coefficient $\epsilon_w$ (on the weight basis) at a wavelength of 610 nm of 2.45.

The obtained coloring composition (III-B) for color filters was applied onto a clear base film to form a coating layer having a thickness of 150 μm (6 mil), and then dried, thereby obtaining a colored transparent film (III-B) for color filters. As a result, it was confirmed that the resultant colored transparent film (III-B) for color filters exhibited a chromaticity represented by a x value of 0.1476, a y value of 0.2181 and a Y value of 29.42, and had a light fastness ΔE* of 3.41 and a heat resistance ΔE* of 3.71, as well as a light transmittance at a wavelength of 460 nm of 92.4% and a specific absorption coefficient $\epsilon_w$ (on the weight basis) at a wavelength of 610 nm of 2.38.

Example 7-3

Production of Coloring Composition (III-R) for Color Filters

The same procedure as defined in Example 7-1 was conducted except that the coloring composition (II-R) for color filters was used as a coloring composition, thereby obtaining a coloring composition (III-R) for color filters.

As a result, it was confirmed that the thus obtained coloring composition (III-R) for color filters had a number-average dispersed particle diameter of 26 nm, a volume-average dispersed particle diameter of 51 nm, a viscosity of 19.6 mPa·s, a rate of change in viscosity of 4.8%, and a specific absorption coefficient $\epsilon_w$ (on the weight basis) at a wavelength of 550 nm of 2.00.

The obtained coloring composition (III-R) for color filters was applied onto a clear base film to form a coating layer having a thickness of 150 μm (6 mil), and then dried, thereby obtaining a colored transparent film (III-R) for color filters. As a result, it was confirmed that the resultant colored transparent film (III-R) for color filters exhibited a chromaticity represented by a x value of 0.5848, a y value of 0.3399 and a Y value of 23.29, and had a light fastness ΔE* of 3.14 and a heat resistance ΔE* of 3.35, as well as a light transmittance at a wavelength of 620 nm of 97.1% and a specific absorption coefficient $\epsilon_w$ (on the weight basis) at a wavelength of 550 nm of 1.97.

Example 8-1

Production of Coloring Composition (IV-G) for Color Filters 500.0 parts by weight of the coloring composition (II-G) for color filters (obtained in Example 6-1) and 5.0 parts by weight of p-phenylthiophenyldiphenylsulfonium trifluoroacetate were dispersed together using a sand grinder. The resultant kneaded material was filtered through a 1 μm glass filter, thereby obtaining a coloring composition (IV-G) for color filters.

As a result, it was confirmed that the thus obtained coloring composition (IV-G) for color filters had a number-average dispersed particle diameter of 18 nm, a volume-average dispersed particle diameter of 41 nm, a viscosity of 17.2 mPa·s, a rate of change in viscosity of 4.0%, and a specific absorption coefficient $\epsilon_w$ (on the weight basis) at a wavelength of 650 nm of 2.53.

The obtained coloring composition (IV-G) for color filters was applied onto a clear base film to form a coating layer having a thickness of 150 μm (6 mil), and then dried, thereby obtaining a colored transparent film (IV-G) for color filters. As a result, it was confirmed that the resultant colored transparent film (IV-G) for color filters exhibited a chromaticity represented by a x value of 0.2752, a y value of 0.3877 and a Y value of 70.41, and had a light fastness ΔE* of 3.28 and a heat resistance ΔE* of 3.45, as well as a light transmittance at a wavelength of 530 nm of 93.2% and a specific absorption coefficient $\epsilon_w$ (on the weight basis) at a wavelength of 650 nm of 2.48.

Example 8-2

Production of Coloring Composition (IV-B) for Color Filters

The same procedure as defined in Example 8-1 was conducted except that the coloring composition (II-B) for color filters was used as a coloring composition, thereby obtaining a coloring composition (IV-B) for color filters.

As a result, it was confirmed that the thus obtained coloring composition (IV-B) for color filters had a number-average dispersed particle diameter of 21 nm, a volume-average dispersed particle diameter of 36 nm, a viscosity of 18.1 mPa·s, a rate of change in viscosity of 4.6%, and a specific absorption coefficient $\epsilon_w$ (on the weight basis) at a wavelength of 610 nm of 2.44.

The obtained coloring composition (IV-B) for color filters was applied onto a clear base film to form a coating layer having a thickness of 150 μm (6 mil), and then dried, thereby obtaining a colored transparent film (IV-B) for color filters. As a result, it was confirmed that the resultant colored transparent film (IV-B) for color filters exhibited a chromaticity represented by a x value of 0.1475, a y value of 0.2179 and a Y value of 29.44, and had a light fastness ΔE* of 3.38 and a heat resistance ΔE* of 3.66, as well as a light transmittance at a wavelength of 460 nm of 92.5% and a specific absorption coefficient $\epsilon_w$ (on the weight basis) at a wavelength of 610 nm of 2.38.

Example 8-3

Production of Coloring Composition (IV-R) for Color Filters

The same procedure as defined in Example 8-1 was conducted except that the coloring composition (II-R) for color filters was used as a coloring composition, thereby obtaining a coloring composition (IV-R) for color filters.

As a result, it was confirmed that the thus obtained coloring composition (IV-R) for color filters had a number-average dispersed particle diameter of 27 nm, a volume-average dispersed particle diameter of 52 nm, a viscosity of 20.1 mPa·s, a rate of change in viscosity of 4.9%, and a specific absorption coefficient $\epsilon_w$ (on the weight basis) at a wavelength of 550 nm of 2.01.

The obtained coloring composition (IV-R) for color filters was applied onto a clear base film to form a coating layer having a thickness of 150 μm (6 mil), and then dried, thereby obtaining a colored transparent film (IV-R) for color filters. As a result, it was confirmed that the resultant colored transparent film (IV-R) for color filters exhibited a chromaticity represented by a x value of 0.5846, a y value of 0.3402 and a Y value of 23.29, and had a light fastness ΔE* of 3.15 and a heat resistance ΔE* of 3.34, as well as a light transmittance at a wavelength of 620 nm of 97.3% and a specific absorption coefficient $\epsilon_w$ (on the weight basis) at a wavelength of 550 nm of 1.96.

Examples 9-1

Production of Color Filter (I)

The coloring composition (II-G) for color filters (obtained in Example 6-1) was spin-coated onto a non-alkali glass plate having a thickness of 0.7 mm on which a black matrix resin pattern layer having a thickness of 1.0 μm was formed, and then pre-baked at 90° C. for 4 min using a hot plate. Then, a positive-type photoresist was applied onto the resultant coating layer of the coloring composition and then dried under heating at 80° C. for 20 min to form a resist film thereon. The obtained laminate was exposed to light with a luminous intensity of 400 mJ/cm$^2$ using a 2.50 kW ultrahigh-pressure mercury lamp, and then developed with an aqueous sodium carbonate solution, followed by removing the unnecessary photoresist layer therefrom with methyl cellosolve acetate. Further, the resultant colored film was heat-treated at 250° C. for 30 min in a nitrogen atmosphere to obtain a patterned green-colored film.

Thereafter, using the coloring composition (II-B) for color filters and the coloring composition (II-R) for color filters, the respective patterned colored films were formed in the same manner as described above, thereby obtaining a color filter (I).

As a result, it was confirmed that the resultant color filter (I) had a light transmittance at 530 nm of 92.0%, a light transmittance at 460 nm of 91.4%, a light transmittance at 620 nm of 96.2%, and a contrast of 1700.

<Production of Color Filter (II)>

The coloring composition (III-G) for color filters (obtained in Example 7-1) was spin-coated onto a non-alkali glass plate having a thickness of 0.7 mm on which a black matrix resin pattern layer having a thickness of 1.0 μm was formed, and then pre-baked at 90° C. for 4 min using a hot plate. After forming a photoresist layer on the resultant coating layer, the obtained laminate was exposed to pattern light with a luminous intensity of 400 mJ/cm$^2$ using a 2.50 kW ultrahigh-pressure mercury lamp, and then developed with an aqueous sodium carbonate solution, followed by removing the unnecessary photoresist layer therefrom. Further, the resultant colored film was heat-treated at 250° C. for 30 min in a nitrogen atmosphere to obtain a patterned green-colored film.

Thereafter, using the coloring composition (III-B) for color filters and the coloring composition (III-R) for color filters, the respective patterned colored films were formed in the same manner as described above, thereby obtaining a color filter (II).

As a result, it was confirmed that the resultant color filter (II) had a light transmittance at 530 nm of 92.4%, a light transmittance at 460 nm of 91.6%, a light transmittance at 620 nm of 96.4%, and a contrast of 1720.

<Production of Color Filter (III)>

The same procedure as defined in production of the color filter (II) was conducted except that the color composition (IV-G) for color filters, the color composition (IV-B) for color filters and the color composition (IV-R) for color filters were used as coloring compositions, thereby obtaining a color filter (III).

As a result, it was confirmed that the resultant color filter (III) had a light transmittance at 530 nm of 92.6%, a light transmittance at 460 nm of 91.7%, a light transmittance at 620 nm of 96.6%, and a contrast of 1730.

According to the procedure for producing the composite particles 6 and Examples 4-1 to 9-1, the composite particles, the colorant for color filters, the coloring composition for color filters and the color filter were produced. The essential production conditions as well as various properties of the obtained composite particles, colorant for color filters, coloring composition for color filters and color filter are shown below.

Silica 1 to Silica 4:

As the core particles, silica particles 1 to 4 having properties shown in Table 1 were prepared.

Organic Pigments G, B, R and Y:

As the organic pigment, organic pigments having properties shown in Table 2 were prepared.

<Production of Composite Particles>

Composite Particles 7 to 12:

The same procedure as defined in the production of composite particles 6 was conducted except that kinds of core particles, kinds and amounts of surface modifying agents added, linear load and treating time for edge runner treatment used in the coating step with the surface modifying agents, kinds and amounts of organic pigments added in organic pigment-adhering step, and linear load and treating time for edge runner treatment used in the organic pigment-adhering step, were changed variously, thereby obtaining composite particles. The essential production conditions are shown in Table 9, and various properties of the obtained composite particles are shown in Table 10.

TABLE 9

| | Production of composite particles Coating step with surface modifying agent | | |
|---|---|---|---|
| | | Additives | |
| Composite particles | Kind of core particles | Kind | Amount added (wt. part) |
| Composite particles 6 | Silica 1 | Methylhydrogen polysiloxane | 2.0 |
| Composite particles 7 | Silica 1 | Methylhydrogen polysiloxane | 2.0 |
| Composite particles 8 | Silica 1 | Methylhydrogen polysiloxane | 2.0 |
| Composite particles 9 | Silica 1 | Methylhydrogen polysiloxane | 8.0 |
| Composite particles 10 | Silica 2 | Methyltriethoxysilane | 4.0 |
| Composite particles 11 | Silica 3 | Phenyltriethoxysilane | 6.0 |
| Composite particles 12 | Silica 4 | γ-aminopropyl triethoxysilane | 12.0 |

| | Production of composite particles Coating step with surface modifying agent | | |
|---|---|---|---|
| | Edge runner treatment | | Coating amount (calculated as C) |
| Composite particles | Linear load | Time | |
| | (N/cm) (Kg/cm) | (min) | (wt %) |
| Composite particles 6 | 588    60 | 30 | 0.53 |

TABLE 9-continued

| Composite particles | | | | |
|---|---|---|---|---|
| Composite particles 7 | 588 | 60 | 30 | 0.54 |
| Composite particles 8 | 588 | 60 | 30 | 0.53 |
| Composite particles 9 | 735 | 75 | 90 | 1.04 |
| Composite particles 10 | 441 | 45 | 20 | 0.26 |
| Composite particles 11 | 735 | 75 | 20 | 2.05 |
| Composite particles 12 | 588 | 60 | 60 | 1.74 |

| | Production of composite particles Organic pigment-adhesion step Organic pigment | |
|---|---|---|
| Composite particles | Kind | Amount adhered (wt. part) |
| Composite particles 6 | G | 200.0 |
| Composite particles 7 | B | 200.0 |
| Composite particles 8 | R | 200.0 |
| Composite particles 9 | Y | 200.0 |
| Composite particles 10 | G | 100.0 |
| Composite particles 11 | G | 150.0 |
| Composite particles 12 | G | 300.0 |

| | Production of composite particles Organic pigment-adhesion step | | |
|---|---|---|---|
| | Edge runner treatment | | Amount adhered (calculated as C) |
| Composite particles | Linear load (N/cm) | Linear load (Kg/cm) | Time (min) | (wt %) |
| Composite particles 6 | 392 | 40 | 150 | 24.06 |
| Composite particles 7 | 392 | 40 | 150 | 44.68 |
| Composite particles 8 | 392 | 40 | 150 | 40.38 |
| Composite particles 9 | 441 | 45 | 120 | 29.84 |
| Composite particles 10 | 588 | 60 | 120 | 18.07 |
| Composite particles 11 | 588 | 60 | 120 | 21.88 |
| Composite particles 12 | 735 | 75 | 30 | 35.59 |

TABLE 10

| | Properties of composite particles | | |
|---|---|---|---|
| Composite particles | Average primary particle diameter (nm) | BET specific surface area value ($m^2/g$) | Degree of desorption of organic pigment (-) |
| Composite particles 6 | 23 | 76.9 | 4 |
| Composite particles 7 | 25 | 90.3 | 4 |
| Composite particles 8 | 24 | 85.6 | 4 |
| Composite particles 9 | 26 | 52.9 | 4 |
| Composite particles 10 | 29 | 84.2 | 4 |
| Composite particles 11 | 47 | 70.4 | 4 |
| Composite particles 12 | 69 | 66.8 | 4 |

| | Properties of composite particles | | | | |
|---|---|---|---|---|---|
| | Hue | | | | |
| Composite particles | L* value (-) | a* value (-) | b* value (-) | C* value (-) | Tinting strength (%) |
| Composite particles 6 | 30.36 | −14.79 | −1.12 | 14.83 | 96 |
| Composite particles 7 | 26.38 | 5.92 | −12.95 | 14.24 | 96 |
| Composite particles 8 | 48.69 | 48.10 | 22.39 | 53.06 | 96 |
| Composite particles 9 | 85.66 | 2.94 | 89.49 | 89.54 | 94 |
| Composite particles 10 | 31.12 | −14.42 | −1.19 | 14.47 | 93 |
| Composite particles 11 | 30.88 | −14.70 | −1.20 | 14.75 | 94 |
| Composite particles 12 | 30.28 | −14.92 | −1.05 | 14.96 | 98 |

| | Properties of composite particles | | | |
|---|---|---|---|---|
| | | | ζ potential | |
| Composite particles | Light fastness ΔE* value (-) | Heat resistance ΔE* value (-) | Water-based system (mV) | Solvent-based system (mV) |
| Composite particles 6 | 2.28 | 2.49 | −23.0 | −6.6 |
| Composite particles 7 | 2.64 | 2.75 | −22.2 | −6 |
| Composite particles 8 | 2.48 | 2.26 | −20.5 | −6.3 |
| Composite particles 9 | 2.12 | 2.43 | −23.1 | −6.5 |
| Composite particles 10 | 2.16 | 2.39 | −25.2 | −6.2 |
| Composite particles 11 | 2.23 | 2.47 | −23.6 | −6.3 |
| Composite particles 12 | 2.32 | 2.51 | −22.8 | −6.8 |

Production of Colorant for Color Filters

Examples 4-2 to 4-8 and Comparative Examples 4-1 to 4-4

The same procedure as defined in Example 4-1 was conducted except that kinds of composite particles, pH values of dissolution solutions used upon alkali dissolution, ratio of actual amount of alkali added to theoretical amount thereof, and treating temperature and time of the alkali dissolution, were changed variously, thereby obtaining colorants for color filters. Meanwhile, the concentration (g/100 mL) of the composite particles means a weight (g) of the composite particles based on 100 mL of the dissolution solution. Also, in Example 4-5, freeze-drying was conducted as the drying step. The essential production conditions are shown in Table 11, and various properties of the obtained colorants for color filters are shown in Table 12.

TABLE 11

| Examples and Comparative Examples | Production of colorant for color filters Composite particles | |
|---|---|---|
| | Kind | Concentration (g/100 mL) |
| Example 4-1 | Composite particles 6 | 10.0 |
| Example 4-2 | Composite particles 7 | 10.0 |
| Example 4-3 | Composite particles 8 | 10.0 |
| Example 4-4 | Composite particles 9 | 10.0 |
| Example 4-5 | Composite particles 6 | 10.0 |
| Example 4-6 | Composite particles 10 | 10.0 |
| Example 4-7 | Composite particles 11 | 10.0 |
| Example 4-8 | Composite particles 12 | 10.0 |
| Comparative Example 4-1 | Composite particles 6 | 10.0 |
| Comparative Example 4-2 | Composite particles 7 | 10.0 |
| Comparative Example 4-3 | Composite particles 8 | 10.0 |
| Comparative Example 4-4 | Composite particles 9 | 10.0 |

| Examples and Comparative Examples | Production of colorant for color filters Dissolution solution | | |
|---|---|---|---|
| | Kind | pH (−) | Ratio to theoretical amount (time) |
| Example 4-1 | Sodium hydroxide | 13.2 | 0.2 |
| Example 4-2 | Sodium hydroxide | 13.2 | 0.2 |
| Example 4-3 | Sodium hydroxide | 13.2 | 0.2 |
| Example 4-4 | Sodium hydroxide | 13.2 | 0.2 |
| Example 4-5 | Sodium hydroxide | 13.2 | 0.2 |
| Example 4-6 | Potassium hydroxide | 13.0 | 0.1 |
| Example 4-7 | Potassium hydroxide | 13.2 | 0.2 |
| Example 4-8 | Sodium hydroxide | 13.6 | 0.9 |
| Comparative Example 4-1 | Sodium hydroxide | 13.8 | 1.5 |
| Comparative Example 4-2 | Sodium hydroxide | 13.2 | 0.2 |
| Comparative Example 4-3 | Sodium hydroxide | 13.2 | 0.2 |
| Comparative Example 4-4 | Sodium hydroxide | 8.7 | 0.005 |

| Examples and Comparative Examples | Production of colorant for color filters | | |
|---|---|---|---|
| | Treating temperature (° C.) | Treating time (min) | Use or non-use of freeze-drying |
| Example 4-1 | 60 | 30 | None |
| Example 4-2 | 60 | 30 | None |
| Example 4-3 | 60 | 30 | None |
| Example 4-4 | 60 | 30 | None |
| Example 4-5 | 60 | 30 | Used |
| Example 4-6 | 50 | 30 | None |
| Example 4-7 | 95 | 30 | None |
| Example 4-8 | 50 | 30 | None |
| Comparative Example 4-1 | 60 | 30 | None |
| Comparative Example 4-2 | 25 | 30 | None |
| Comparative Example 4-3 | 60 | 2 | None |
| Comparative Example 4-4 | 60 | 600 | None |

TABLE 12

| Examples and Comparative Examples | Properties of colorant for color filters | |
|---|---|---|
| | Si content (wt %) | Average primary particle diameter (nm) |
| Example 4-1 | 1.09 | 16 |
| Example 4-2 | 0.96 | 16 |
| Example 4-3 | 1.14 | 17 |
| Example 4-4 | 1.34 | 18 |
| Example 4-5 | 1.09 | 16 |
| Example 4-6 | 2.16 | 28 |
| Example 4-7 | 0.82 | 18 |
| Example 4-8 | 0.07 | 15 |
| Comparative Example 4-1 | 0.00 | 15 |
| Comparative Example 4-2 | 24.15 | 35 |
| Comparative Example 4-3 | 29.82 | 32 |
| Comparative Example 4-4 | 29.94 | 32 |
| Comparative Example 4-5 | 0.00 | 42 |
| Comparative Example 4-6 | 0.00 | 44 |
| Comparative Example 4-7 | 0.00 | 55 |

| Examples and Comparative Examples | Properties of colorant for color filters | | |
|---|---|---|---|
| | Number-average particle diameter (nm) | Volume-average particle diameter (nm) | BET specific surface area value (m²/g) |
| Example 4-1 | 23 | 74 | 84.7 |
| Example 4-2 | 27 | 78 | 95.2 |
| Example 4-3 | 31 | 84 | 88.6 |
| Example 4-4 | 33 | 82 | 68.2 |
| Example 4-5 | 21 | 60 | 90.1 |
| Example 4-6 | 35 | 92 | 81.4 |
| Example 4-7 | 29 | 90 | 80.9 |
| Example 4-8 | 25 | 114 | 75.3 |
| Comparative Example 4-1 | 39 | 242 | 45.9 |
| Comparative Example 4-2 | 69 | 194 | 66.9 |
| Comparative Example 4-3 | 58 | 149 | 53.6 |
| Comparative Example 4-4 | 60 | 184 | 49.8 |
| Comparative Example 4-5 | 86 | 374 | 42.9 |
| Comparative Example 4-6 | 82 | 382 | 48.9 |
| Comparative Example 4-7 | 96 | 431 | 44.9 |

| Examples and Comparative Examples | Properties of colorant for color filters | | | | |
|---|---|---|---|---|---|
| | Hue | | | | |
| | L* value (−) | a* value (−) | b* value (−) | C* value (−) | Tinting strength (%) |
| Example 4-1 | 31.38 | −14.29 | −1.11 | 14.33 | 106 |
| Example 4-2 | 26.49 | 5.83 | −12.88 | 14.14 | 106 |
| Example 4-3 | 40.19 | 43.26 | 23.51 | 49.24 | 105 |
| Example 4-4 | 84.10 | 2.89 | 90.93 | 90.98 | 105 |
| Example 4-5 | 31.51 | −14.58 | −1.19 | 14.63 | 106 |
| Example 4-6 | 31.29 | −14.22 | −1.09 | 14.26 | 104 |
| Example 4-7 | 31.21 | −14.05 | −1.09 | 14.09 | 106 |

TABLE 12-continued

| | | | | | |
|---|---|---|---|---|---|
| Example 4-8 | 30.82 | −14.19 | −1.05 | 14.23 | 107 |
| Comparative Example 4-1 | 29.16 | −14.89 | −1.06 | 14.93 | 106 |
| Comparative Example 4-2 | 25.49 | 5.29 | −12.22 | 13.32 | 96 |
| Comparative Example 4-3 | 40.01 | 42.94 | 22.89 | 48.66 | 96 |
| Comparative Example 4-4 | 83.95 | 2.92 | 89.31 | 89.36 | 96 |
| Comparative Example 4-5 | 23.55 | 7.54 | −17.45 | 19.01 | 104 |
| Comparative Example 4-6 | 28.66 | −14.85 | −1.05 | 14.89 | 105 |
| Comparative Example 4-7 | 39.84 | 42.92 | 22.91 | 48.65 | 105 |

| | Properties of colorant for color filters | | | |
|---|---|---|---|---|
| | | | ζ potential | |
| Examples and Comparative Examples | Light fastness ΔE* value (−) | Heat resistance ΔE* value (−) | Water-based system (mV) | Solvent-based system (mV) |
| Example 4-1 | 3.50 | 3.69 | −13.9 | −6.5 |
| Example 4-2 | 3.62 | 3.94 | −12.9 | −6.1 |
| Example 4-3 | 3.24 | 3.42 | −14 | −6.6 |
| Example 4-4 | 3.88 | 4.05 | −14.2 | −6.7 |
| Example 4-5 | 3.46 | 3.70 | −13.9 | −6.5 |
| Example 4-6 | 3.51 | 3.59 | −15.1 | −7.4 |
| Example 4-7 | 4.18 | 4.51 | −11.8 | −5.9 |
| Example 4-8 | 4.98 | 4.90 | −8.3 | −3.1 |
| Comparative Example 4-1 | 6.49 | 6.82 | −3.2 | −1.5 |
| Comparative Example 4-2 | 3.15 | 3.20 | −18.5 | −7.7 |
| Comparative Example 4-3 | 2.74 | 2.85 | −20.4 | −6.1 |
| Comparative Example 4-4 | 2.29 | 2.54 | −22.6 | −6 |
| Comparative Example 4-5 | 8.56 | 9.84 | −2.8 | −1.3 |
| Comparative Example 4-6 | 7.92 | 7.82 | −2.9 | −1.4 |
| Comparative Example 4-7 | 7.65 | 7.94 | −3.2 | −1.5 |

Comparative Example 4-5

Follow-Up Test of Example 1 of Japanese Patent Application Laid-Open (KOKAI) No. 2006-91649

4 parts of a dioxazine violet pigment in the form of an acicular crystal produced by an acid slurry treatment, 36 parts of the organic pigment B (kind: phthalocyanine-based pigment; average primary particle diameter: 80 nm; BET specific surface area value: 87.9 m$^2$/g; L* value: 23.04; a* value: 5.99; b* value: −13.16; C* value: 14.46; light fastness ΔE*: 8.83; heat resistance ΔE*: 9.04; ζ potential in a water-based system: −2.9 mV; ζ potential in a solvent-based system: −1.3 mV), 400 parts of pulverized sodium chloride, and 80 parts of diethyleneglycol, were charged into a double arm-type kneader, and then kneaded together at a temperature of 100 to 110° C. for 8 hr. Thereafter, the obtained kneaded material was taken out and added into 100 parts of a 1% hydrochloric acid aqueous solution maintained at 80° C., and after stirring for 1 hr, the obtained mixture was subjected to filtration, washing with hot water, drying and pulverization, thereby obtaining a phthalocyanine blue pigment.

Comparative Example 4-6

36 parts of the organic pigment G (kind: phthalocyanine-based pigment; average primary particle diameter: 100 nm; BET specific surface area value: 67.3 m$^2$/g; L* value: 29.77; a* value: −15.30; b* value: −1.12; C* value: 15.34; light fastness ΔE*: 8.06; heat resistance ΔE*: 7.46; ζ potential in a water-based system: −3.6 mV; ζ potential in a solvent-based system: −1.5 mV), 400 parts of pulverized sodium chloride, and 80 parts of diethyleneglycol, were charged into a double arm-type kneader, and then kneaded together at a temperature of 100 to 110° C. for 8 hr. Thereafter, the obtained kneaded material was taken out and added into 100 parts of a 1% hydrochloric acid aqueous solution maintained at 80° C., and after stirring for 1 hr, the obtained mixture was subjected to filtration, washing with hot water, drying and pulverization, thereby obtaining a phthalocyanine green pigment.

Comparative Example 4-7

36 parts of the organic pigment R (kind: diketopyrrolopyrrole-based pigment; average primary particle diameter: 130 nm; BET specific surface area value: 82.4 m$^2$/g; L* value: 38.42; a* value: 43.20; b* value: 23.36; C* value: 49.11; light fastness ΔE*: 7.92; heat resistance ΔE*: 7.28; ζ potential in a water-based system: −2.9 mV; ζ potential in a solvent-based system: −1.2 mV), 400 parts of pulverized sodium chloride, and 80 parts of diethyleneglycol, were charged into a double arm-type kneader, and then kneaded together at a temperature of 100 to 110° C. for 8 hr. Thereafter, the obtained kneaded material was taken out and added into 100 parts of a 1% hydrochloric acid aqueous solution maintained at 80° C., and after stirring for 1 hr, the obtained mixture was subjected to filtration, washing with hot water, drying and pulverization, thereby obtaining a diketopyrrolopyrrole pigment.

Various properties of the obtained phthalocyanine blue pigment, phthalocyanine green pigment and diketopyrrolopyrrole pigment are shown in Table 12.

Coloring Composition (I) for Color Filters

Examples 5-2 to 5-8 and Comparative Examples 5-1 to 5-14

The same procedure as defined in Example 5-1 was conducted except that kinds of colorants for color filters, kinds and amounts of dispersants blended, and amounts of solvents blended, were changed variously, thereby obtaining coloring compositions (I) for color filters. The essential production conditions are shown in Tables 13 and 14, and various properties of the obtained coloring compositions (I) for color filters are shown in Tables 15 and 16.

TABLE 13

| | Production of coloring composition (I) for color filters Coloring pigment | |
|---|---|---|
| Examples | Kind | Amount blended (wt. part) |
| Example 5-1 | Example 4-1 | 100.0 |
| Example 5-2 | Example 4-2 | 100.0 |
| Example 5-3 | Example 4-3 | 100.0 |
| Example 5-4 | Example 4-4 | 100.0 |
| Example 5-5 | Example 4-5 | 100.0 |
| Example 5-6 | Example 4-6 | 100.0 |
| Example 5-7 | Example 4-7 | 100.0 |

TABLE 13-continued

| Examples | | Production of coloring composition (I) for color filters | | |
|---|---|---|---|---|
| | | Dispersant | | Solvent |
| | Kind | Amount blended (wt. part) | Kind | Amount blended (wt. part) |
| Example 5-8 | Example 4-8 | 100.0 | | |
| Example 5-9 | Example 4-1 | 100.0 | | |
| Example 5-1 | Modified acrylic block copolymer | 30.0 | PGMEA | 270.0 |
| Example 5-2 | Modified acrylic block copolymer | 30.0 | PGMEA | 270.0 |
| Example 5-3 | Modified acrylic block copolymer | 30.0 | PGMEA | 270.0 |
| Example 5-4 | Modified acrylic block copolymer | 30.0 | PGMEA | 270.0 |
| Example 5-5 | Modified acrylic block copolymer | 30.0 | PGMEA | 270.0 |
| Example 5-6 | Basic comb-shaped polymer | 20.0 | PGMEA | 280.0 |
| Example 5-7 | Sulfonic acid salt dispersant | 15.0 | PGMEA | 285.0 |
| Example 5-8 | Phenol ether-based nonionic surfactant | 25.0 | PGMEA | 275.0 |
| Example 5-9 | Modified acrylic block copolymer | 20.0 | PGMEA | 100.0 |

TABLE 14

| Comparative Examples | Production of coloring composition (I) for color filters Coloring pigment | |
|---|---|---|
| | Kind | Amount blended (wt. part) |
| Comparative Example 5-1 | Organic pigment G | 100.0 |
| Comparative Example 5-2 | Organic pigment B | 100.0 |
| Comparative Example 5-3 | Organic pigment R | 100.0 |
| Comparative Example 5-4 | Organic pigment Y | 100.0 |
| Comparative Example 5-5 | Composite particles 6 | 100.0 |
| Comparative Example 5-6 | Composite particles 7 | 100.0 |
| Comparative Example 5-7 | Composite particles 8 | 100.0 |
| Comparative Example 5-8 | Comparative Example 4-1 | 100.0 |
| Comparative Example 5-9 | Comparative Example 4-2 | 100.0 |
| Comparative Example 5-10 | Comparative Example 4-3 | 100.0 |
| Comparative Example 5-11 | Comparative Example 4-4 | 100.0 |
| Comparative Example 5-12 | Comparative Example 4-5 | 100.0 |
| Comparative Example 5-13 | Comparative Example 4-6 | 100.0 |
| Comparative Example 5-14 | Comparative Example 4-7 | 100.0 |

TABLE 14-continued

| Comparative Examples | Production of coloring composition (I) for color filters | | | |
|---|---|---|---|---|
| | Dispersant | | Solvent | |
| | Kind | Amount blended (wt. part) | Kind | Amount blended (wt. part) |
| Comparative Example 5-1 | Modified acrylic block copolymer | 30.0 | PGMEA | 270.0 |
| Comparative Example 5-2 | Modified acrylic block copolymer | 30.0 | PGMEA | 270.0 |
| Comparative Example 5-3 | Modified acrylic block copolymer | 30.0 | PGMEA | 270.0 |
| Comparative Example 5-4 | Modified acrylic block copolymer | 30.0 | PGMEA | 270.0 |
| Comparative Example 5-5 | Modified acrylic block copolymer | 30.0 | PGMEA | 270.0 |
| Comparative Example 5-6 | Modified acrylic block copolymer | 30.0 | PGMEA | 270.0 |
| Comparative Example 5-7 | Modified acrylic block copolymer | 30.0 | PGMEA | 270.0 |
| Comparative Example 5-8 | Modified acrylic block copolymer | 30.0 | PGMEA | 270.0 |
| Comparative Example 5-9 | Modified acrylic block copolymer | 30.0 | PGMEA | 270.0 |
| Comparative Example 5-10 | Modified acrylic block copolymer | 30.0 | PGMEA | 270.0 |
| Comparative Example 5-11 | Modified acrylic block copolymer | 30.0 | PGMEA | 270.0 |
| Comparative Example 5-12 | Modified acrylic block copolymer | 30.0 | PGMEA | 270.0 |
| Comparative Example 5-13 | Modified acrylic block copolymer | 30.0 | PGMEA | 270.0 |
| Comparative Example 5-14 | Modified acrylic block copolymer | 30.0 | PGMEA | 270.0 |

TABLE 15

| Examples | Properties of coloring composition (I) for color filters | | |
|---|---|---|---|
| | Number-average dispersed particle diameter (nm) | Volume-average dispersed particle diameter (nm) | Rate of change in viscosity (%) |
| Example 5-1 | 18 | 42 | 4.0 |
| Example 5-2 | 22 | 37 | 4.7 |
| Example 5-3 | 28 | 45 | 4.9 |
| Example 5-4 | 32 | 54 | 4.9 |
| Example 5-5 | 18 | 35 | 3.2 |
| Example 5-6 | 20 | 54 | 4.4 |
| Example 5-7 | 19 | 61 | 5.8 |
| Example 5-8 | 20 | 98 | 8.4 |
| Example 5-9 | 20 | 52 | — |

| Examples | Properties of coloring composition (I) for color filters Light transmittance (%) | | | |
|---|---|---|---|---|
| | (G) (530 nm) | (B) (460 nm) | (R) (620 nm) | (Y) (550 nm) |
| Example 5-1 | 84.6 | — | — | — |
| Example 5-2 | — | 82.8 | — | — |
| Example 5-3 | — | — | 89.6 | — |
| Example 5-4 | — | — | — | 88.4 |
| Example 5-5 | 85.2 | — | — | — |
| Example 5-6 | 83.5 | — | — | — |
| Example 5-7 | 82.4 | — | — | — |

TABLE 15-continued

| Examples | | | | |
|---|---|---|---|---|
| Example 5-8 | 81.3 | — | — | — |
| Example 5-9 | 83.2 | — | — | — |

Properties of coloring composition (I) for color filters
Specific absorption coefficient (on weight basis)

| Examples | (650 nm) $\epsilon_w$ (-) | (610 nm) $\epsilon_w$ (-) | (550 nm) $\epsilon_w$ (-) | (400 nm) $\epsilon_w$ (-) |
|---|---|---|---|---|
| Example 5-1 | 2.45 | — | — | — |
| Example 5-2 | — | 2.35 | — | — |
| Example 5-3 | — | — | 1.94 | — |
| Example 5-4 | — | — | — | 1.98 |
| Example 5-5 | 2.47 | — | — | — |
| Example 5-6 | 2.38 | — | — | — |
| Example 5-7 | 2.41 | — | — | — |
| Example 5-8 | 2.39 | — | — | — |
| Example 5-9 | 2.38 | — | — | — |

TABLE 16

Properties of coloring composition (I) for color filters

| Comparative Examples | Number-average dispersed particle diameter (nm) | Volume-average dispersed particle diameter (nm) | Rate of change in viscosity (%) |
|---|---|---|---|
| Comparative Example 5-1 | 192 | 426 | 28.4 |
| Comparative Example 5-2 | 174 | 388 | 36.3 |
| Comparative Example 5-3 | 284 | 512 | 35.2 |
| Comparative Example 5-4 | 502 | 1006 | 40.1 |
| Comparative Example 5-5 | 20 | 40 | 3.0 |
| Comparative Example 5-6 | 21 | 42 | 2.9 |
| Comparative Example 5-7 | 23 | 46 | 3.6 |
| Comparative Example 5-8 | 26 | 298 | 36.4 |
| Comparative Example 5-9 | 42 | 234 | 14.2 |
| Comparative Example 5-10 | 39 | 192 | 6.9 |
| Comparative Example 5-11 | 52 | 269 | 29.6 |
| Comparative Example 5-12 | 46 | 713 | 33.4 |
| Comparative Example 5-13 | 49 | 784 | 35.4 |
| Comparative Example 5-14 | 51 | 816 | 40.2 |

Properties of coloring composition (I) for color filters
Light transmittance (%)

| Comparative Examples | (G) (530 nm) | (B) (460 nm) | (R) (620 nm) | (Y) (550 nm) |
|---|---|---|---|---|
| Comparative Example 5-1 | 52.8 | — | — | — |
| Comparative Example 5-2 | — | 54.6 | — | — |
| Comparative Example 5-3 | — | — | 63.2 | — |
| Comparative Example 5-4 | — | — | — | 60.6 |
| Comparative Example 5-5 | 84.7 | — | — | — |
| Comparative Example 5-6 | — | 84.2 | — | — |
| Comparative Example 5-7 | — | — | 88.4 | — |
| Comparative Example 5-8 | 72.8 | — | — | — |
| Comparative Example 5-9 | — | 70.2 | — | — |
| Comparative Example 5-10 | — | — | 82.2 | — |
| Comparative Example 5-11 | — | — | — | 73.5 |
| Comparative Example 5-12 | — | 59.9 | — | — |
| Comparative Example 5-13 | 59.2 | — | — | — |
| Comparative Example 5-14 | — | — | 61.2 | — |

Properties of coloring composition (I) for color filters
Specific absorption coefficient (on weight basis)

| Comparative Examples | (650 nm) $\epsilon_w$ (-) | (610 nm) $\epsilon_w$ (-) | (550 nm) $\epsilon_w$ (-) | (400 nm) $\epsilon_w$ (-) |
|---|---|---|---|---|
| Comparative Example 5-1 | 1.00 | — | — | — |
| Comparative Example 5-2 | — | 1.00 | — | — |
| Comparative Example 5-3 | — | — | 1.00 | — |
| Comparative Example 5-4 | — | — | — | 1.00 |
| Comparative Example 5-5 | 0.96 | — | — | — |
| Comparative Example 5-6 | — | 0.95 | — | — |
| Comparative Example 5-7 | — | — | 0.95 | — |
| Comparative Example 5-8 | 1.38 | — | — | — |
| Comparative Example 5-9 | — | 1.00 | — | — |
| Comparative Example 5-10 | — | — | 1.01 | — |
| Comparative Example 5-11 | — | — | — | 1.00 |
| Comparative Example 5-12 | — | 1.01 | — | — |
| Comparative Example 5-13 | 1.01 | — | — | — |
| Comparative Example 5-14 | — | — | 1.02 | — |

Example 5-9

100.0 parts by weight of the colorant for color filters, 30.0 parts by weight of a dispersant (modified acrylic block copolymer; tradename: "DISPERBYK-2001" produced by BYK Chemie Co., Ltd.) and 100.0 parts by weight of PGMEA were mixed together, and then kneaded and dispersed under heating at 50° C. using a triple roll mill, thereby obtaining a coloring composition (I) for color filters. The essential production conditions are shown in Table 13, and various properties of the obtained coloring composition (I) for color filters are shown in Table 15.

Coloring Composition (II) for Color Filters

Examples 6-2 to 6-8 and Comparative Examples 6-1 to 6-14

The same procedure as defined in Example 6-1 was conducted except that kinds of coloring compositions (I) for color filters and amounts of resins blended therein were changed variously, thereby obtaining coloring compositions (II) for color filters. The essential production conditions are shown in Table 17, various properties of the obtained coloring compositions (II) for color filters are shown in Tables 18 and 19, and various properties of the colored transparent films (II) for color filters obtained by coating the coloring compositions (II) for color filters are shown in Tables 20 and 21.

TABLE 17

Production of coloring composition (II) for color filters

| | Coloring composition (I) | | Resin | |
|---|---|---|---|---|
| | Kind | Amount blended (wt part) | Kind | Amount blended (wt part) |
| Examples | | | | |
| Example 6-1 | Example 5-1 | 400.0 | MMA/MA copolymer* | 100.0 |
| Example 6-2 | Example 5-2 | 400.0 | MMA/MA copolymer* | 100.0 |
| Example 6-3 | Example 5-3 | 400.0 | MMA/MA copolymer* | 100.0 |
| Example 6-4 | Example 5-4 | 400.0 | MMA/MA copolymer* | 100.0 |
| Example 6-5 | Example 5-5 | 400.0 | MMA/MA copolymer* | 100.0 |
| Example 6-6 | Example 5-6 | 400.0 | MMA/MA copolymer* | 90.0 |
| Example 6-7 | Example 5-7 | 400.0 | MMA/MA copolymer* | 80.0 |
| Example 6-8 | Example 5-8 | 400.0 | MMA/MA copolymer* | 70.0 |
| Example 6-9 | Example 5-9 | 220.0 | MMA/MA copolymer* | 100.0 |
| Comparative Examples | | | | |
| Comparative Example 6-1 | Comparative Example 5-1 | 400.0 | MMA/MA copolymer* | 100.0 |
| Comparative Example 6-2 | Comparative Example 5-2 | 400.0 | MMA/MA copolymer* | 100.0 |
| Comparative Example 6-3 | Comparative Example 5-3 | 400.0 | MMA/MA copolymer* | 100.0 |
| Comparative Example 6-4 | Comparative Example 5-4 | 400.0 | MMA/MA copolymer* | 100.0 |
| Comparative Example 6-5 | Comparative Example 5-5 | 400.0 | MMA/MA copolymer* | 100.0 |
| Comparative Example 6-6 | Comparative Example 5-6 | 400.0 | MMA/MA copolymer* | 100.0 |
| Comparative Example 6-7 | Comparative Example 5-7 | 400.0 | MMA/MA copolymer* | 100.0 |
| Comparative Example 6-8 | Comparative Example 5-8 | 400.0 | MMA/MA copolymer* | 100.0 |
| Comparative Example 6-9 | Comparative Example 5-9 | 400.0 | MMA/MA copolymer* | 100.0 |
| Comparative Example 6-10 | Comparative Example 5-10 | 400.0 | MMA/MA copolymer* | 100.0 |
| Comparative Example 6-11 | Comparative Example 5-11 | 400.0 | MMA/MA copolymer* | 100.0 |
| Comparative Example 6-12 | Comparative Example 5-12 | 400.0 | MMA/MA copolymer* | 100.0 |
| Comparative Example 6-13 | Comparative Example 5-13 | 400.0 | MMA/MA copolymer* | 100.0 |
| Comparative Example 6-14 | Comparative Example 5-14 | 400.0 | MMA/MA copolymer* | 100.0 |

Note
*MMA/MA copolymer denotes Methyl methacrylate/methacrylic acid copolymer

TABLE 18

Properties of coloring composition (II) for color filters

| Examples | Number-average dispersed particle diameter (nm) | Volume-average dispersed particle diameter (nm) | Viscosity (mPa·s) | Rate of change in viscosity (%) |
|---|---|---|---|---|
| Example 6-1 | 19 | 44 | 16.6 | 3.9 |
| Example 6-2 | 23 | 38 | 17.9 | 4.6 |
| Example 6-3 | 30 | 55 | 19.4 | 4.7 |
| Example 6-4 | 33 | 82 | 19.0 | 4.8 |
| Example 6-5 | 19 | 36 | 14.8 | 3.0 |
| Example 6-6 | 20 | 59 | 18.2 | 4.2 |
| Example 6-7 | 20 | 65 | 22.1 | 5.5 |
| Example 6-8 | 21 | 104 | 24.2 | 8.2 |
| Example 6-9 | 21 | 56 | — | — |

Properties of coloring composition (II) for color filters
Specific absorption coefficient (on weight basis)

| Examples | (650 nm) $\epsilon_w$ (–) | (610 nm) $\epsilon_w$ (–) | (550 nm) $\epsilon_w$ (–) | (400 nm) $\epsilon_w$ (–) |
|---|---|---|---|---|
| Example 6-1 | 2.56 | — | — | — |
| Example 6-2 | — | 2.47 | — | — |
| Example 6-3 | — | — | 2.01 | — |
| Example 6-4 | — | — | — | 2.06 |
| Example 6-5 | 2.64 | — | — | — |
| Example 6-6 | 2.49 | — | — | — |
| Example 6-7 | 2.51 | — | — | — |
| Example 6-8 | 2.48 | — | — | — |
| Example 6-9 | 2.40 | — | — | — |

TABLE 19

Properties of coloring composition (II) for color filters

| Comparative Examples | Number-average dispersed particle diameter (nm) | Volume-average dispersed particle diameter (nm) | Viscosity (mPa·s) | Rate of change in viscosity (%) |
|---|---|---|---|---|
| Comparative Example 6-1 | 196 | 424 | 164.6 | 27.9 |
| Comparative Example 6-2 | 182 | 394 | 244.2 | 36.0 |
| Comparative Example 6-3 | 296 | 518 | 214.3 | 34.6 |

TABLE 19-continued

| | | | | |
|---|---|---|---|---|
| Comparative Example 6-4 | 514 | 1016 | 298.7 | 39.2 |
| Comparative Example 6-5 | 22 | 41 | 14.8 | 2.9 |
| Comparative Example 6-6 | 23 | 48 | 15.1 | 2.9 |
| Comparative Example 6-7 | 25 | 52 | 16.6 | 3.3 |
| Comparative Example 6-8 | 27 | 301 | 34.2 | 32.8 |
| Comparative Example 6-9 | 46 | 292 | 29.4 | 12.8 |
| Comparative Example 6-10 | 44 | 229 | 16.9 | 5.8 |
| Comparative Example 6-11 | 63 | 284 | 30.4 | 28.4 |
| Comparative Example 6-12 | 72 | 795 | 55.8 | 28.8 |
| Comparative Example 6-13 | 68 | 852 | 58.2 | 35.0 |
| Comparative Example 6-14 | 79 | 848 | 61.5 | 35.4 |

Properties of coloring composition (II) for color filters
Specific absorption coefficient (on weight basis)

| Comparative Examples | (650 nm) $\epsilon_w$ (−) | (610 nm) $\epsilon_w$ (−) | (550 nm) $\epsilon_w$ (−) | (400 nm) $\epsilon_w$ (−) |
|---|---|---|---|---|
| Comparative Example 6-1 | 1.00 | — | — | — |
| Comparative Example 6-2 | — | 1.00 | — | — |
| Comparative Example 6-3 | — | — | 1.00 | — |
| Comparative Example 6-4 | — | — | — | 1.00 |
| Comparative Example 6-5 | 0.97 | — | — | — |
| Comparative Example 6-6 | — | 0.96 | — | — |
| Comparative Example 6-7 | — | — | 0.96 | — |
| Comparative Example 6-8 | 1.40 | — | — | — |
| Comparative Example 6-9 | — | 0.98 | — | — |
| Comparative Example 6-10 | — | — | 0.99 | — |
| Comparative Example 6-11 | — | — | — | 0.99 |
| Comparative Example 6-12 | — | 1.02 | — | — |
| Comparative Example 6-13 | 1.01 | — | — | — |
| Comparative Example 6-14 | — | — | 1.02 | — |

TABLE 20

Properties of colored transparent film (II) for color filters
Chromaticity

| Examples | x value (−) | y value (−) | Y value (−) |
|---|---|---|---|
| Example 6-1 | 0.2754 | 0.3878 | 70.21 |
| Example 6-2 | 0.1475 | 0.2182 | 29.33 |
| Example 6-3 | 0.5846 | 0.3398 | 23.24 |
| Example 6-4 | 0.3457 | 0.4954 | 74.28 |
| Example 6-5 | 0.2746 | 0.3884 | 70.89 |
| Example 6-6 | 0.2762 | 0.3879 | 69.98 |
| Example 6-7 | 0.2733 | 0.3866 | 69.84 |
| Example 6-8 | 0.2752 | 0.3860 | 68.84 |
| Example 6-9 | 0.2750 | 0.3847 | 69.54 |

Properties of colored transparent film (II) for color filters

| Examples | Light fastness ΔE* value (−) | Heat resistance ΔE* value (−) |
|---|---|---|
| Example 6-1 | 3.32 | 3.51 |
| Example 6-2 | 3.42 | 3.74 |
| Example 6-3 | 3.18 | 3.36 |
| Example 6-4 | 3.72 | 3.89 |
| Example 6-5 | 3.30 | 3.46 |
| Example 6-6 | 3.34 | 3.49 |
| Example 6-7 | 4.16 | 4.22 |
| Example 6-8 | 4.72 | 4.96 |
| Example 6-9 | 3.36 | 3.55 |

Properties of colored transparent film (II) for color filters
Light transmittance (%)

| Examples | (G) (530 nm) | (B) (460 nm) | (R) (620 nm) | (Y) (550 nm) |
|---|---|---|---|---|
| Example 6-1 | 92.6 | — | — | — |
| Example 6-2 | — | 91.8 | — | — |
| Example 6-3 | — | — | 96.6 | — |
| Example 6-4 | — | — | — | 95.9 |
| Example 6-5 | 93.2 | — | — | — |
| Example 6-6 | 91.8 | — | — | — |
| Example 6-7 | 91.4 | — | — | — |
| Example 6-8 | 88.6 | — | — | — |
| Example 6-9 | 91.8 | — | — | — |

Properties of colored transparent film (II) for color filters
Specific absorption coefficient (on weight basis)

| Examples | (650 nm) $\epsilon_w$ (−) | (610 nm) $\epsilon_w$ (−) | (550 nm) $\epsilon_w$ (−) | (400 nm) $\epsilon_w$ (−) |
|---|---|---|---|---|
| Example 6-1 | 2.47 | — | — | — |
| Example 6-2 | — | 2.36 | — | — |
| Example 6-3 | — | — | 1.95 | — |
| Example 6-4 | — | — | — | 1.98 |
| Example 6-5 | 2.51 | — | — | — |
| Example 6-6 | 2.36 | — | — | — |
| Example 6-7 | 2.41 | — | — | — |
| Example 6-8 | 2.40 | — | — | — |
| Example 6-9 | 2.35 | — | — | — |

TABLE 21

Properties of colored transparent film (II) for color filters
Chromaticity

| Comparative Examples | x value (−) | y value (−) | Y value (−) |
|---|---|---|---|
| Comparative Example 6-1 | 0.2720 | 0.3768 | 62.19 |
| Comparative Example 6-2 | 0.1595 | 0.2224 | 26.28 |
| Comparative Example 6-3 | 0.5384 | 0.3125 | 21.09 |
| Comparative Example 6-4 | 0.3422 | 0.4931 | 68.89 |

TABLE 21-continued

| Comparative Examples | | | |
|---|---|---|---|
| Comparative Example 6-5 | 0.2750 | 0.3868 | 70.14 |
| Comparative Example 6-6 | 0.1472 | 0.2194 | 28.89 |
| Comparative Example 6-7 | 0.5852 | 0.3402 | 23.01 |
| Comparative Example 6-8 | 0.2757 | 0.3888 | 67.49 |
| Comparative Example 6-9 | 0.1472 | 0.2177 | 28.19 |
| Comparative Example 6-10 | 0.5851 | 0.3389 | 21.46 |
| Comparative Example 6-11 | 0.3446 | 0.4942 | 70.27 |
| Comparative Example 6-12 | 0.1466 | 0.2179 | 26.89 |
| Comparative Example 6-13 | 0.2760 | 0.3864 | 66.29 |
| Comparative Example 6-14 | 0.5872 | 0.3384 | 21.94 |

| | Properties of colored transparent film (II) for color filters | |
|---|---|---|
| Comparative Examples | Light fastness ΔE* value (-) | Heat resistance ΔE* value (-) |
| Comparative Example 6-1 | 7.92 | 7.29 |
| Comparative Example 6-2 | 8.71 | 8.84 |
| Comparative Example 6-3 | 7.79 | 6.95 |
| Comparative Example 6-4 | 7.08 | 8.67 |
| Comparative Example 6-5 | 2.94 | 2.74 |
| Comparative Example 6-6 | 3.02 | 3.06 |
| Comparative Example 6-7 | 2.88 | 2.96 |
| Comparative Example 6-8 | 6.09 | 6.51 |
| Comparative Example 6-9 | 2.78 | 2.85 |
| Comparative Example 6-10 | 2.47 | 2.71 |
| Comparative Example 6-11 | 2.52 | 2.69 |
| Comparative Example 6-12 | 9.89 | 9.74 |
| Comparative Example 6-13 | 8.14 | 8.36 |
| Comparative Example 6-14 | 8.25 | 8.16 |

| | Properties of colored transparent film (II) for color filters Light transmittance (%) | | | |
|---|---|---|---|---|
| Comparative Examples | (G) (530 nm) | (B) (460 nm) | (R) (620 nm) | (Y) (550 nm) |
| Comparative Example 6-1 | 62.4 | — | — | — |
| Comparative Example 6-2 | — | 61.2 | — | — |
| Comparative Example 6-3 | — | — | 70.4 | — |
| Comparative Example 6-4 | — | — | — | 69.8 |
| Comparative Example 6-5 | 92.7 | — | — | — |
| Comparative Example 6-6 | — | 91.6 | — | — |
| Comparative Example 6-7 | — | — | 94.2 | — |
| Comparative Example 6-8 | 75.6 | — | — | — |
| Comparative Example 6-9 | — | 69.8 | — | — |
| Comparative Example 6-10 | — | — | 76.7 | — |
| Comparative Example 6-11 | — | — | — | 76.9 |
| Comparative Example 6-12 | — | 55.4 | — | — |
| Comparative Example 6-13 | 56.8 | — | — | — |
| Comparative Example 6-14 | — | — | 59.6 | — |

| | Properties of colored transparent film (II) for color filters Specific absorption coefficient (on weight basis) | | | |
|---|---|---|---|---|
| Comparative Examples | (650 nm) $\epsilon_w$ (-) | (610 nm) $\epsilon_w$ (-) | (550 nm) $\epsilon_w$ (-) | (400 nm) $\epsilon_w$ (-) |
| Comparative Example 6-1 | 1.00 | — | — | — |
| Comparative Example 6-2 | — | 1.00 | — | — |
| Comparative Example 6-3 | — | — | 1.00 | — |
| Comparative Example 6-4 | — | — | — | 1.00 |
| Comparative Example 6-5 | 0.95 | — | — | — |
| Comparative Example 6-6 | — | 0.96 | — | — |
| Comparative Example 6-7 | — | — | 0.95 | — |
| Comparative Example 6-8 | 1.39 | — | — | — |
| Comparative Example 6-9 | — | 0.99 | — | — |
| Comparative Example 6-10 | — | — | 0.99 | — |
| Comparative Example 6-11 | — | — | — | 0.99 |
| Comparative Example 6-12 | — | 1.01 | — | — |
| Comparative Example 6-13 | 1.01 | — | — | — |
| Comparative Example 6-14 | — | — | 1.02 | — |

Example 6-9

220.0 parts by weight of the coloring composition (I) obtained in Example 5-9 and 100.0 parts by weight of methyl methacrylate/methacrylic acid copolymer were mixed together, and then kneaded and dispersed under heating at 50° C. using a triple roll mill, thereby obtaining a coloring composition (II) for color filters. The essential production conditions are shown in Table 17, various properties of the obtained coloring composition (II) for color filters are shown in Table 18, and various properties of the colored transparent film (II) for color filters obtained by coating the coloring composition (II) for color filters are shown in Table 20.

Coloring Composition (III) for Color Filters

Examples 7-2 to 7-8 and Comparative Examples 7-1 to 7-14

The same procedure as defined in Example 7-1 was conducted except that kinds of coloring compositions (II) for color filters and amounts of polymerization initiators blended therein were changed variously, thereby obtaining coloring compositions (III) for color filters. The essential production conditions are shown in Table 22, various properties of the obtained coloring compositions (III) for color filters are shown in Tables 23 and 24, and various properties of the colored transparent films (III) for color filters obtained by coating the coloring compositions (III) for color filters are shown in Tables 25 and 26.

TABLE 22

Production of coloring composition (III) for color filters

| Examples | Coloring composition (II) Kind | Amount blended (wt. part) | Polyfunctional monomer Kind | Amount blended (wt. part) |
|---|---|---|---|---|
| Example 7-1 | Example 6-1 | 500.0 | Dipentaerythritol pentaacrylate | 100.0 |
| Example 7-2 | Example 6-2 | 500.0 | Dipentaerythritol pentaacrylate | 100.0 |
| Example 7-3 | Example 6-3 | 500.0 | Dipentaerythritol pentaacrylate | 100.0 |
| Example 7-4 | Example 6-4 | 500.0 | Dipentaerythritol pentaacrylate | 100.0 |
| Example 7-5 | Example 6-5 | 500.0 | Dipentaerythritol pentaacrylate | 100.0 |
| Example 7-6 | Example 6-6 | 490.0 | Dipentaerythritol pentaacrylate | 100.0 |
| Example 7-7 | Example 6-7 | 480.0 | Dipentaerythritol pentaacrylate | 100.0 |
| Example 7-8 | Example 6-8 | 470.0 | Dipentaerythritol pentaacrylate | 100.0 |
| Example 7-9 | Example 6-9 | 320.0 | Dipentaerythritol pentaacrylate | 100.0 |

Production of coloring composition (III) for color filters
Polymerization initiator

| Examples | Kind | Amount blended (wt. part) |
|---|---|---|
| Example 7-1 | 2-(4-methoxy-β-styryl)-bis(4,6-trichloromethyl)-s-triazine | 5.0 |
| Example 7-2 | 2-(4-methoxy-β-styryl)-bis(4,6-trichloromethyl)-s-triazine | 5.0 |
| Example 7-3 | 2-(4-methoxy-β-styryl)-bis(4,6-trichloromethyl)-s-triazine | 5.0 |
| Example 7-4 | 2-(4-methoxy-β-styryl)-bis(4,6-trichloromethyl)-s-triazine | 5.0 |
| Example 7-5 | 2-(4-methoxy-β-styryl)-bis(4,6-trichloromethyl)-s-triazine | 5.0 |
| Example 7-6 | 2-(4-methoxy-β-styryl)-bis(4,6-trichloromethyl)-s-triazine | 4.5 |
| Example 7-7 | 2-(4-methoxy-β-styryl)-bis(4,6-trichloromethyl)-s-triazine | 3.5 |
| Example 7-8 | 2-(4-methoxy-β-styryl)-bis(4,6-trichloromethyl)-s-triazine | 3.0 |
| Example 7-9 | 2-(4-methoxy-β-styryl)-bis(4,6-trichloromethyl)-s-triazine | 2.5 |

TABLE 22-continued

Production of coloring composition (III) for color filters

| Comparative Examples | Coloring composition (II) Kind | Amount blended (wt. part) | Polyfunctional monomer Kind | Amount blended (wt. part) |
|---|---|---|---|---|
| Comparative Example 7-1 | Comparative Example 6-1 | 500.0 | Dipentaerythritol pentaacrylate | 100.0 |
| Comparative Example 7-2 | Comparative Example 6-2 | 500.0 | Dipentaerythritol pentaacrylate | 100.0 |
| Comparative Example 7-3 | Comparative Example 6-3 | 500.0 | Dipentaerythritol pentaacrylate | 100.0 |
| Comparative Example 7-4 | Comparative Example 6-4 | 500.0 | Dipentaerythritol pentaacrylate | 100.0 |
| Comparative Example 7-5 | Comparative Example 6-5 | 500.0 | Dipentaerythritol pentaacrylate | 100.0 |
| Comparative Example 7-6 | Comparative Example 6-6 | 500.0 | Dipentaerythritol pentaacrylate | 100.0 |
| Comparative Example 7-7 | Comparative Example 6-7 | 500.0 | Dipentaerythritol pentaacrylate | 100.0 |
| Comparative Example 7-8 | Comparative Example 6-8 | 500.0 | Dipentaerythritol pentaacrylate | 100.0 |
| Comparative Example 7-9 | Comparative Example 6-9 | 500.0 | Dipentaerythritol pentaacrylate | 100.0 |
| Comparative Example 7-10 | Comparative Example 6-10 | 500.0 | Dipentaerythritol pentaacrylate | 100.0 |
| Comparative Example 7-11 | Comparative Example 6-11 | 500.0 | Dipentaerythritol pentaacrylate | 100.0 |
| Comparative Example 7-12 | Comparative Example 6-12 | 500.0 | Dipentaerythritol pentaacrylate | 100.0 |
| Comparative Example 7-13 | Comparative Example 6-13 | 500.0 | Dipentaerythritol pentaacrylate | 100.0 |
| Comparative Example 7-14 | Comparative Example 6-14 | 500.0 | Dipentaerythritol pentaacrylate | 100.0 |

Production of coloring composition (III) for color filters
Polymerization initiator

| Comparative Examples | Kind | Amount blended (wt. part) |
|---|---|---|
| Comparative Example 7-1 | 2-(4-methoxy-β-styryl)-bis(4,6-trichloromethyl)-s-triazine | 5.0 |
| Comparative Example 7-2 | 2-(4-methoxy-β-styryl)-bis(4,6-trichloromethyl)-s-triazine | 5.0 |
| Comparative Example 7-3 | 2-(4-methoxy-β-styryl)-bis(4,6-trichloromethyl)-s-triazine | 5.0 |
| Comparative Example 7-4 | 2-(4-methoxy-β-styryl)-bis(4,6-trichloromethyl)-s-triazine | 5.0 |
| Comparative Example 7-5 | 2-(4-methoxy-β-styryl)-bis(4,6-trichloromethyl)-s-triazine | 5.0 |
| Comparative Example 7-6 | 2-(4-methoxy-β-styryl)-bis(4,6-trichloromethyl)-s-triazine | 5.0 |
| Comparative Example 7-7 | 2-(4-methoxy-β-styryl)-bis(4,6-trichloromethyl)-s-triazine | 5.0 |
| Comparative Example 7-8 | 2-(4-methoxy-β-styryl)-bis(4,6-trichloromethyl)-s-triazine | 5.0 |
| Comparative Example 7-9 | 2-(4-methoxy-β-styryl)-bis(4,6-trichloromethyl)-s-triazine | 5.0 |
| Comparative Example 7-10 | 2-(4-methoxy-β-styryl)-bis(4,6-trichloromethyl)-s-triazine | 5.0 |
| Comparative Example 7-11 | 2-(4-methoxy-β-styryl)-bis(4,6-trichloromethyl)-s-triazine | 5.0 |
| Comparative Example 7-12 | 2-(4-methoxy-β-styryl)-bis(4,6-trichloromethyl)-s-triazine | 5.0 |
| Comparative Example 7-13 | 2-(4-methoxy-β-styryl)-bis(4,6-trichloromethyl)-s-triazine | 5.0 |
| Comparative Example 7-14 | 2-(4-methoxy-β-styryl)-bis(4,6-trichloromethyl)-s-triazine | 5.0 |

TABLE 23

Properties of coloring composition (III) for color filters

| Examples | Number-average dispersed particle diameter (nm) | Volume-average dispersed particle diameter (nm) | Viscosity (mPa·s) | Rate of change in viscosity (%) |
|---|---|---|---|---|
| Example 7-1 | 17 | 40 | 16.8 | 3.9 |
| Example 7-2 | 21 | 35 | 17.8 | 4.6 |
| Example 7-3 | 26 | 51 | 19.6 | 4.8 |
| Example 7-4 | 30 | 72 | 19.2 | 4.8 |
| Example 7-5 | 17 | 33 | 15.2 | 3.2 |
| Example 7-6 | 18 | 55 | 18.6 | 4.5 |
| Example 7-7 | 18 | 61 | 22.4 | 5.7 |
| Example 7-8 | 19 | 98 | 24.9 | 8.4 |
| Example 7-9 | 20 | 55 | — | — |

Properties of coloring composition (III) for color filters
Specific absorption coefficient (on weight basis)

| Examples | (650 nm) $\epsilon_w$ (−) | (610 nm) $\epsilon_w$ (−) | (550 nm) $\epsilon_w$ (−) | (400 nm) $\epsilon_w$ (−) |
|---|---|---|---|---|
| Example 7-1 | 2.55 | — | — | — |
| Example 7-2 | — | 2.45 | — | — |
| Example 7-3 | — | — | 2.00 | — |
| Example 7-4 | — | — | — | 2.05 |
| Example 7-5 | 2.62 | — | — | — |
| Example 7-6 | 2.43 | — | — | — |
| Example 7-7 | 2.48 | — | — | — |
| Example 7-8 | 2.46 | — | — | — |
| Example 7-9 | 2.40 | — | — | — |

TABLE 24

Properties of coloring composition (III) for color filters

| Comparative Examples | Number-average dispersed particle diameter (nm) | Volume-average dispersed particle diameter (nm) | Viscosity (mPa·s) | Rate of change in viscosity (%) |
|---|---|---|---|---|
| Comparative Example 7-1 | 184 | 401 | 162.6 | 27.6 |
| Comparative Example 7-2 | 170 | 382 | 240.8 | 35.8 |
| Comparative Example 7-3 | 282 | 504 | 212.4 | 33.9 |
| Comparative Example 7-4 | 501 | 1001 | 297.6 | 38.9 |
| Comparative Example 7-5 | 19 | 40 | 15.2 | 3.0 |
| Comparative Example 7-6 | 21 | 48 | 15.3 | 3.1 |
| Comparative Example 7-7 | 22 | 51 | 16.9 | 3.6 |
| Comparative Example 7-8 | 24 | 324 | 56.2 | 29.0 |
| Comparative Example 7-9 | 42 | 266 | 30.6 | 18.2 |
| Comparative Example 7-10 | 46 | 234 | 15.9 | 6.0 |
| Comparative Example 7-11 | 68 | 293 | 46.4 | 22.6 |
| Comparative Example 7-12 | 74 | 806 | 50.2 | 27.8 |
| Comparative Example 7-13 | 70 | 864 | 51.4 | 33.6 |
| Comparative Example 7-14 | 81 | 860 | 58.6 | 34.6 |

Properties of coloring composition (III) for color filters
Specific absorption coefficient (on weight basis)

| Comparative Examples | (650 nm) $\epsilon_w$ (−) | (610 nm) $\epsilon_w$ (−) | (550 nm) $\epsilon_w$ (−) | (400 nm) $\epsilon_w$ (−) |
|---|---|---|---|---|
| Comparative Example 7-1 | 1.00 | — | — | — |
| Comparative Example 7-2 | — | 1.00 | — | — |
| Comparative Example 7-3 | — | — | 1.00 | — |
| Comparative Example 7-4 | — | — | — | 1.00 |
| Comparative Example 7-5 | 0.98 | — | — | — |
| Comparative Example 7-6 | — | 0.96 | — | — |
| Comparative Example 7-7 | — | — | 0.95 | — |
| Comparative Example 7-8 | 1.39 | — | — | — |
| Comparative Example 7-9 | — | 0.98 | — | — |
| Comparative Example 7-10 | — | — | 0.99 | — |
| Comparative Example 7-11 | — | — | — | 0.99 |
| Comparative Example 7-12 | — | 1.02 | — | — |
| Comparative Example 7-13 | 1.01 | — | — | — |
| Comparative Example 7-14 | — | — | 1.02 | — |

TABLE 25

Properties of colored transparent film (III) for color filters
Chromaticity

| Examples | x value (−) | y value (−) | Y value (−) |
|---|---|---|---|
| Example 7-1 | 0.2755 | 0.3877 | 70.36 |
| Example 7-2 | 0.1476 | 0.2181 | 29.42 |
| Example 7-3 | 0.5848 | 0.3399 | 23.29 |
| Example 7-4 | 0.3459 | 0.4954 | 74.42 |
| Example 7-5 | 0.2747 | 0.3884 | 71.12 |
| Example 7-6 | 0.2760 | 0.3880 | 70.04 |
| Example 7-7 | 0.2735 | 0.3862 | 69.96 |
| Example 7-8 | 0.2755 | 0.3860 | 69.02 |
| Example 7-9 | 0.2754 | 0.3851 | 69.82 |

Properties of colored transparent film (III) for color filters

| Examples | Light fastness ΔE* value (−) | Heat resistance ΔE* value (−) |
|---|---|---|
| Example 7-1 | 3.30 | 3.49 |
| Example 7-2 | 3.41 | 3.71 |
| Example 7-3 | 3.14 | 3.35 |
| Example 7-4 | 3.66 | 3.85 |
| Example 7-5 | 3.28 | 3.45 |
| Example 7-6 | 3.31 | 3.48 |
| Example 7-7 | 4.09 | 4.19 |

TABLE 25-continued

| | | |
|---|---|---|
| Example 7-8 | 4.66 | 4.87 |
| Example 7-9 | 3.35 | 3.52 |

Properties of colored transparent film (III) for color filters
Light transmittance (%)

| Examples | (G) (530 nm) | (B) (460 nm) | (R) (620 nm) | (Y) (550 nm) |
|---|---|---|---|---|
| Example 7-1 | 93.1 | — | — | — |
| Example 7-2 | — | 92.4 | — | — |
| Example 7-3 | — | — | 97.1 | — |
| Example 7-4 | — | — | — | 96.4 |
| Example 7-5 | 93.8 | — | — | — |
| Example 7-6 | 92.2 | — | — | — |
| Example 7-7 | 91.9 | — | — | — |
| Example 7-8 | 89.6 | — | — | — |
| Example 7-9 | 92.2 | — | — | — |

Properties of colored transparent film (III) for color filters
Specific absorption coefficient (on weight basis)

| Examples | (650 nm) $\epsilon_w$ (-) | (610 nm) $\epsilon_w$ (-) | (550 nm) $\epsilon_w$ (-) | (400 nm) $\epsilon_w$ (-) |
|---|---|---|---|---|
| Example 7-1 | 2.49 | — | — | — |
| Example 7-2 | — | 2.38 | — | — |
| Example 7-3 | — | — | 1.97 | — |
| Example 7-4 | — | — | — | 2.01 |
| Example 7-5 | 2.52 | — | — | — |
| Example 7-6 | 2.39 | — | — | — |
| Example 7-7 | 2.40 | — | — | — |
| Example 7-8 | 2.42 | — | — | — |
| Example 7-9 | 2.38 | — | — | — |

TABLE 26

Properties of colored transparent film (III) for color filters
Chromaticity

| Comparative Examples | x value (-) | y value (-) | Y value (-) |
|---|---|---|---|
| Comparative Example 7-1 | 0.2720 | 0.3769 | 62.36 |
| Comparative Example 7-2 | 0.1596 | 0.2225 | 26.31 |
| Comparative Example 7-3 | 0.5388 | 0.3125 | 21.15 |
| Comparative Example 7-4 | 0.3421 | 0.4933 | 69.01 |
| Comparative Example 7-5 | 0.2752 | 0.3868 | 70.29 |
| Comparative Example 7-6 | 0.1471 | 0.2198 | 28.97 |
| Comparative Example 7-7 | 0.5856 | 0.3409 | 23.14 |
| Comparative Example 7-8 | 0.2757 | 0.3890 | 67.55 |
| Comparative Example 7-9 | 0.1470 | 0.2179 | 28.26 |
| Comparative Example 7-10 | 0.5856 | 0.3391 | 21.51 |
| Comparative Example 7-11 | 0.3451 | 0.4940 | 70.34 |
| Comparative Example 7-12 | 0.1467 | 0.2184 | 26.94 |
| Comparative Example 7-13 | 0.2762 | 0.3860 | 66.31 |
| Comparative Example 7-14 | 0.5876 | 0.3386 | 21.96 |

Properties of colored transparent film (III) for color filters

| Comparative Examples | Light fastness $\Delta E^*$ value (-) | Heat resistance $\Delta E^*$ value (-) |
|---|---|---|
| Comparative Example 7-1 | 7.85 | 7.24 |
| Comparative Example 7-2 | 8.66 | 8.81 |
| Comparative Example 7-3 | 7.75 | 6.92 |
| Comparative Example 7-4 | 7.06 | 8.65 |
| Comparative Example 7-5 | 2.92 | 2.69 |
| Comparative Example 7-6 | 3.01 | 3.00 |
| Comparative Example 7-7 | 2.82 | 2.94 |
| Comparative Example 7-8 | 6.05 | 6.48 |
| Comparative Example 7-9 | 2.77 | 2.83 |
| Comparative Example 7-10 | 2.45 | 2.69 |
| Comparative Example 7-11 | 2.49 | 2.65 |
| Comparative Example 7-12 | 9.74 | 9.65 |
| Comparative Example 7-13 | 8.10 | 8.34 |
| Comparative Example 7-14 | 8.21 | 8.09 |

Properties of colored transparent film (III) for color filters
Light transmittance (%)

| Comparative Examples | (G) (530 nm) | (B) (460 nm) | (R) (620 nm) | (Y) (550 nm) |
|---|---|---|---|---|
| Comparative Example 7-1 | 63.0 | — | — | — |
| Comparative Example 7-2 | — | 61.8 | — | — |
| Comparative Example 7-3 | — | — | 70.9 | — |
| Comparative Example 7-4 | — | — | — | 70.1 |
| Comparative Example 7-5 | 93.0 | — | — | — |
| Comparative Example 7-6 | — | 91.8 | — | — |
| Comparative Example 7-7 | — | — | 94.3 | — |
| Comparative Example 7-8 | 73.9 | — | — | — |
| Comparative Example 7-9 | — | 69.9 | — | — |
| Comparative Example 7-10 | — | — | 76.4 | — |
| Comparative Example 7-11 | — | — | — | 76.1 |
| Comparative Example 7-12 | — | 56.2 | — | — |
| Comparative Example 7-13 | 57.1 | — | — | — |
| Comparative Example 7-14 | — | — | 60.9 | — |

TABLE 26-continued

Properties of colored transparent film (III) for color filters
Specific absorption coefficient (on weight basis)

| Comparative Examples | (650 nm) $\epsilon_w$ (−) | (610 nm) $\epsilon_w$ (−) | (550 nm) $\epsilon_w$ (−) | (400 nm) $\epsilon_w$ (−) |
|---|---|---|---|---|
| Comparative Example 7-1 | 1.00 | — | — | — |
| Comparative Example 7-2 | — | 1.00 | — | — |
| Comparative Example 7-3 | — | — | 1.00 | — |
| Comparative Example 7-4 | — | — | — | 1.00 |
| Comparative Example 7-5 | 0.96 | — | — | — |
| Comparative Example 7-6 | — | 0.95 | — | — |
| Comparative Example 7-7 | — | — | 0.95 | — |
| Comparative Example 7-8 | 1.41 | — | — | — |
| Comparative Example 7-9 | — | 0.99 | — | — |
| Comparative Example 7-10 | — | — | 0.99 | — |
| Comparative Example 7-11 | — | — | — | 0.99 |
| Comparative Example 7-12 | — | 1.01 | — | — |
| Comparative Example 7-13 | 1.01 | — | — | — |
| Comparative Example 7-14 | — | — | 1.01 | — |

Example 7-9

320.0 parts by weight of the coloring composition (II) obtained in Example 6-9, 100.0 parts by weight of dipentaerythritol pentaacrylate and 2.5 parts by weight of 2-(4-methoxy-β-styryl)-bis(4,6-trichloromethyl)-s-triazine were mixed together, and then kneaded and dispersed under heating at 50° C. using a triple roll mill, thereby obtaining a coloring composition (III) for color filters. The essential production conditions are shown in Table 22, various properties of the obtained coloring composition (III) for color filters are shown in Table 23, and various properties of the colored transparent film (III) for color filters obtained by coating the coloring composition (III) for color filters are shown in Table 25.

Coloring Composition (IV) for Color Filters

Examples 8-2 to 8-8 and Comparative Examples 8-1 to 8-14

The same procedure as defined in Example 8-1 was conducted except that kinds and amounts of coloring compositions (II) for color filters and kinds and amounts of photo-acid generators blended therein were changed variously, thereby obtaining coloring compositions (IV) for color filters. The essential production conditions are shown in Table 27, various properties of the obtained coloring compositions (IV) for color filters are shown in Tables 28 and 29, and various properties of the colored transparent films (IV) for color filters obtained by coating the coloring compositions (IV) for color filters are shown in Tables 30 and 31.

TABLE 27

Production of coloring composition (IV) for color filters

| | Coloring composition (II) | | Photo-acid generator | |
|---|---|---|---|---|
| | Kind | Amount blended (wt. part) | Kind | Amount blended (wt. part) |
| Examples | | | | |
| Example 8-1 | Example 6-1 | 500.0 | p-PhTPhDPhSf-TFAC* | 5.0 |
| Example 8-2 | Example 6-2 | 500.0 | p-PhTPhDPhSf-TFAC* | 5.0 |
| Example 8-3 | Example 6-3 | 500.0 | p-PhTPhDPhSf-TFAC* | 5.0 |
| Example 8-4 | Example 6-4 | 500.0 | p-PhTPhDPhSf-TFAC* | 5.0 |
| Example 8-5 | Example 6-5 | 500.0 | p-PhTPhDPhSf-TFAC* | 5.0 |
| Example 8-6 | Example 6-6 | 490.0 | p-PhTPhDPhSf-TFAC* | 4.0 |
| Example 8-7 | Example 6-7 | 480.0 | N-trifluoromethane-sulfonyloxy diphenylmaleimide | 3.5 |
| Example 8-8 | Example 6-8 | 470.0 | 1-(3,4-dimethoxyphenyl)-3,5-bis(trichloromethyl)-2-triazine | 3.0 |
| Example 8-9 | Example 6-9 | 320.0 | p-PhTPhDPhSf-TFAC* | 2.5 |
| Comparative Examples | | | | |
| Comparative Example 8-1 | Comparative Example 6-1 | 500.0 | p-PhTPhDPhSf-TFAC* | 5.0 |
| Comparative Example 8-2 | Comparative Example 6-2 | 500.0 | p-PhTPhDPhSf-TFAC* | 5.0 |
| Comparative Example 8-3 | Comparative Example 6-3 | 500.0 | p-PhTPhDPhSf-TFAC* | 5.0 |
| Comparative Example 8-4 | Comparative Example 6-4 | 500.0 | p-PhTPhDPhSf-TFAC* | 5.0 |
| Comparative Example 8-5 | Comparative Example 6-5 | 500.0 | p-PhTPhDPhSf-TFAC* | 5.0 |
| Comparative Example 8-6 | Comparative Example 6-6 | 500.0 | p-PhTPhDPhSf-TFAC* | 5.0 |
| Comparative Example 8-7 | Comparative Example 6-7 | 500.0 | p-PhTPhDPhSf-TFAC* | 5.0 |
| Comparative Example 8-8 | Comparative Example 6-8 | 500.0 | p-PhTPhDPhSf-TFAC* | 5.0 |
| Comparative Example 8-9 | Comparative Example 6-9 | 500.0 | p-PhTPhDPhSf-TFAC* | 5.0 |
| Comparative Example 8-10 | Comparative Example 6-10 | 500.0 | p-PhTPhDPhSf-TFAC* | 5.0 |
| Comparative Example 8-11 | Comparative Example 6-11 | 500.0 | p-PhTPhDPhSf-TFAC* | 5.0 |
| Comparative Example 8-12 | Comparative Example 6-12 | 500.0 | p-PhTPhDPhSf-TFAC* | 5.0 |
| Comparative Example 8-13 | Comparative Example 6-13 | 500.0 | p-PhTPhDPhSf-TFAC* | 5.0 |
| Comparative Example 8-14 | Comparative Example 6-14 | 500.0 | p-PhTPhDPhSf-TFAC* | 5.0 |

Note
*p-PhTPhDPhSf-TFAC denotes p-Phenylthiophenyldiphenylsulfonium trifluoroacetate

TABLE 28

Properties of coloring composition (IV) for color filters

| Examples | Number-average dispersed particle diameter (nm) | Volume-average dispersed particle diameter (nm) | Viscosity (mPa·s) | Rate of change in viscosity (%) |
|---|---|---|---|---|
| Example 8-1 | 18 | 41 | 17.2 | 4.0 |
| Example 8-2 | 21 | 36 | 18.1 | 4.6 |
| Example 8-3 | 27 | 52 | 20.1 | 4.9 |
| Example 8-4 | 30 | 74 | 19.8 | 4.9 |
| Example 8-5 | 17 | 35 | 15.4 | 3.3 |
| Example 8-6 | 19 | 58 | 18.8 | 4.7 |
| Example 8-7 | 19 | 65 | 22.8 | 5.7 |
| Example 8-8 | 20 | 101 | 25.2 | 8.6 |
| Example 8-9 | 22 | 57 | — | — |

Properties of coloring composition (IV) for color filters
Specific absorption coefficient (on weight basis)

| Examples | (650 nm) $\epsilon_w$ (-) | (610 nm) $\epsilon_w$ (-) | (550 nm) $\epsilon_w$ (-) | (400 nm) $\epsilon_w$ (-) |
|---|---|---|---|---|
| Example 8-1 | 2.53 | — | — | — |
| Example 8-2 | — | 2.44 | — | — |
| Example 8-3 | — | — | 2.01 | — |
| Example 8-4 | — | — | — | 2.07 |
| Example 8-5 | 2.59 | — | — | — |
| Example 8-6 | 2.41 | — | — | — |
| Example 8-7 | 2.45 | — | — | — |
| Example 8-8 | 2.42 | — | — | — |
| Example 8-9 | 2.40 | — | — | — |

TABLE 29

Properties of coloring composition (IV) for color filters

| Comparative Examples | Number-average dispersed particle diameter (nm) | Volume-average dispersed particle diameter (nm) | Viscosity (mPa·s) | Rate of change in viscosity (%) |
|---|---|---|---|---|
| Comparative Example 8-1 | 186 | 405 | 170.1 | 27.7 |
| Comparative Example 8-2 | 169 | 378 | 243.6 | 35.9 |
| Comparative Example 8-3 | 280 | 508 | 215.2 | 34.2 |
| Comparative Example 8-4 | 504 | 1011 | 303.6 | 39.5 |
| Comparative Example 8-5 | 20 | 42 | 15.4 | 3.1 |
| Comparative Example 8-6 | 23 | 51 | 15.6 | 3.3 |
| Comparative Example 8-7 | 23 | 53 | 16.8 | 3.5 |
| Comparative Example 8-8 | 24 | 303 | 55.4 | 29.8 |
| Comparative Example 8-9 | 43 | 272 | 31.8 | 18.5 |
| Comparative Example 8-10 | 47 | 236 | 16.1 | 6.4 |
| Comparative Example 8-11 | 69 | 297 | 49.9 | 24.2 |
| Comparative Example 8-12 | 76 | 811 | 50.9 | 28.1 |
| Comparative Example 8-13 | 79 | 869 | 51.9 | 33.9 |
| Comparative Example 8-14 | 83 | 869 | 60.1 | 35.5 |

Properties of coloring composition (IV) for color filters
Specific absorption coefficient (on weight basis)

| Comparative Examples | (650 nm) $\epsilon_w$ (-) | (610 nm) $\epsilon_w$ (-) | (550 nm) $\epsilon_w$ (-) | (400 nm) $\epsilon_w$ (-) |
|---|---|---|---|---|
| Comparative Example 8-1 | 1.00 | — | — | — |
| Comparative Example 8-2 | — | 1.00 | — | — |
| Comparative Example 8-3 | — | — | 1.00 | — |
| Comparative Example 8-4 | — | — | — | 1.00 |
| Comparative Example 8-5 | 0.97 | — | — | — |
| Comparative Example 8-6 | — | 0.95 | — | — |
| Comparative Example 8-7 | — | — | 0.96 | — |
| Comparative Example 8-8 | 1.39 | — | — | — |
| Comparative Example 8-9 | — | 0.98 | — | — |
| Comparative Example 8-10 | — | — | 0.99 | — |
| Comparative Example 8-11 | — | — | — | 0.98 |
| Comparative Example 8-12 | — | 1.01 | — | — |
| Comparative Example 8-13 | 1.01 | — | — | — |
| Comparative Example 8-14 | — | — | 1.02 | — |

TABLE 30

Properties of colored transparent film (IV) for color filters
Chromaticity

| Examples | x value (-) | y value (-) | Y value (-) |
|---|---|---|---|
| Example 8-1 | 0.2752 | 0.3877 | 70.41 |
| Example 8-2 | 0.1475 | 0.2179 | 29.44 |
| Example 8-3 | 0.5846 | 0.3402 | 23.29 |
| Example 8-4 | 0.3458 | 0.4958 | 74.46 |
| Example 8-5 | 0.2748 | 0.3862 | 71.15 |
| Example 8-6 | 0.2757 | 0.3874 | 70.11 |
| Example 8-7 | 0.2736 | 0.3865 | 70.05 |
| Example 8-8 | 0.2752 | 0.3866 | 69.12 |
| Example 8-9 | 0.2756 | 0.3852 | 69.91 |

Properties of colored transparent film (IV) for color filters

| Examples | Light fastness ΔE* value (-) | Heat resistance ΔE* value (-) |
|---|---|---|
| Example 8-1 | 3.28 | 3.45 |
| Example 8-2 | 3.38 | 3.66 |
| Example 8-3 | 3.15 | 3.34 |
| Example 8-4 | 3.64 | 3.83 |
| Example 8-5 | 3.27 | 3.44 |
| Example 8-6 | 3.36 | 4.20 |
| Example 8-7 | 4.06 | 4.11 |

TABLE 30-continued

| | | |
|---|---|---|
| Example 8-8 | 4.62 | 4.85 |
| Example 8-9 | 3.32 | 3.47 |

| | Properties of colored transparent film (IV) for color filters Light transmittance (%) | | | |
|---|---|---|---|---|
| Examples | (G) (530 nm) | (B) (460 nm) | (R) (620 nm) | (Y) (550 nm) |
| Example 8-1 | 93.2 | — | — | — |
| Example 8-2 | — | 92.5 | — | — |
| Example 8-3 | — | — | 97.3 | — |
| Example 8-4 | — | — | — | 96.9 |
| Example 8-5 | 94.0 | — | — | — |
| Example 8-6 | 92.0 | — | — | — |
| Example 8-7 | 90.8 | — | — | — |
| Example 8-8 | 89.1 | — | — | — |
| Example 8-9 | 92.0 | — | — | — |

| | Properties of colored transparent film (IV) for color filters Specific absorption coefficient (on weight basis) | | | |
|---|---|---|---|---|
| Examples | (650 nm) $\epsilon_w$ (−) | (610 nm) $\epsilon_w$ (−) | (550 nm) $\epsilon_w$ (−) | (400 nm) $\epsilon_w$ (−) |
| Example 8-1 | 2.48 | — | — | — |
| Example 8-2 | — | 2.38 | — | — |
| Example 8-3 | — | — | 1.96 | — |
| Example 8-4 | — | — | — | 2.00 |
| Example 8-5 | 2.51 | — | — | — |
| Example 8-6 | 2.39 | — | — | — |
| Example 8-7 | 2.41 | — | — | — |
| Example 8-8 | 2.42 | — | — | — |
| Example 8-9 | 2.39 | — | — | — |

TABLE 31

| | Properties of colored transparent film (IV) for color filters Chromaticity | | |
|---|---|---|---|
| Comparative Examples | x value (−) | y value (−) | Y value (−) |
| Comparative Example 8-1 | 0.2722 | 0.3765 | 62.38 |
| Comparative Example 8-2 | 0.1595 | 0.2226 | 26.35 |
| Comparative Example 8-3 | 0.5386 | 0.3127 | 21.16 |
| Comparative Example 8-4 | 0.3421 | 0.4936 | 69.09 |
| Comparative Example 8-5 | 0.2754 | 0.3865 | 70.33 |
| Comparative Example 8-6 | 0.1475 | 0.2192 | 39.04 |
| Comparative Example 8-7 | 0.5862 | 0.3412 | 23.29 |
| Comparative Example 8-8 | 0.2758 | 0.3879 | 67.58 |
| Comparative Example 8-9 | 0.1469 | 0.2181 | 28.29 |
| Comparative Example 8-10 | 0.5857 | 0.3389 | 21.49 |
| Comparative Example 8-11 | 0.3449 | 0.4938 | 70.33 |
| Comparative Example 8-12 | 0.1464 | 0.2185 | 26.98 |
| Comparative Example 8-13 | 0.2760 | 0.3858 | 66.35 |
| Comparative Example 8-14 | 0.5879 | 0.3383 | 21.99 |

TABLE 31-continued

| | Properties of colored transparent film (IV) for color filters | |
|---|---|---|
| Comparative Examples | Light fastness ΔE* value (−) | Heat resistance ΔE* value (−) |
| Comparative Example 8-1 | 7.83 | 7.21 |
| Comparative Example 8-2 | 8.62 | 8.76 |
| Comparative Example 8-3 | 7.69 | 6.90 |
| Comparative Example 8-4 | 7.05 | 8.62 |
| Comparative Example 8-5 | 2.91 | 2.75 |
| Comparative Example 8-6 | 2.98 | 3.01 |
| Comparative Example 8-7 | 2.84 | 2.89 |
| Comparative Example 8-8 | 6.02 | 6.43 |
| Comparative Example 8-9 | 2.76 | 2.81 |
| Comparative Example 8-10 | 2.43 | 2.67 |
| Comparative Example 8-11 | 2.49 | 2.63 |
| Comparative Example 8-12 | 9.72 | 9.61 |
| Comparative Example 8-13 | 8.06 | 8.33 |
| Comparative Example 8-14 | 8.20 | 8.08 |

| | Properties of colored transparent film (IV) for color filters Light transmittance (%) | | | |
|---|---|---|---|---|
| Comparative Examples | (G) (530 nm) | (B) (460 nm) | (R) (620 nm) | (Y) (550 nm) |
| Comparative Example 8-1 | 63.3 | — | — | — |
| Comparative Example 8-2 | — | 62.5 | — | — |
| Comparative Example 8-3 | — | — | 71.0 | — |
| Comparative Example 8-4 | — | — | — | 70.2 |
| Comparative Example 8-5 | 93.1 | — | — | — |
| Comparative Example 8-6 | — | 91.9 | — | — |
| Comparative Example 8-7 | — | — | 94.1 | — |
| Comparative Example 8-8 | 74.8 | — | — | — |
| Comparative Example 8-9 | — | 69.8 | — | — |
| Comparative Example 8-10 | — | — | 76.5 | — |
| Comparative Example 8-11 | — | — | — | 76.1 |
| Comparative Example 8-12 | — | 56.5 | — | — |
| Comparative Example 8-13 | 56.9 | — | — | — |
| Comparative Example 8-14 | — | — | 61.0 | — |

TABLE 31-continued

Properties of colored transparent film (IV) for color filters
Specific absorption coefficient (on weight basis)

| Comparative Examples | (650 nm) $\epsilon_w$ (-) | (610 nm) $\epsilon_w$ (-) | (550 nm) $\epsilon_w$ (-) | (400 nm) $\epsilon_w$ (-) |
|---|---|---|---|---|
| Comparative Example 8-1 | 1.00 | — | — | — |
| Comparative Example 8-2 | — | 1.00 | — | — |
| Comparative Example 8-3 | — | — | 1.00 | — |
| Comparative Example 8-4 | — | — | — | 1.00 |
| Comparative Example 8-5 | 0.95 | — | — | — |
| Comparative Example 8-6 | — | 0.94 | — | — |
| Comparative Example 8-7 | — | — | 0.95 | — |
| Comparative Example 8-8 | 1.40 | — | — | — |
| Comparative Example 8-9 | — | 0.98 | — | — |
| Comparative Example 8-10 | — | — | 0.99 | — |
| Comparative Example 8-11 | — | — | — | 0.98 |
| Comparative Example 8-12 | — | 1.02 | — | — |
| Comparative Example 8-13 | 1.01 | — | — | — |
| Comparative Example 8-14 | — | — | 1.01 | — |

Example 8-9

320.0 parts by weight of the coloring composition (II) obtained in Example 6-9 and 2.5 parts by weight of p-phenylthiophenyldiphenylsulfonium trifluoroacetate were mixed together, and then kneaded and dispersed under heating at 50° C. using a triple roll mill, thereby obtaining a coloring composition (IV) for color filters. The essential production conditions are shown in Table 27, various properties of the obtained coloring composition (IV) for color filters are shown in Table 28, and various properties of the colored transparent film (IV) for color filters obtained by coating the coloring composition (IV) for color filters are shown in Table 30.

Color Filters

Examples 9-2 to 9-6 and Comparative Examples 9-1 to 9-3

The same procedure as defined in Example 9-1 was conducted except that kinds of coloring compositions for color filters were changed variously, thereby obtaining color filters (I). The essential production conditions and various properties of the obtained color filters are shown in Tables 32 and 33.

TABLE 32

| Examples | Method for production of color filter | Kind of colored transparent film (G) | (B) | (R) |
|---|---|---|---|---|
| Example 9-1 | Color filter (I) | Example 6-1 | Example 6-2 | Example 6-3 |
| Example 9-2 | Color filter (I) | Example 6-5 | Example 6-2 | Example 6-3 |
| Example 9-3 | Color filter (I) | Example 6-6 | Example 6-2 | Example 6-3 |
| Example 9-4 | Color filter (I) | Example 6-7 | Example 6-2 | Example 6-3 |
| Example 9-5 | Color filter (I) | Example 6-8 | Example 6-2 | Example 6-3 |
| Example 9-6 | Color filter (I) | Example 6-9 | Example 6-2 | Example 6-3 |
| Example 9-7 | Color filter (II) | Example 7-1 | Example 7-2 | Example 7-3 |
| Example 9-8 | Color filter (II) | Example 7-5 | Example 7-2 | Example 7-3 |
| Example 9-9 | Color filter (II) | Example 7-6 | Example 7-2 | Example 7-3 |
| Example 9-10 | Color filter (II) | Example 7-7 | Example 7-2 | Example 7-3 |
| Example 9-11 | Color filter (II) | Example 7-8 | Example 7-2 | Example 7-3 |
| Example 9-12 | Color filter (II) | Example 7-9 | Example 7-2 | Example 7-3 |
| Example 9-13 | Color filter (III) | Example 8-1 | Example 8-2 | Example 8-3 |
| Example 9-14 | Color filter (III) | Example 8-5 | Example 8-2 | Example 8-3 |
| Example 9-15 | Color filter (III) | Example 8-6 | Example 8-2 | Example 8-3 |
| Example 9-16 | Color filter (III) | Example 8-7 | Example 8-2 | Example 8-3 |
| Example 9-17 | Color filter (III) | Example 8-8 | Example 8-2 | Example 8-3 |
| Example 9-18 | Color filter (III) | Example 8-9 | Example 8-2 | Example 8-3 |

| Comparative Examples | Light transmittance (%) (G) (530 nm) | (B) (460 nm) | (R) (620 nm) | Contrast (-) |
|---|---|---|---|---|
| Example 9-1 | 92.0 | 91.4 | 96.2 | 1700 |
| Example 9-2 | 92.8 | 91.5 | 96.1 | 1740 |
| Example 9-3 | 91.1 | 91.4 | 96.2 | 1680 |
| Example 9-4 | 90.6 | 91.6 | 96.0 | 1650 |
| Example 9-5 | 87.3 | 91.5 | 96.2 | 1590 |
| Example 9-6 | 91.4 | 91.4 | 96.0 | 1690 |
| Example 9-7 | 92.4 | 91.6 | 96.4 | 1720 |
| Example 9-8 | 92.9 | 91.5 | 96.2 | 1810 |
| Example 9-9 | 91.2 | 91.6 | 96.4 | 1700 |
| Example 9-10 | 90.2 | 91.7 | 96.3 | 1680 |
| Example 9-11 | 87.4 | 91.5 | 96.4 | 1620 |
| Example 9-12 | 91.5 | 91.6 | 96.2 | 1720 |
| Example 9-13 | 92.6 | 91.7 | 96.6 | 1730 |
| Example 9-14 | 93.2 | 91.6 | 96.6 | 1780 |
| Example 9-15 | 91.1 | 91.7 | 96.4 | 1720 |
| Example 9-16 | 90.3 | 91.5 | 96.5 | 1690 |
| Example 9-17 | 87.6 | 91.6 | 96.6 | 1630 |
| Example 9-18 | 91.6 | 91.6 | 96.5 | 1730 |

TABLE 33

| Comparative Examples | Production of color filter | | | |
|---|---|---|---|---|
| | Method for production of color filter | Kind of colored transparent film | | |
| | | (G) | (B) | (R) |
| Comparative Example 9-1 | Color filter (I) | Comparative Example 6-1 | Comparative Example 6-2 | Comparative Example 6-3 |
| Comparative Example 9-2 | Color filter (I) | Comparative Example 6-8 | Comparative Example 6-9 | Comparative Example 6-10 |
| Comparative Example 9-3 | Color filter (I) | Comparative Example 6-13 | Comparative Example 6-12 | Comparative Example 6-14 |
| Comparative Example 9-4 | Color filter (II) | Comparative Example 7-1 | Comparative Example 7-2 | Comparative Example 7-3 |
| Comparative Example 9-5 | Color filter (II) | Comparative Example 7-8 | Comparative Example 7-9 | Comparative Example 7-10 |
| Comparative Example 9-6 | Color filter (II) | Comparative Example 7-13 | Comparative Example 7-12 | Comparative Example 7-14 |
| Comparative Example 9-7 | Color filter (III) | Comparative Example 8-1 | Comparative Example 8-2 | Comparative Example 8-3 |
| Comparative Example 9-8 | Color filter (III) | Comparative Example 8-8 | Comparative Example 8-9 | Comparative Example 8-10 |
| Comparative Example 9-9 | Color filter (III) | Comparative Example 8-13 | Comparative Example 8-12 | Comparative Example 8-14 |

| Comparative Examples | Properties of color filter | | | |
|---|---|---|---|---|
| | Light transmittance (%) | | | |
| | (G) (530 nm) | (B) (460 nm) | (R) (620 nm) | Contrast (−) |
| Comparative Example 9-1 | 59.2 | 58.5 | 65.9 | 470 |
| Comparative Example 9-2 | 73.1 | 68.5 | 75.1 | 720 |
| Comparative Example 9-3 | 52.6 | 51.8 | 55.2 | 390 |
| Comparative Example 9-4 | 59.5 | 58.3 | 66.2 | 480 |
| Comparative Example 9-5 | 72.9 | 67.2 | 75.4 | 730 |
| Comparative Example 9-6 | 52.9 | 52.2 | 55.5 | 410 |
| Comparative Example 9-7 | 59.6 | 58.6 | 65.9 | 490 |
| Comparative Example 9-8 | 73.3 | 68.5 | 75.2 | 750 |
| Comparative Example 9-9 | 52.8 | 51.9 | 55.3 | 420 |

Examples 9-8 to 9-12 and Comparative Examples 9-4 to 9-6

The same procedure as defined in Example 9-7 was conducted except that kinds of coloring compositions for color filters were changed variously, thereby obtaining color filters (II). The essential production conditions and various properties of the obtained color filters are shown in Tables 32 and 33.

Examples 9-14 to 9-18 and Comparative Examples 9-7 to 9-9

The same procedure as defined in Example 9-13 was conducted except that kinds of coloring compositions for color filters were changed variously, thereby obtaining color filters (III). The essential production conditions and various properties of the obtained color filters are shown in Tables 32 and 33.

Next, Examples (Examples 10 and 11) concerning the colorants for inks for ink-jet printing and the inks for ink-jet printing according to the eleventh and twelfth aspects of the present invention as well as the corresponding Comparative Examples (Comparative Examples 10 and 11) are explained.

<Composite Particles 13: Production of Composite Particles>

140 g of methylhydrogenpolysiloxane (tradename: "TSF484", produced by GE TOSHIBA SILICONE CO., LTD.) was added to 7.0 kg of silica 1 (average particle diameter of primary particles: 16 nm; BET specific surface area value: 204.3 m$^2$/g; light fastness $\Delta E^*$: 5.36) while operating an edge runner, and the resultant mixture was mixed and stirred for 30 min under a linear load of 588 N/cm at a stirring speed of 22 rpm.

Then, 7.0 kg of the organic pigment B (kind: phthalocyanine-based pigment; average particle diameter: 80 nm; BET specific surface area value: 87.9 m$^2$/g; geometrical standard deviation value: 2.15; L* value: 23.04; a* value: 5.99; b* value: −13.16; C* value: 14.46; light fastness $\Delta E^*$: 8.83; ζ potential: −2.9 mV) was added to the above-obtained mixture for 30 min while operating the edge runner, and the resultant mixture was mixed and stirred for 120 min under a linear load of 392 N/cm at a stirring speed of 22 rpm to allow the organic pigment B to adhere onto the methylhydrogenpolysiloxane coating layer formed on the respective silica particles, thereby obtaining composite particles 13.

As a result, it was confirmed that the thus obtained composite particles 13 had an average primary particle diameter of 20 nm, a BET specific surface area value of 89.1 m$^2$/g, a number-average particle diameter of 26 nm, a volume-average particle diameter of 94 nm and a geometrical standard deviation value of 1.26. As to the hue values of the composite particles 13, the L* value thereof was 26.95; the a* value thereof was 5.74; the b* value thereof was −12.66; and the C* value thereof was 13.90. In addition, it was confirmed that the composite particles 13 exhibited a degree of desorption of organic pigment of Rank 4, a tinting strength of 93%, a light fastness $\Delta E^*$ of 2.15, a ζ potential of −22.8 mV, and a coating amount of methylhydrogenpolysiloxane of 0.53% by weight (calculated as C). The amount of the organic pigment B adhered onto the composite particles 13 was 33.19% by weight (calculated as C; corresponding to about 100 parts by weight based on 100 parts by weight of the silica particles).

As a result of observing the micrograph of the obtained composite particles 13, since substantially no particles of the organic pigment B added were recognized from the micrograph, it was confirmed that a substantially whole amount of the organic pigment B added was adhered onto the coating layer composed of methylhydrogenpolysiloxane.

Example 10-1

Production of Colorant for Inks for Ink-Jet Printing

A 3-L beaker was charged with 200 g of the above-obtained composite particles (composite particles 13) and 2 L of a 0.65 mol/L sodium hydroxide aqueous solution (0.2 time a theoretical amount thereof capable of dissolving the silica particles as core particles and the surface-modifying agent) to prepare a solution having a pH value of 13.1. The resultant solution was stirred at 60° C. for 30 min and then subjected to filtration to separate a solid therefrom. The thus separated solid was washed with water and then dried, thereby obtaining a colorant for inks for ink-jet printing.

It was confirmed that the amount of silica enclosed in the thus obtained colorant for inks for ink-jet printing was 1.04% by weight (calculated as Si), and the colorant for inks for ink-jet-printing had an average primary particle diameter of 15 nm, a BET specific surface area value of 82.4 m$^2$/g, a number-average particle diameter of 21 nm, a volume-average particle diameter of 75 nm and a geometrical standard deviation value of 1.31. As to the hue values of the colorant for inks for ink-jet-printing, the L* value thereof was 25.39; the a* value thereof was −5.90; the b* value thereof was −12.95, and the C* value thereof was 14.23. In addition, it was confirmed that the colorant for inks for ink-jet printing had a tinting strength of 105%, a light fastness ΔE* of 3.54, and a ζ potential of −13.6 mV.

Example 11-1

Production of Ink for Ink-Jet Printing 67.7 parts by weight of ion-exchanged water and 1.3 parts by weight of polyoxyethylene lauryl ether were charged into a sand mill, and mixed together therein. Thereafter, 5.0 parts by weight of the colorant, 10 parts by weight of diethyleneglycol, 10 parts by weight of glycerol, 5 parts by weight of triethyleneglycol monobutyl ether, 0.8 part by weight of triethanol amine and 0.2 part by weight of a defoaming agent (silicon-based defoaming agent) were added to the resultant mixed solution, and the obtained mixture was mixed and dispersed for 3 hr and then filtered through a 0.5 μm membrane filter, thereby obtaining an ink for ink-jet printing.

As a result, it was confirmed that the resultant ink for ink-jet printing had a number-average dispersed particle diameter of 18 nm, a volume-average dispersed particle diameter of 51 nm, a dispersion stability (as visual evaluation) of Rank 5, and a rate of change in number-average dispersed particle diameter of 6.8%. As to the hue values of the ink for ink-jet printing, the L* value thereof was 27.68; the a* value thereof was 5.42; the b* value thereof was −13.04; and the C* value thereof was 14.12. In addition, it was confirmed that the ink for ink-jet printing had a specific absorption coefficient $\epsilon_w$ of 2.28, a light fastness ΔE* of 1.73, an anti-clogging property of Rank 5.

According to the procedure for producing the composite particles 13 and Example 10-1, the composite particles, the colorants for inks for ink-jet printing, and the inks for ink-jet printing, were respectively produced. The essential production conditions as well as various properties of the obtained composite particles, colorants for inks for ink-jet printing, and inks for ink-jet printing, are shown below.

Silica 1 and Silica 2:

As the core particles, the silica particles 1 and 2 having properties shown in Table 1 were prepared.

Organic Pigments B, R-1, Y and G:

As the organic pigment, the organic pigments having properties shown in Table 2 were prepared.

<Production of Composite Particles>

Composite particles 14 to 16:

The same procedure as defined in the production of composite particles 13, was conducted except that kinds of core particles, kinds and amounts of surface modifying agents added, linear load and treating time for edge runner treatment used in the coating step with the surface modifying agents, kinds and amounts of organic pigments added in organic pigment-adhering step, and linear load and treating time for edge runner treatment used in the organic pigment-adhering step, were changed variously, thereby obtaining composite particles. The essential production conditions are shown in Table 34, and various properties of the obtained composite particles are shown in Table 35.

TABLE 34

| | Production of composite particles Coating step with surface modifying agent Additives | | | |
|---|---|---|---|---|
| Composite particles | Kind of core particles | Kind | | Amount added (wt. part) |
| Composite particles 13 | Silica 1 | Methylhydrogen polysiloxane | | 2.0 |
| Composite particles 14 | Silica 1 | Methyltriethoxysilane | | 4.0 |
| Composite particles 15 | Silica 1 | Phenyltriethoxysilane | | 5.0 |
| Composite particles 16 | Silica 2 | γ-aminopropyl triethoxysilane | | 6.0 |

| | Production of composite particles Coating step with surface modifying agent | | |
|---|---|---|---|
| | Edge runner treatment | | Coating amount (calculated |
| Composite particles | Linear load (N/cm) | Time (min) | as C) (wt %) |
| Composite particles 13 | 588 | 30 | 0.53 |
| Composite particles 14 | 441 | 30 | 0.26 |
| Composite particles 15 | 735 | 20 | 1.73 |
| Composite particles 16 | 392 | 60 | 0.77 |

| | Production of composite particles Organic pigment-adhesion step Organic pigment | |
|---|---|---|
| Composite particles | Kind | Amount adhered (wt. part) |
| Composite particles 13 | B | 100.0 |
| Composite particles 14 | R-1 | 100.0 |
| Composite particles 15 | Y | 100.0 |
| Composite particles 16 | G | 200.0 |

| | Production of composite particles Organic pigment-adhesion step | | |
|---|---|---|---|
| | Edge runner treatment | | Amount adhered (calculated |
| Composite particles | Linear load (N/cm) | Time (min) | as C) (wt %) |
| Composite particles 13 | 392 | 120 | 33.19 |
| Composite particles 14 | 588 | 60 | 33.61 |
| Composite particles 15 | 588 | 60 | 22.50 |
| Composite particles 16 | 735 | 40 | 24.35 |

TABLE 35

| | Properties of composite particles | |
|---|---|---|
| Composite particles | Average primary particle diameter (nm) | BET specific surface area value ($m^2/g$) |
| Composite particles 13 | 20 | 89.1 |
| Composite particles 14 | 20 | 73.4 |
| Composite particles 15 | 19 | 62.2 |
| Composite particles 16 | 28 | 64.3 |

| | Properties of composite particles | | |
|---|---|---|---|
| Composite particles | Number-average particle diameter (nm) | Volume-average particle diameter (nm) | Geometrical standard deviation value (–) |
| Composite particles 13 | 26 | 94 | 1.26 |
| Composite particles 14 | 27 | 98 | 1.27 |
| Composite particles 15 | 26 | 95 | 1.27 |
| Composite particles 16 | 34 | 110 | 1.35 |

| | Properties of composite particles Hue | | | |
|---|---|---|---|---|
| Composite particles | L* value (–) | a* value (–) | b* value (–) | C* value (–) |
| Composite particles 13 | 26.95 | 5.74 | –12.66 | 13.90 |
| Composite particles 14 | 49.72 | 46.55 | 22.08 | 51.52 |
| Composite particles 15 | 87.96 | 2.51 | 88.78 | 88.82 |
| Composite particles 16 | 31.43 | –15.08 | –0.84 | 15.10 |

| | Properties of composite particles | | | |
|---|---|---|---|---|
| Composite particles | Tinting strength (%) | Light fastness ΔE* value (–) | ζ potential (mV) | Degree of desorption of organic pigment (–) |
| Composite particles 13 | 93 | 2.15 | –22.8 | 4 |
| Composite particles 14 | 94 | 2.21 | –22.5 | 4 |
| Composite particles 15 | 93 | 2.34 | –22.7 | 4 |
| Composite particles 16 | 95 | 2.28 | –20.5 | 4 |

Production of Colorants for Inks for Ink-Jet Printing

Examples 10-2 to 10-7 and Comparative Examples 10-1 to 10-3

The same procedure as defined in Example 10-1 was conducted except that kinds of composite particles, pH values of dissolution solutions used upon alkali dissolution, ratio of actual amount of alkali added to theoretical amount thereof and treating temperature and time, were changed variously, thereby obtaining colorants for inks for ink-jet printing. Meanwhile, the concentration (g/100 mL) of the composite particles means a weight (g) of the composite particles based on 100 mL of the dissolution solution. Also, in Example 10-2, freeze-drying was conducted as the drying step. The essential production conditions are shown in Table 36, and various properties of the obtained colorants for inks for ink-jet printing are shown in Table 37.

TABLE 36

| | Production of colorant for inks for ink-jet printing Composite particles | |
|---|---|---|
| Examples and Comparative Examples | Kind | Concentration (g/100 mL) |
| Example 10-1 | Composite particles 13 | 10.0 |
| Example 10-2 | Composite particles 13 | 10.0 |
| Example 10-3 | Composite particles 13 | 10.0 |
| Example 10-4 | Composite particles 13 | 10.0 |
| Example 10-5 | Composite particles 14 | 10.0 |
| Example 10-6 | Composite particles 15 | 10.0 |
| Example 10-7 | Composite particles 16 | 10.0 |
| Comparative Example 10-1 | Composite particles 13 | 10.0 |
| Comparative Example 10-2 | Composite particles 13 | 10.0 |
| Comparative Example 10-3 | Composite particles 13 | 10.0 |

| | Production of colorant for inks for ink-jet printing Dissolution solution | | |
|---|---|---|---|
| Examples and Comparative Examples | Kind | pH (–) | Ratio to theoretical amount (time) |
| Example 10-1 | Sodium hydroxide | 13.1 | 0.20 |
| Example 10-2 | Sodium hydroxide | 13.1 | 0.20 |
| Example 10-3 | Sodium hydroxide | 13.1 | 0.20 |
| Example 10-4 | Sodium hydroxide | 13.7 | 0.89 |
| Example 10-5 | Sodium hydroxide | 13.2 | 0.40 |
| Example 10-6 | Sodium hydroxide | 13.4 | 0.70 |
| Example 10-7 | Potassium hydroxide | 13.0 | 0.10 |
| Comparative Example 10-1 | Sodium hydroxide | 13.9 | 1.50 |
| Comparative Example 10-2 | Sodium hydroxide | 13.1 | 0.20 |
| Comparative Example 10-3 | Sodium hydroxide | 8.6 | 0.005 |

| | Production of colorant for inks for ink-jet printing | | |
|---|---|---|---|
| Examples and Comparative Examples | Treating temperature (° C.) | Treating time (min) | Use or non-use of freeze-drying |
| Example 10-1 | 60 | 30 | None |
| Example 10-2 | 60 | 30 | Used |
| Example 10-3 | 95 | 30 | None |
| Example 10-4 | 50 | 30 | None |
| Example 10-5 | 60 | 30 | None |
| Example 10-6 | 50 | 30 | None |
| Example 10-7 | 70 | 30 | None |

TABLE 36-continued

| | | | |
|---|---|---|---|
| Comparative Example 10-1 | 60 | 30 | None |
| Comparative Example 10-2 | 25 | 30 | None |
| Comparative Example 10-3 | 60 | 600 | None |

TABLE 37

Properties of colorant for inks for ink-jet printing

| Examples and Comparative Examples | Si content (wt %) | Average primary particle diameter (nm) | BET specific surface area value (m²/g) |
|---|---|---|---|
| Example 10-1 | 1.04 | 15 | 82.4 |
| Example 10-2 | 1.04 | 14 | 84.7 |
| Example 10-3 | 0.90 | 16 | 81.5 |
| Example 10-4 | 0.09 | 13 | 88.0 |
| Example 10-5 | 1.01 | 17 | 74.3 |
| Example 10-6 | 0.20 | 17 | 67.1 |
| Example 10-7 | 2.15 | 20 | 62.9 |
| Comparative Example 10-1 | 0.00 | 12 | 89.2 |
| Comparative Example 10-2 | 27.36 | 20 | 57.8 |
| Comparative Example 10-3 | 30.22 | 19 | 60.6 |

Properties of colorant for inks for ink-jet printing

| Examples and Comparative Examples | Number-average particle diameter (nm) | Volume-average particle diameter (nm) | Geometrical standard deviation value (—) |
|---|---|---|---|
| Example 10-1 | 21 | 75 | 1.31 |
| Example 10-2 | 20 | 66 | 1.29 |
| Example 10-3 | 23 | 83 | 1.32 |
| Example 10-4 | 40 | 115 | 1.35 |
| Example 10-5 | 22 | 80 | 1.33 |
| Example 10-6 | 28 | 92 | 1.34 |
| Example 10-7 | 21 | 79 | 1.46 |
| Comparative Example 10-1 | 48 | 158 | 1.42 |
| Comparative Example 10-2 | 28 | 96 | 1.32 |
| Comparative Example 10-3 | 27 | 98 | 1.31 |

Properties of colorant for inks for ink-jet printing

| Examples and Comparative Examples | L* value (—) | a* value (—) | b* value (—) | C* value (—) |
|---|---|---|---|---|
| Example 10-1 | 25.39 | 5.90 | −12.95 | 14.23 |
| Example 10-2 | 25.41 | 5.90 | −12.97 | 14.25 |
| Example 10-3 | 25.35 | 5.95 | −13.01 | 14.31 |
| Example 10-4 | 25.27 | 5.97 | −13.08 | 14.38 |
| Example 10-5 | 45.18 | 49.16 | 24.72 | 55.03 |
| Example 10-6 | 85.22 | 2.96 | 91.04 | 91.09 |
| Example 10-7 | 29.83 | −15.21 | −1.03 | 15.24 |
| Comparative Example 10-1 | 24.84 | 6.03 | −13.14 | 14.46 |
| Comparative Example 10-2 | 26.37 | 5.84 | −12.77 | 14.04 |
| Comparative Example 10-3 | 26.42 | 5.81 | −12.76 | 14.02 |

TABLE 37-continued

Properties of colorant for inks for ink-jet printing

| Examples and Comparative Examples | Tinting strength (%) | Light fastness ΔE* value (—) | ζ potential (mV) |
|---|---|---|---|
| Example 10-1 | 105 | 3.54 | −13.6 |
| Example 10-2 | 105 | 3.53 | −13.6 |
| Example 10-3 | 106 | 4.31 | −11.4 |
| Example 10-4 | 107 | 4.48 | −8.9 |
| Example 10-5 | 105 | 3.46 | −13.0 |
| Example 10-6 | 106 | 3.89 | −10.5 |
| Example 10-7 | 104 | 3.15 | −14.7 |
| Comparative Example 10-1 | 107 | 5.37 | −3.4 |
| Comparative Example 10-2 | 95 | 2.72 | −17.2 |
| Comparative Example 10-3 | 94 | 2.66 | −20.3 |

Inks for Ink-Jet Printing

Examples 11-2 to 11-7 and Comparative Examples 11-1 to 11-11

The same procedure as defined in Example 11-1 was conducted except that kinds of colorants for inks for ink-jet printing were changed variously, thereby obtaining inks for ink-jet printing. The essential production conditions are shown in Table 38, and various properties of the obtained inks for ink-jet printing are shown in Tables 39 and 40.

TABLE 38

Production of ink for ink-jet printing Colorant

| Examples and Comparative Examples | Kind | Amount blended (wt. part) |
|---|---|---|
| Example 11-1 | Example 10-1 | 5.0 |
| Example 11-2 | Example 10-2 | 5.0 |
| Example 11-3 | Example 10-3 | 5.0 |
| Example 11-4 | Example 10-4 | 5.0 |
| Example 11-5 | Example 10-5 | 5.0 |
| Example 11-6 | Example 10-6 | 5.0 |
| Example 11-7 | Example 10-7 | 5.0 |
| Comparative Example 11-1 | Organic pigment B | 5.0 |
| Comparative Example 11-2 | Organic pigment R-1 | 5.0 |
| Comparative Example 11-3 | Organic pigment Y | 5.0 |
| Comparative Example 11-4 | Organic pigment G | 5.0 |
| Comparative Example 11-5 | Composite particles 13 | 5.0 |
| Comparative Example 11-6 | Composite particles 14 | 5.0 |
| Comparative Example 11-7 | Composite particles 15 | 5.0 |
| Comparative Example 11-8 | Composite particles 16 | 5.0 |
| Comparative Example 11-9 | Comparative Example 10-1 | 5.0 |
| Comparative Example 11-10 | Comparative Example 10-2 | 5.0 |
| Comparative Example 11-11 | Comparative Example 10-3 | 5.0 |

TABLE 39

Properties of ink for ink-jet printing

| Examples | Number-average dispersed particle diameter (nm) | Volume-average dispersed particle diameter (nm) | Dispersion stability Visual observation (–) | Dispersion stability Rate of change in number-average dispersed particle diameter (%) |
|---|---|---|---|---|
| Example 11-1 | 18 | 51 | 5 | 6.8 |
| Example 11-2 | 19 | 47 | 5 | 6.9 |
| Example 11-3 | 21 | 60 | 5 | 7.3 |
| Example 11-4 | 36 | 98 | 4 | 9.2 |
| Example 11-5 | 19 | 61 | 5 | 7.0 |
| Example 11-6 | 26 | 69 | 5 | 7.6 |
| Example 11-7 | 19 | 59 | 5 | 6.5 |

Properties of ink for ink-jet printing — Hue

| Examples | L* value (–) | a* value (–) | b* value (–) | C* value (–) |
|---|---|---|---|---|
| Example 11-1 | 27.68 | 5.42 | −13.04 | 14.12 |
| Example 11-2 | 28.02 | 5.44 | −13.18 | 14.26 |
| Example 11-3 | 27.71 | 5.65 | −13.26 | 14.41 |
| Example 11-4 | 27.33 | 5.71 | −13.29 | 14.46 |
| Example 11-5 | 48.06 | 48.97 | 24.88 | 54.93 |
| Example 11-6 | 88.16 | 2.75 | 91.23 | 91.27 |
| Example 11-7 | 32.15 | −15.03 | −1.15 | 15.07 |

Properties of ink for ink-jet printing

| Examples | Specific absorption coefficient (%) | Light fastness ΔE* value (–) | Anti-clogging property (–) |
|---|---|---|---|
| Example 11-1 | 2.28 | 1.73 | 5 |
| Example 11-2 | 2.30 | 1.71 | 5 |
| Example 11-3 | 2.33 | 2.41 | 5 |
| Example 11-4 | 2.41 | 2.56 | 4 |
| Example 11-5 | 2.27 | 1.69 | 5 |
| Example 11-6 | 2.37 | 1.98 | 5 |
| Example 11-7 | 1.96 | 1.45 | 5 |

TABLE 40

Properties of ink for ink-jet printing

| Comparative Examples | Number-average dispersed particle diameter (nm) | Volume-average dispersed particle diameter (nm) | Dispersion stability Visual observation (–) | Dispersion stability Rate of change in number-average dispersed particle diameter (%) |
|---|---|---|---|---|
| Comparative Example 11-1 | 84 | 174 | 1 | 17.2 |
| Comparative Example 11-2 | 112 | 192 | 1 | 17.5 |
| Comparative Example 11-3 | 121 | 201 | 1 | 17.8 |
| Comparative Example 11-4 | 96 | 186 | 1 | 17.0 |
| Comparative Example 11-5 | 23 | 76 | 5 | 5.9 |
| Comparative Example 11-6 | 24 | 78 | 5 | 6.0 |
| Comparative Example 11-7 | 24 | 75 | 5 | 6.0 |
| Comparative Example 11-8 | 31 | 98 | 5 | 6.3 |
| Comparative Example 11-9 | 45 | 150 | 2 | 13.8 |
| Comparative Example 11-10 | 26 | 72 | 5 | 6.4 |
| Comparative Example 11-11 | 25 | 75 | 5 | 6.1 |

Properties of ink for ink-jet printing — Hue

| Comparative Examples | L* value (–) | a* value (–) | b* value (–) | C* value (–) |
|---|---|---|---|---|
| Comparative Example 11-1 | 25.24 | 5.49 | −13.27 | 14.36 |
| Comparative Example 11-2 | 44.76 | 49.72 | 25.08 | 55.69 |
| Comparative Example 11-3 | 86.08 | 2.77 | 91.59 | 91.63 |
| Comparative Example 11-4 | 31.91 | −15.04 | −1.30 | 15.10 |
| Comparative Example 11-5 | 29.11 | 5.30 | −12.87 | 13.92 |
| Comparative Example 11-6 | 52.05 | 46.18 | 22.25 | 51.26 |
| Comparative Example 11-7 | 89.95 | 2.32 | 89.01 | 89.04 |
| Comparative Example 11-8 | 33.63 | −14.89 | −1.04 | 14.93 |
| Comparative Example 11-9 | 26.92 | 5.83 | −13.32 | 14.54 |
| Comparative Example 11-10 | 28.57 | 5.67 | −12.93 | 14.12 |
| Comparative Example 11-11 | 28.80 | 5.63 | −13.02 | 14.19 |

Properties of ink for ink-jet printing

| Comparative Examples | Specific absorption coefficient (%) | Light fastness ΔE* value (–) | Anti-clogging property (–) |
|---|---|---|---|
| Comparative Example 11-1 | 1.00 | 6.59 | 1 |
| Comparative Example 11-2 | 1.00 | 6.22 | 1 |
| Comparative Example 11-3 | 1.00 | 6.15 | 1 |
| Comparative Example 11-4 | 1.00 | 6.48 | 1 |
| Comparative Example 11-5 | 0.97 | 1.32 | 5 |
| Comparative Example 11-6 | 0.95 | 1.37 | 5 |
| Comparative Example 11-7 | 0.96 | 1.45 | 5 |
| Comparative Example 11-8 | 0.95 | 1.40 | 5 |
| Comparative Example 11-9 | 1.98 | 6.74 | 2 |
| Comparative Example 11-10 | 0.98 | 1.53 | 4 |
| Comparative Example 11-11 | 0.97 | 1.56 | 4 |

What is claimed is:

1. Colored composite microparticles comprising silica and an organic pigment, wherein the silica is enclosed in the organic pigment and contained in an amount of 0.001 to 7.0% by weight, calculated as Si, based on a weight of the colored composite microparticles, wherein the microparticles have a number-average particle diameter of not more than 200 nm and a volume-average particle diameter of not more than 200 nm, and wherein the colored composite microparticles have a BET specific surface area value of usually 20 to 500 m²/g.

2. A dispersion comprising a solvent and the colored composite microparticles as defined in claim 1 which are dispersed in the solvent.

3. The dispersion according to claim 2, wherein the solvent is water, a water-soluble organic solvent or a mixed solvent of water and the water-soluble organic solvent.

4. The dispersion according to claim 2, wherein the solvent is an organic solvent.

5. A process for producing the colored composite microparticles as defined in claim 1, comprising the steps of:
   adding a surface modifying agent to silica particles;
   mixing the surface modifying agent and the silica particles under stirring to coat surface of the silica particles with the surface modifying agent;
   then adding an organic pigment to the silica particles coated with the surface modifying agent;
   mixing the organic pigment and the coated silica particles under stirring to adhere the organic pigment onto surface of the coated silica particles, thereby obtaining composite particles; and
   dissolving out a part of the silica particles and at least a part of the surface modifying agent, which are contained in the resultant composite particles, with an alkali solution.

6. A colorant for color filters, comprising the colored composite microparticles as defined in claim 1.

7. The coloring composition for color filters, comprising a coloring composition base material and the colorant for color filters as defined in claim 6 which is dispersed in the base material.

8. A coloring composition for color filters according to claim 7, wherein the colorant for color filters is contained in an amount of 3 to 300 parts by weight based on 100 parts by weight of the coloring composition base material.

9. A coloring composition for color filters, comprising a solution of a transparent resin containing an acid group, a latent acid group or both of the acid group and the latent acid group, and the coloring composition for color filters as defined in claim 7 which is dispersed in the transparent resin solution.

10. The coloring composition for color filters according to claim 9, wherein the colorant for color filters contained in the composition has a number-average dispersed particle diameter of 1 to 200 nm and a volume-average dispersed particle diameter of 1 to 200 nm.

11. The coloring composition for color filters according to claim 9, further comprising a photo-radical polymerization initiator and a polyfunctional monomer containing two or more ethylenically unsaturated double bonds.

12. The coloring composition for color filters according to claim 9, further comprising a photo-acid generator.

13. The color filter comprising a film-shaped product formed from the coloring composition for color filters as defined in claim 9.

14. The color filter according to claim 13, wherein the color filter has a light transmittance in each color transmission range of not less than 75%, and a contrast of not less than 800.

15. The colorant for inks for ink-jet printing, comprising the colored composite microparticles as defined in claim 1.

16. An ink for ink-jet printing, comprising an ink base solution, and the colorant for inks for ink-jet printing as defined in claim 15 which is dispersed in the ink base solution.

17. An ink for ink-jet printing according to claim 16, wherein the colorant for inks for ink-jet printing is contained in an amount of 1 to 20% by weight based on a weight of the ink base solution.

18. The colored composite microparticles according to claim 1, wherein the silica is present in an amount of 0.01 to 5.0% by weight, calculated as Si, based on the weight of the colored composite microparticles.

* * * * *